(12) United States Patent
Kellar

(10) Patent No.: US 12,232,494 B2
(45) Date of Patent: Feb. 25, 2025

(54) AQUEOUS COMPOSITIONS COMPRISING SOLUBILZED LIPO-CHITOOLIGOSACCHARIDES

(71) Applicant: NOVOZYMES BIOAG A/S, Bagsvaerd (DK)

(72) Inventor: Kenneth Kellar, Fuquay-Varina, NC (US)

(73) Assignee: NOVOZYMES BIOAG A/S, Bagsvaerd (DK)

(*) Notice: Subject to any disclaimer, the term of this patent is extended or adjusted under 35 U.S.C. 154(b) by 617 days.

(21) Appl. No.: 16/960,499

(22) PCT Filed: Jan. 4, 2019

(86) PCT No.: PCT/US2019/012259
§ 371 (c)(1),
(2) Date: Jul. 7, 2020

(87) PCT Pub. No.: WO2019/136198
PCT Pub. Date: Jul. 11, 2019

(65) Prior Publication Data
US 2020/0375179 A1 Dec. 3, 2020

Related U.S. Application Data

(60) Provisional application No. 62/614,544, filed on Jan. 8, 2018.

(51) Int. Cl.
| | |
|---|---|
| *A01N 43/16* | (2006.01) |
| *A01N 25/04* | (2006.01) |
| *A01N 25/30* | (2006.01) |
| *A01N 63/20* | (2020.01) |

(52) U.S. Cl.
CPC .............. *A01N 43/16* (2013.01); *A01N 25/04* (2013.01); *A01N 25/30* (2013.01); *A01N 63/20* (2020.01)

(58) Field of Classification Search
CPC ........ A01N 43/16; A01N 63/20; A01N 25/04; A01N 25/30
See application file for complete search history.

(56) References Cited

U.S. PATENT DOCUMENTS

| | | | |
|---|---|---|---|
| 6,979,664 B1 | 12/2005 | Smith | |
| 7,250,068 B1 | 7/2007 | Smith | |
| 7,637,980 B2 | 12/2009 | Smith | |
| 8,415,275 B2 | 4/2013 | Chen | |
| 8,992,653 B2 | 3/2015 | Smith | |
| 2012/0046169 A1* | 2/2012 | Dahman | ................ A01N 43/12 71/27 |
| 2015/0072861 A1 | 3/2015 | Kang | |

FOREIGN PATENT DOCUMENTS

| | | | | |
|---|---|---|---|---|
| CN | 1247452 A | * | 3/2000 | ............. A01N 25/14 |
| CN | 1330866 A | * | 1/2002 | |
| CN | 108088830 A | | 5/2018 | |
| KR | 20160037354 A | | 4/2016 | |
| WO | 9835553 A1 | | 8/1998 | |
| WO | 2017/116837 A1 | | 7/2017 | |
| WO | 2018/118740 A1 | | 6/2018 | |

* cited by examiner

*Primary Examiner* — Johann R Richter
*Assistant Examiner* — Danielle Johnson
(74) *Attorney, Agent, or Firm* — Adam Rucker

(57) ABSTRACT

The present disclosure provides aqueous solutions comprising one or more solubilized LCOs, as well as methods of deagglomerating, emulsifying and solubilizing LCOs in aqueous solutions.

25 Claims, No Drawings

AQUEOUS COMPOSITIONS COMPRISING SOLUBILZED LIPO-CHITOOLIGOSACCHARIDES

CROSS-REFERENCE TO RELATED APPLICATIONS

This application is a 35 U.S.C. 371 national application of international application no. PCT/US2019/012259 filed Jan. 4, 2019, which claims priority or the benefit under 35 U.S.C. 119 of U.S. provisional application No. 62/614,544 filed Jan. 8, 2018, the contents of which are fully incorporated herein by reference.

FIELD OF THE INVENTION

The present disclosure relates to aqueous compositions comprising solubilized lipo-chitooligosaccharide (LCO) molecules, as well as methods of deagglomerating, emulsifying and solubilizing LCOs in aqueous solutions.

BACKGROUND

LCOs are known to be useful for improving various aspects of plant growth and crop yield. See, e.g., U.S. Pat. Nos. 6,979,664; 7,250,068; 7,637,980; 8,415,275; 8,992,653. Because LCOs are naturally water-insoluble, and because aqueous treatment compositions are generally preferred for agricultural applications, LCOs for agricultural use have traditionally been incorporated into agricultural compositions as aqueous LCO suspensions.

The present disclosure provides new and inventive uses for surfactants, methods of deagglomerating, emulsifying and solubilizing LCOs in aqueous solutions, and compositions comprising one or more LCOs solubilized in an aqueous solvent.

SUMMARY OF THE CLAIMED INVENTION

The present disclosure provides aqueous solutions comprising one or more solubilized LCOs, as well as methods of deagglomerating, emulsifying and solubilizing LCOs in aqueous solutions.

A first aspect of the present disclosure is use of an anionic surfactant for reducing and/or preventing agglomeration of LCO molecules in an aqueous composition.

A second aspect of the present disclosure is use of an anionic surfactant and a nonionic surfactant for solubilizing LCO molecules in an aqueous solvent.

A third aspect of the present disclosure is a method of solubilizing LCO molecules in an aqueous solvent, comprising contacting the LCO molecules with an anionic surfactant comprising a carbonate, phosphate, sulfate, or sulfonate head and a linear hydrocarbon tail that is at least 8 carbons in length and with a nonionic surfactant comprising a hydrocarbon chain and an ethoxylate chain.

A fourth aspect of the present disclosure is an aqueous LCO solution comprising an aqueous solvent, LCO molecules, an anionic surfactant comprising a carbonate, phosphate, sulfate, or sulfonate head and a linear hydrocarbon tail that is at least 8 carbons in length, and a nonionic surfactant present comprising a hydrocarbon chain and an ethoxylate chain.

DETAILED DESCRIPTION

This description is not intended to be a detailed catalog of all the different ways in which the invention may be implemented or of all the features that may be added to the instant invention. For example, features illustrated with respect to one embodiment may be incorporated into other embodiments and features illustrated with respect to a particular embodiment may be deleted from that embodiment. In addition, numerous variations and additions to the various embodiments suggested herein, which do not depart from the instant invention, will be apparent to those skilled in the art in light of the instant disclosure. Hence, the following description is intended to illustrate some particular embodiments of the invention and not to exhaustively specify all permutations, combinations and variations thereof.

The terminology used herein is for the purpose of describing particular embodiments only and is not intended to be limiting of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. For the sake of brevity and/or clarity, well-known functions or constructions may not be described in detail.

As used herein, the singular forms "a," "an," and "the" are intended to include the plural forms as well, unless the context clearly indicates otherwise.

As used herein, the terms "acaricide" and "acaricidal" refer to an agent or combination of agents the application of which is toxic to an acarid (i.e., kills an acarid, inhibits the growth of an acarid and/or inhibits the reproduction of an acarid).

As used herein, the term "agriculturally beneficial agent" refers to any agent (e.g., chemical or biological agent) or combination of agents the application of which causes or provides a beneficial and/or useful effect in agriculture including, but not limited to, agriculturally beneficial microorganisms, biostimulants, nutrients, pesticides (e.g., acaricides, fungicides, herbicides, insecticides, and nematicides) and plant signal molecules.

As used herein, the term "agriculturally beneficial microorganism" refers to a microorganism having at least one agriculturally beneficial property (e.g., the ability to fix nitrogen, the ability to solubilize phosphate and/or the ability to produce an agriculturally beneficial agent, such as a plant signal molecule).

As used herein, the term "and/or" is intended to include any and all combinations of one or more of the associated listed items, as well as the lack of combinations when interpreted in the alternative ("or").

As used herein, the term "biostimulant" refers to an agent or combination of agents the application of which enhances one or more metabolic and/or physiological processes of a plant or plant part (e.g., carbohydrate biosynthesis, ion uptake, nucleic acid uptake, nutrient delivery, photosynthesis and/or respiration).

As used herein, the terms "colony forming unit" and "cfu" refer to a microbial cell/spore capable of propagating on or in a suitable growth medium or substrate (e.g., a soil) when conditions (e.g., temperature, moisture, nutrient availability, pH, etc.) are favorable for germination and/or microbial growth.

As used herein, the term "consists essentially of," when used in reference to compositions and methods of the present disclosure, means that the compositions/methods may contain additional components/steps so long as the additional components/steps do not materially alter the composition/method. The term "materially alter," as applied to a composition/method of the present disclosure, refers to an increase or decrease in the effectiveness of the composition/method of at least 20%. For example, a component added to a composition of the present disclosure may be deemed to "materially alter" the composition if it increases or decreases the composition's ability to enhance plant growth and/or yield by at least 20%.

As used herein, the term "diazotroph" refers to an organism capable of converting atmospheric nitrogen ($N_2$) into a form that may be utilized by a plant or plant part (e.g., ammonia ($NH_3$), ammonium ($NH_4+$), etc.).

As used herein, the term "dispersant" refers to an agent or combination of agents the application of which reduces the cohesiveness of like particles, the surface tension of a liquid, the interfacial tension between two liquids and/or the interfacial tension between or a liquid and a solid.

As used herein, the terms "effective amount," "effective concentration" and "effective amount/concentration" refer to an amount or concentration that is sufficient to cause a desired effect (e.g. LCO solubilization). The absolute value of the amount/concentration that is sufficient to cause the desired effect may be affected by factors such as the magnitude of effect desired, the structure of the LCO molecule(s) in the composition, the amount/concentration of LCO molecules in the composition, and storage conditions (e.g., temperature, duration). Those skilled in the art will understand how to select an effective amount/concentration using routine dose-response experiments.

As used herein, the term "foliage" refers to those portions of a plant that normally grow above the ground, including, but not limited to, leaves, stalks, stems, flowers, fruiting bodies and fruits.

As used herein, the terms "foliar application" and "foliarly applied" refer to the application of one or more active ingredients to the foliage of a plant (e.g., to the leaves of the plant). Application may be effected by any suitable means, including, but not limited to, spraying the plant with a composition comprising the active ingredient(s). In some embodiments, the active ingredient(s) is/are applied to the leaves, stems and/or stalk of the plant and not to the flowers, fruiting bodies or fruits of the plant.

As used herein, the terms "fungicide" and "fungicidal" refer to an agent or combination of agents the application of which is toxic to a fungus (i.e., kills a fungus, inhibits the growth of a fungus and/or inhibits the reproduction of a fungus).

As used herein, the term "fulvic acid" encompasses pure fulvic acids and fulvic acid salts (fulvates). Non-limiting examples of fulvic acids include ammonium fulvate, boron fulvate, potassium fulvate, sodium fulvate, etc. In some embodiments, the fulvic acid comprises, consists essentially of or consists MDL Number MFCD09838488 (CAS Number 479-66-3).

As used herein, the terms "herbicide" and "herbicidal" refer to an agent or combination of agents the application of which is toxic to a weed (i.e., kills a weed, inhibits the growth of a weed and/or inhibits the reproduction of a weed).

As used herein, the term "humic acid" encompasses pure humic acids and humic acid salts (humates). Non-limiting examples of humic acids include ammonium humate, boron humate, potassium humate, sodium humate, etc. In some embodiments, the humic acid comprises, consists essentially of or consists of one or more of MDL Number MFCD00147177 (CAS Number 1415-93-6), MDL Number MFCD00135560 (CAS Number 68131-04-4), MDL Number MFCS22495372 (CAS Number 68514-28-3), CAS Number 93924-35-7 and CAS Number 308067-45-0.

As used herein, the term "inoculant composition" refers to a composition comprising microbial cells and/or spores, said cells/spores being capable of propagating/germinating on or in a suitable growth medium or substrate (e.g., a soil) when conditions (e.g., temperature, moisture, nutrient availability, pH, etc.) are favorable for germination and/or microbial growth.

As used herein, the terms "insecticide" and "insecticidal" refer to an agent or combination of agents the application of which is toxic to an insect (i.e., kills an insect, inhibits the growth of an insect and/or inhibits the reproduction of an insect).

As used herein, the term "isomer" includes all stereoisomers of the compounds and/or molecules to which it refers, including enantiomers and diastereomers, as well as all conformers, roatmers and tautomers, unless otherwise indicated. Compounds and/or molecules disclosed herein include all enantiomers in either substantially pure levorotatory or dextrorotatory form, or in a racemic mixture, or in any ratio of enantiomers. Where embodiments disclose a (D)-enantiomer, that embodiment also includes the (L)-enantiomer; where embodiments disclose a (L)-enantiomer, that embodiment also includes the (D)-enantiomer. Where embodiments disclose a (+)-enantiomer, that embodiment also includes the (−)-enantiomer; where embodiments disclose a (−)-enantiomer, that embodiment also includes the (+)-enantiomer. Where embodiments disclose a (S)-enantiomer, that embodiment also includes the (R)-enantiomer; where embodiments disclose a (R)-enantiomer, that embodiment also includes the (S)-enantiomer. Embodiments are intended to include any diastereomers of the compounds and/or molecules referred to herein in diastereomerically pure form and in the form of mixtures in all ratios. Unless stereochemistry is explicitly indicated in a chemical structure or chemical name, the chemical structure or chemical name is intended to embrace all possible stereoisomers, conformers, rotamers and tautomers of compounds and/or molecules depicted.

As used herein, the terms "nematicide" and "nematicidal" refer to an agent or combination of agents the application of which is toxic to a nematode (i.e., kills a nematode, inhibits the growth of a nematode and/or inhibits the reproduction of a nematode).

As used herein, the term "nitrogen fixing organism" refers to an organism capable of converting atmospheric nitrogen ($N_2$) into a form that may be utilized by a plant or plant part (e.g., ammonia ($NH_3$), ammonium ($NH_4^+$), etc.).

As used herein, the term "nutrient" refers to a compound or element useful for nourishing a plant (e.g., vitamins, macrominerals, micronutrients, trace minerals, organic acids, etc. that are necessary for plant growth and/or development).

As used herein, the term "*Penicillium bilaiae*" is intended to include all iterations of the species name, such as "*Penicillium bilaji*" and "*Penicillium bilaii.*"

As used herein, the term "pest" includes any organism or virus that negatively affects a plant, including, but not limited to, organisms and viruses that spread disease, damage host plants and/or compete for soil nutrients. The term "pest" encompasses organisms and viruses that are known to associate with plants and to cause a detrimental effect on the plant's health and/or vigor. Plant pests include, but are not limited to, arachnids (e.g., mites, ticks, spiders, etc.), bacteria, fungi, gastropods (e.g., slugs, snails, etc.), invasive plants (e.g., weeds), insects (e.g., white flies, thrips, weevils, etc.), nematodes (e.g., root-knot nematode, soybean cyst nematode, etc.), rodents and viruses (e.g., tobacco mosaic virus (TMV), tomato spotted wilt virus (TSWV), cauliflower mosaic virus (CaMV), etc.).

As used herein, the terms "pesticide" and "pesticidal" refer to agents or combinations of agents the application of which is toxic to a pest (i.e., kills a pest, inhibits the growth of a pest and/or inhibits the reproduction of a pest). Non-limiting examples of pesticides include acaricides, fungicides, herbicides, insecticides, and nematicides, etc.

As used herein, the term "phosphate-solubilizing microorganism" refers to a microorganism capable of converting insoluble phosphate into a soluble form of phosphate.

As used herein, the term "plant" includes all plant populations, including, but not limited to, agricultural, horticultural and silvicultural plants. The term "plant" encompasses plants obtained by conventional plant breeding and optimization methods (e.g., marker-assisted selection) and plants obtained by genetic engineering, including cultivars protectable and not protectable by plant breeders' rights.

As used herein, the term "plant cell" refers to a cell of an intact plant, a cell taken from a plant, or a cell derived from a cell taken from a plant. Thus, the term "plant cell" includes cells within seeds, suspension cultures, embryos, meristematic regions, callus tissue, leaves, shoots, gametophytes, sporophytes, pollen and microspores.

As used herein, the term "plant part" refers to any part of a plant, including cells and tissues derived from plants. Thus, the term "plant part" may refer to any of plant components or organs (e.g., leaves, stems, roots, etc.), plant tissues, plant cells and seeds. Examples of plant parts, include, but are not limited to, anthers, embryos, flowers, fruits, fruiting bodies, leaves, ovules, pollen, rhizomes, roots, seeds, shoots, stems and tubers, as well as scions, rootstocks, protoplasts, calli and the like.

As used herein, the term "plant propagation material" refers to a plant part from which a whole plant can be generated. Examples of plant propagation materials include, but are not limited to, cuttings (e.g., leaves, stems), rhizomes, seeds, tubers and cells/tissues that can be cultured into a whole plant.

As used herein, the terms "spore" and "microbial spore" refer to a microorganism in its dormant, protected state.

As used herein, the term "stabilizing compound" refers to an agent or combination of agents the application of which enhances the survival and/or stability of a microorganism in an inoculant composition.

As used herein with respect to inoculant compositions, the term "stable" refers to an inoculant composition in which microorganisms exhibit enhanced stability and/or enhanced survival. In general, an inoculant composition may be labelled "stable" if it improves the survival rate and/or at least one microbial stability characteristic of at least one microorganism contained therein.

As used herein with respect to microbial strains, the term "survival rate" refers to the percentage of microbial cell/spore that are viable (i.e., capable of propagating on or in a suitable growth medium or substrate (e.g., a soil) when conditions (e.g., temperature, moisture, nutrient availability, pH, etc.) are favorable for germination and/or microbial growth) at a given period of time.

While certain aspects of the present disclosure will hereinafter be described with reference to embodiments thereof, it will be understood by those of ordinary skill in the art that various changes in form and details may be made therein without departing from the spirit and scope of the present disclosure as defined by the claims All publications, patent applications, patents and other references mentioned herein are incorporated by reference in their entirety, except insofar as they contradict any disclosure expressly set forth herein.

Applicants have discovered that surfactants comprising, consisting essentially of or consisting of a hydrophilic head and a hydrophobic tail comprising a carbon chain that is about/at least 8, 9, 10, 11, 12, 13, 14, 15 or 16 carbons in length may be used to reduce and/or prevent agglomeration of LCO molecules in aqueous solvents/compositions, to emulsify LCO molecules in aqueous solvents/compositions, and to facilitate the formation of micelles containing LCO molecules in aqueous solvents/compositions, thereby allowing for the solubilization of LCO molecules in aqueous solvents/compositions. The present disclosure thus encompasses each of the aforementioned uses, as well as methods of reducing and/or preventing LCO agglomeration, methods of emulsifying LCO molecules, methods of forming micelles containing LCO molecules, and methods of solubilizing LCO molecules in an aqueous solvent/composition. The present disclosure also encompasses novel and inventive aqueous LCO solutions.

Surfactants useful for reducing and/or preventing agglomeration of LCO molecules in an aqueous solvent/composition and/or emulsifying LCO molecules in an aqueous solvent/composition (hereinafter "anti-agglomeration surfactants") may comprise, consist essentially of or consist of:

an anionic head group (e.g., an oxyanionic head group comprising, consisting essentially of or consisting of a borate, carbonate, chromate, ferrate, nitrate, phosphate, sulfate or sulfonate) or a cationic head group (e.g., a quaternary ammonium ion); and a (saturated or unsaturated) hydrophobic tail group comprising, consisting essentially of or consisting of a linear hydrocarbon tail, optionally a linear hydrocarbon tail comprising a carbon chain that is about/at least 8, 9, 10, 11, 12, 13, 14, 15, or 16 carbons in length, a branched hydrocarbon tail, optionally a branched hydrocarbon tail comprising a carbon chain that is about/at least 8, 9, 10, 11, 12, 13, 14, 15, or 16 carbons in length, an aromatic hydrocarbon tail, optionally an aromatic hydrocarbon tail comprising a carbon chain that is about/at least 8, 9, 10, 11, 12, 13, 14, 15, or 16 carbons in length, an alkylbenzene, optionally an alkylbenzene comprising a carbon chain that is about/at least 8, 9, 10, 11, 12, 13, 14, 15, or 16 carbons in length, or a fatty acid, optionally an unbranched fatty acid comprising a carbon chain that is about/at least 8, 9, 10, 11, 12, 13, 14, 15, or 16 carbons in length.

In some embodiments, the hydrophobic tail comprises, consists essentially of or consists of an alkane (e.g., octane, nonan, decane, undecane, dodecane, etc.), alkene (e.g., octene, nonene, decene, undecene, dodecene, etc.), alkadiene (e.g., octadiene, nonadiene, decadiene, undecadiene, dodecadiene, etc.), or alkyne (octyne, nonyne, decyne, undecyne, dodecyne, etc.).

In some embodiments, the hydrophobic tail comprises, consists essentially of or consists of a branched alkane (e.g., methyloctane, methylnonene, methyldecane, methylundecane, methyldodecane, etc.), alkene (e.g., methyloctene, methylnonene, methyldecene, methylundecene, methyldodecene, etc.), alkadiene (e.g., methyloctadiene, methylnonadiene, methyldecadiene, methylundecadiene, methyldodecadiene, etc.), or alkyne (methyloctyne, methylnonyne, methyldecyne, methylundecyne, methyldodecyne, etc.).

In some embodiments, the hydrophobic tail comprises, consists essentially of or consists of a cycloalkane (e.g., cyclooctane, cyclononene, cyclodecane, cycloundecane, cyclododecane etc.), cycloalkene (e.g., cyclooctene, cyclononene, cyclodecene, cycloundecene, cyclododecene etc.), cycloalkadiene (e.g., cyclooctadiene, cyclononadiene, cyclodecadiene, cycloundecadiene, cyclododecadiene etc.) or cycloalkyne (e.g., cyclooctyne, cyclononyne, cyclodecyne, cycloundecyne, cyclododecyne etc.).

In some embodiments, the hydrophobic tail comprises, consists essentially of or consists of a linear alkylbenzene (e.g., octylbenzene, nonylbenzebe, decylbenzene, undecylbenzene, dodecylbenzene, etc.)

In some embodiments, the hydrophobic tail comprises, consists essentially of or consists of a fatty acid (e.g., capric acid, caprylic acid, lauric acid, myristic acid, myristoleic acid, palmitic acid, palmitoleic acid, sapienic acid, etc.).

In some embodiments, the hydrophobic tail comprises, consists essentially of or consists of a phospholipid (e.g., phosphatidylcholine, phosphatidylserine, etc.).

Non-limiting examples of deagglomeration surfactants that may be used to reduce and/or prevent agglomeration of LCO molecules in an aqueous solvent/composition, emulsify LCO molecules in an aqueous solvent/composition, facilitate the formation of micelles containing LCO molecules in an aqueous solvent/composition, and solubilize LCO molecules in an aqueous solvent/composition include alkyl sulfates (e.g., octyl sulfates, nonyl sulfates, decyl sulfates, undecyl sulfates and dodecyl sulfates) and alkyl sulfonates (e.g., alkylbenzene sulfonates, such as alkyl ($C_{10-16}$)benzene sulfonates).

It is to be understood that anti-agglomeration surfactants may be used individually or in combination.

As indicated above, the present disclosure extends beyond new and inventive uses for surfactants having a hydrophilic head and a hydrophobic tail comprising a carbon chain that is about/at least 8, 9, 10, 11, 12, 13, 14, 15 or 16 carbons in length and encompasses methods of reducing and/or preventing LCO agglomeration, methods of emulsifying LCO molecules, methods of forming micelles containing LCO molecules, and methods of solubilizing LCO molecules in an aqueous solvent/composition.

In some embodiments, methods of the present disclosure comprise, consist essentially of or consist of contacting LCO molecules in an aqueous solvent/composition with one or more anti-agglomeration surfactants in an amount/concentration sufficient to reduce and/or prevent agglomeration of said LCO molecules. According to some embodiments, the anti-agglomeration surfactant(s) is/are used in an amount/concentration sufficient to reduce and/or prevent agglomeration of said LCO molecules by about/at least 5, 10, 15, 20, 25, 30, 35, 40, 45, 50, 60, 65, 70, 75, 80, 85, 90, 95% or more as compared to LCO molecules in a control composition that is identical to the treated aqueous solvent/composition except insofar as it lacks said one or more surfactants. According to some embodiments, the anti-agglomeration surfactant(s) is/are used in an amount/concentration sufficient to eliminate and/or completely prevent agglomeration of said LCO molecules. According to some embodiments, the anti-agglomeration surfactant(s) is/are used in an amount/concentration sufficient to reduce and/or prevent agglomeration of said LCO molecules (e.g., by about/at least 50, 60, 65, 70, 75, 80, 85, 90, 95% or more) when said aqueous solvent/composition is stored at or below 0, 1, 2, 3, 4, 5, 6, 7, 8, 9, 10, 11, 12, 13, 14, 15, 16, 17 18, 19 or 20° C. for a period of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 months or more.

In some embodiments, methods of the present disclosure comprise, consist essentially of or consists of contacting LCO molecules in an aqueous solvent/composition with one or more anti-agglomeration surfactants in an amount/concentration sufficient to emulsify said LCO molecules with said aqueous solvent/composition. According to some embodiments, the anti-agglomeration surfactant(s) is/are used in an amount/concentration sufficient to emulsify about/at least 5, 10, 15, 20, 25, 30, 35, 40, 45, 50, 60, 65, 70, 75, 80, 85, 90, 91, 92, 93, 94, 95, 96, 97, 98, 99% or more of said LCO molecules in said aqueous solvent/composition. According to some embodiments, the anti-agglomeration surfactant(s) is/are used in an amount/concentration sufficient to emulsify all (or substantially all) of said LCO molecules in said aqueous solvent/composition. According to some embodiments, the anti-agglomeration surfactant(s) is/are used in an amount/concentration sufficient to ensure that at least a portion (e.g., about/at least 50, 60, 65, 70, 75, 80, 85, 90, 95% or more) of said LCO molecules remains emulsified in said aqueous solvent/composition following storage at or below 0, 1, 2, 3, 4, 5, 6, 7, 8, 9, 10, 11, 12, 13, 14, 15, 16, 17 18, 19 or 20° C. for a period of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 months or more.

In some embodiments, methods of the present disclosure comprise, consist essentially of or consists of contacting LCO molecules in an aqueous solvent/composition with one or more anti-agglomeration surfactants in an amount/concentration sufficient to solubilize said LCO molecules in said aqueous solvent/composition. According to some embodiments, the anti-agglomeration surfactant(s) is/are used in an amount/concentration sufficient to solubilize about/at least 5, 10, 15, 20, 25, 30, 35, 40, 45, 50, 60, 65, 70, 75, 80, 85, 90, 91, 92, 93, 94, 95, 96, 97, 98, 99% or more of said LCO molecules in said aqueous solvent/composition. According to some embodiments, the anti-agglomeration surfactant(s) is/are used in an amount/concentration sufficient to solubilize all (or substantially all) of said LCO molecules in said aqueous solvent/composition. According to some embodiments, the anti-agglomeration surfactant(s) is/are used in an amount/concentration sufficient to ensure that at least a portion (e.g., about/at least 50, 60, 65, 70, 75, 80, 85, 90, 95% or more) of said LCO molecules remains solubilized in said aqueous solvent/composition following storage at or below 0, 1, 2, 3, 4, 5, 6, 7, 8, 9, 10, 11, 12, 13, 14, 15, 16, 17 18, 19 or 20° C. for a period of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 months or more.

In some embodiments, methods of the present disclosure comprise, consist essentially of or consist of contacting LCO molecules in an aqueous solvent/composition with one or more anti-agglomeration surfactants in an amount/concentration sufficient to ensure that at least a portion of said LCO molecules will remain in said aqueous solvent/composition after it is passed through a filter having an average pore size of 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4 µm or smaller. According to some embodiments, the anti-agglomeration surfactant(s) is/are used in an amount/concentration sufficient to ensure that about/at least 5, 10, 15, 20, 25, 30, 35, 40, 45, 50, 60, 65, 70, 75, 80, 85, 90, 95% or more of said LCO molecules will remain in said aqueous solvent/composition after it is passed through a filter having an average pore size of 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4 µm or smaller at or below 0, 1, 2, 3, 4, 5, 6, 7, 8, 9, 10, 11, 12, 13, 14, 15, 16, 17 18, 19 or 20° C. According to some embodiments, the anti-agglomeration surfactant(s) is/are used in an amount/concentration sufficient to ensure that all (or substantially all) of said LCO molecules will remain in said aqueous solvent/composition after it is passed through a filter having an average pore size of 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4 µm or smaller at or below 0, 1, 2, 3, 4, 5, 6, 7, 8, 9, 10, 11, 12, 13, 14, 15, 16, 17 18, 19 or 20° C. According to some embodiments, the anti-agglomeration surfactant(s) is/are used in an amount/concentration sufficient to ensure that at least a portion (e.g., about/at least 50, 60, 65, 70, 75, 80, 85, 90, 95% or more) of said LCO molecules will remain in said aqueous solvent/composition after it is passed through a filter having an average pore size of 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4 µm or smaller at or below 0, 1, 2, 3, 4, 5, 6, 7, 8, 9, 10, 11, 12, 13, 14, 15, 16, 17 18, 19 or 20° C. following storage at or below 0, 1, 2, 3, 4, 5, 6, 7, 8, 9, 10, 11, 12, 13, 14, 15, 16, 17 18, 19 or 20° C. for a period of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 months or more.

Reducing and/or preventing agglomeration of LCO molecules in an aqueous solvent/composition (or emulsifying LCO molecules with an aqueous solvent/composition) allows for micellar solubilization of said LCO molecules in said aqueous solvent/composition. The present disclosure thus extends to methods of micellar solubilization.

In some embodiments, methods of the present disclosure comprise, consist essentially of or consist of incorporating LCO molecules that have been deagglomerated and/or emulsified with an aqueous solvent/composition into micelles. Such embodiments, may comprise, consist essentially of or consist of contacting said LCO molecules with one or more micelle-forming surfactants in an amount/concentration sufficient to form micelles comprising at least a portion of said LCO molecules (e.g., that portion of said LCO molecules that are not agglomerated). According to some embodiments, the micelle-forming surfactant(s) is/are used in amounts/concentrations sufficient to incorporate about/at least 5, 10, 15, 20, 25, 30, 35, 40, 45, 50, 60, 65, 70, 75, 80, 85, 90, 91, 92, 93, 94, 95, 96, 97, 98, 99% or more of said LCO molecules into micelles. According to some embodiments, the micelle-forming surfactant(s) is/are used in amounts/concentrations sufficient to incorporate all (or substantially all) of said LCO molecules into micelles. According to some embodiments, the micelle-forming surfactant(s) is/are used in amounts/concentrations sufficient to ensure that at least a portion (e.g., about/at least 50, 60, 65, 70, 75, 80, 85, 90, 95% or more) of said LCO molecules remains localized in micelles following storage at or below 0, 1, 2, 3, 4, 5, 6, 7, 8, 9, 10, 11, 12, 13, 14, 15, 16, 17 18, 19 or 20° C. for a period of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 months or more.

In some embodiments, methods of the present disclosure comprise, consist essentially of or consist of contacting LCO molecules in an aqueous solvent/composition with one or more anti-agglomeration surfactants in an amount/concentration sufficient to reduce and/or prevent agglomeration of said LCO molecules and/or to emulsify said LCO molecules with said aqueous solvent/composition and to form micelles comprising at least a portion of said LCO molecules (e.g., that portion of said LCO molecules that are not agglomerated). According to some embodiments, the anti-agglomeration surfactant(s) is/are used in an amount/concentration sufficient to incorporate about/at least 5, 10, 15, 20, 25, 30, 35, 40, 45, 50, 60, 65, 70, 75, 80, 85, 90, 91, 92, 93, 94, 95, 96, 97, 98, 99% or more of said LCO molecules into micelles. According to some embodiments, the anti-agglomeration surfactant(s) is/are used in an amount/concentration sufficient to incorporate all (or substantially all) of said LCO molecules into micelles. According to some embodiments, the anti-agglomeration surfactant(s) is/are used in an amount/concentration sufficient to ensure that at least a portion (e.g., about/at least 50, 60, 65, 70, 75, 80, 85, 90, 95% or more) of said LCO molecules remains localized in micelles following storage at or below 0, 1, 2, 3, 4, 5, 6, 7, 8, 9, 10, 11, 12, 13, 14, 15, 16, 17 18, 19 or 20° C. for a period of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 months or more.

In some embodiments, methods of the present disclosure comprise, consist essentially of or consist of contacting LCO molecules in an aqueous solvent/composition with one or more anti-agglomeration surfactants in an amount/concentration sufficient to reduce and/or prevent agglomeration of said LCO molecules and/or to emulsify said LCO molecules with said aqueous solvent/composition and further contacting said LCO molecules with one or more micelle-forming surfactants in an amount/concentration sufficient to form micelles comprising at least a portion of said LCO molecules (e.g., that portion of said LCO molecules that are not agglomerated). According to some embodiments, the anti-agglomeration surfactant(s) and micelle-forming surfactant(s) are used in amounts/concentrations sufficient to incorporate about/at least 5, 10, 15, 20, 25, 30, 35, 40, 45, 50, 60, 65, 70, 75, 80, 85, 90, 91, 92, 93, 94, 95, 96, 97, 98, 99% or more of said LCO molecules into micelles. According to some embodiments, the anti-agglomeration surfactant(s) and micelle-forming surfactant(s) are used in amounts/concentrations sufficient to incorporate all (or substantially all) of said LCO molecules into micelles. According to some embodiments, the anti-agglomeration surfactant(s) and micelle-forming surfactant(s) are used in amounts/concentrations sufficient to ensure that at least a portion (e.g., about/at least 50, 60, 65, 70, 75, 80, 85, 90, 95% or more) of said LCO molecules remains localized in micelles following storage at or below 0, 1, 2, 3, 4, 5, 6, 7, 8, 9, 10, 11, 12, 13, 14, 15, 16, 17 18, 19 or 20° C. for a period of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 months or more.

In some embodiments, methods of the present disclosure comprise, consist essentially of or consist of contacting LCO molecules in an aqueous solvent/composition with one or more anti-agglomeration surfactants in an amount/concentration sufficient to reduce and/or prevent agglomeration of said LCO molecules and/or to emulsify said LCO molecules with said aqueous solvent/composition and further contacting said LCO molecules with one or more micelle-forming surfactants in an amount/concentration sufficient to ensure that at least a portion of said LCO molecules (e.g., that portion of said LCO molecules that are not agglomerated) will remain in said aqueous solvent/composition after it is passed through a filter having an average pore size of 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4 µm or smaller. According to some embodiments, the anti-agglomeration surfactant(s) and micelle-forming surfactant(s) are used in amounts/concentrations sufficient to ensure that about/at least 5, 10, 15, 20, 25, 30, 35, 40, 45, 50, 60, 65, 70, 75, 80, 85, 90, 95% or more of said LCO molecules will remain in said aqueous solvent/composition after it is passed through a filter having an average pore size of 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4 µm or smaller at or below 0, 1, 2, 3, 4, 5, 6, 7, 8, 9, 10, 11, 12, 13, 14, 15, 16, 17 18, 19 or 20° C. According to some embodiments, the anti-agglomeration surfactant(s) and micelle-forming surfactant(s) are used in amounts/concentrations sufficient to ensure that all (or substantially all) of said LCO molecules will remain in said aqueous solvent/composition after it is passed through a filter having an average pore size of 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4 µm or smaller at or below 0, 1, 2, 3, 4, 5, 6, 7, 8, 9, 10, 11, 12, 13, 14, 15, 16, 17 18, 19 or 20° C. According to some embodiments, the anti-agglomeration surfactant(s) and micelle-forming surfactant(s) are used in amounts/concentrations sufficient to ensure that at least a portion (e.g., about/at least 50, 60, 65, 70, 75, 80, 85, 90, 95% or more) of said LCO molecules will remain in said aqueous solvent/composition after it is passed through a filter having an average pore size of 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4 µm or smaller at or below 0, 1, 2, 3, 4, 5, 6, 7, 8, 9, 10, 11, 12, 13, 14, 15, 16, 17 18, 19 or 20° C. following storage at or below 0, 1, 2, 3, 4, 5, 6, 7, 8, 9, 10, 11, 12, 13, 14, 15, 16, 17 18, 19 or 20° C. for a period of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 months or more.

In summary, some embodiments of the present disclosure comprise, consist essentially of or consist of contacting LCO molecules in an aqueous solvent/composition with one or more anti-agglomeration surfactants and one or more micelle-forming surfactants amounts/concentrations sufficient to solubilize said LCO molecules in said aqueous solvent/composition. According to some embodiments, the anti-agglomeration surfactant(s) and micelle-forming surfactant(s) are used in amounts/concentrations sufficient to solubilize about/at least 5, 10, 15, 20, 25, 30, 35, 40, 45, 50, 60, 65, 70, 75, 80, 85, 90, 95% or more of said LCO molecules in said aqueous solvent/composition. According to some embodiments, the anti-agglomeration surfactant(s) and micelle-forming surfactant(s) are used in amounts/concentrations sufficient to solubilize all (or substantially all) of said LCO molecules in said aqueous solvent/composition. According to some embodiments, the anti-agglomeration surfactant(s) and micelle-forming surfactant(s) are used in amounts/concentrations sufficient to ensure that at least a portion (e.g., about/at least 50, 60, 65, 70, 75, 80, 85, 90, 95% or more) of said LCO molecules remains solubilized in said aqueous solvent/composition following storage at or below 0, 1, 2, 3, 4, 5, 6, 7, 8, 9, 10, 11, 12, 13, 14, 15, 16, 17 18, 19 or 20° C. for a period of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 months or more. According to some embodiments, the anti-agglomeration surfactant(s) and micelle-forming surfactant(s) are used in amounts/concentrations sufficient to ensure that about/at least 5, 10, 15, 20, 25, 30, 35, 40, 45, 50, 60, 65, 70, 75, 80, 85, 90, 95% or more of said LCO molecules will remain in said aqueous solvent/composition after it is passed through a filter having an average pore size of 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4 µm or smaller at or below 0, 1, 2, 3, 4, 5, 6, 7, 8, 9, 10, 11, 12, 13, 14, 15, 16, 17 18, 19 or 20° C. According to some embodiments, the anti-agglomeration surfactant(s) and micelle-forming surfactant(s) are used in amounts/concentrations sufficient to ensure that all (or substantially all) of said LCO molecules will remain in said aqueous solvent/composition after it is passed through a filter having an average pore size of 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4 µm or smaller at or below 0, 1, 2, 3, 4, 5, 6, 7, 8, 9, 10, 11, 12, 13, 14, 15, 16, 17 18, 19 or 20° C. According to some embodiments, the anti-agglomeration surfactant(s) and micelle-forming surfactant(s) are used in amounts/concentrations sufficient to ensure that at least a portion (e.g., about/at least 50, 60, 65, 70, 75, 80, 85, 90, 95% or more) of said LCO molecules will remain in said aqueous solvent/composition after it is passed through a filter having an average pore size of 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4 µm or smaller at or below 0, 1, 2, 3, 4, 5, 6, 7, 8, 9, 10, 11, 12, 13, 14, 15, 16, 17 18, 19 or 20° C. following storage at or below 0, 1, 2, 3, 4, 5, 6, 7, 8, 9, 10, 11, 12, 13, 14, 15, 16, 17 18, 19 or 20° C. for a period of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 months or more.

The particular amount/concentration of anti-agglomeration surfactant(s) required to achieve a desired end (e.g., emulsification and micellar solubilization of about/at least 50, 60, 65, 70, 75, 80, 85, 90, 95% or more of the LCO molecules in an aqueous solvent/composition) will depend upon various factors, including, but not limited to, the structure(s) of the LCO molecules, the amount(s)/concentration(s) of LCO molecules, the identity(ies) of the aqueous solvent(s) in the composition, whether other solutes are/will be included in the composition, the pH of the solvent/composition, the temperature of the solvent/composition, the pH at which the composition will be stored, and the temperature(s) at which the composition will be stored. Those skilled in the art will understand how to select an effective amount/concentration using routine dose-response experiments.

In some embodiments, each anti-agglomeration surfactant is used at a concentration less than its critical micelle concentration.

In those embodiments, a combination of anti-agglomeration surfactants is used at a concentration less than the critical micelle concentration calculated for said combination.

In some embodiments, one or more anti-agglomeration surfactants is used at a concentration ranging from about 0.01 to about 0.5% w/w (based upon the total weight of the composition), optionally about/at least 0.01, 0.011, 0.012, 0.013, 0.014, 0.015, 0.016, 0.017, 0.018, 0.019 or 0.02 to about/less than 0.1, 0.11, 0.12, 0.13, 0.14, 0.15, 0.16, 0.17, 0.18, 0.19 or 0.20% w/w (based upon the total weight of the composition),optionally about 0.01, 0.015, 0.02, 0.025, 0.03, 0.035, 0.04, 0.045, 0.05.0.055, 0.06, 0.065, 0.07, 0.075, 0.08, 0.085, 0.09, 0.095, 0.1, 0.11, 0.12, 0.13, 0.14, 0.15, 0.16, 0.17, 0.18, 0.19 or 0.2% w/w (based upon the total weight of the composition).

As indicated above, some embodiments of the present disclosure comprise the use of one or more micelle-forming surfactants.

LCOs may be incorporated into micelles with nonionic surfactants comprising, consisting essentially of, or consisting of a hydrocarbon chain and an ethoxylate chain In some embodiments, the hydrocarbon chain comprises, consists essentially of or consists of a linear hydrocarbon chain, optionally a linear hydrocarbon chain that is about/at least 8, 9, 10, 11, 12, 13, 14, 15 or 16 carbons in length. The hydrophobic chain may comprise, consist essentially of or consist of saturated and/or unsaturated hydrocarbons. In some embodiments, the hydrophobic chain comprises, consists essentially of or consists of one or more alkanes (e.g., octane, nonan, decane, undecane, dodecane, etc.), alkenes (e.g., octene, nonene, decene, undecene, dodecene, etc.), alkadienes (ee.g., octadiene, nonadiene, decadiene, undecadiene, dodecadiene, etc.), and/or alkynes (octyne, nonyne, decyne, undecyne, dodecyne, etc.).

In some embodiments, the hydrocarbon chain comprises, consists essentially of or consists of a branched hydrocarbon chain, optionally a branched hydrocarbon chain comprising a carbon chain that is about/at least 8, 9, 10, 11, 12, 13, 14, 15, or 16 carbons in length. In some embodiments, the hydrophobic chain comprises, consists essentially of or consists of one or more branched alkanes (e.g., methyloctanes, methylnonenes, methyldecanes, methylundecanes, methyldodecanes, etc.), alkenes (e.g., methyloctenes, methylnonenes, methyldecenes, methylundecenes, methyldodecenes, etc.), alkadienes (ee.g., methyloctadienes, methylnonadienes, methyldecadienes, methylundecadienes, methyldodecadienes, etc.), and/or alkynes (methyloctynes, methylnonynes, methyldecynes, methylundecynes, methyldodecynes, etc.).

In some embodiments, the hydrocarbon chain comprises, consists essentially of or consists of an aromatic hydrocarbon chain, optionally an aromatic hydrocarbon chain comprising a carbon chain that is about/at least 8, 9, 10, 11, 12, 13, 14, 15, or 16 carbons in length. The hydrophobic chain may comprise, consist essentially of or consist of one, two, three or more aromatic rings. In some embodiments, the hydrophobic chain comprises, consists essentially of or consists of one or more cycloalkanes (e.g., cyclooctane, cyclononene, cyclodecane, cycloundecane, cyclododecane etc.), cycloalkenes (e.g., cyclooctene, cyclononene, cyclodecene, cycloundecene, cyclododecene etc.), cycloalkadienese (e.g., cyclooctadiene, cyclononadiene, cyclodecadiene, cycloundecadiene, cyclododecadiene etc.) and/or cycloalkynes (e.g., cyclooctyne, cyclononyne, cyclodecyne, cycloundecyne, cyclododecyne etc.).

In some embodiments, the hydrocarbon chain comprises, consists essentially of or consists of an alkylbenzene, optionally an alkylbenzene comprising a carbon chain that is about/at least 8, 9, 10, 11, 12, 13, 14, 15, or 16 carbons in length. In some embodiments, the hydrophobic chain comprises, consists essentially of or consists of one or more linear alkylbenzenes (e.g., octylbenzene, nonylbenzebe, decylbenzene, undecylbenzene, dodecylbenzene, etc.)

In some embodiments, the hydrocarbon chain comprises, consists essentially of or consists of one or more fatty acids, optionally an unbranched fatty acid comprising a carbon chain that is about/at least 8, 9, 10, 11, 12, 13, 14, 15, or 16 carbons in length. The hydrophobic chain may comprise, consist essentially of or consist of saturated (e.g., caprylic acid, capric acid, lauric acid, myristic acid, palmitic acid, etc.) and/or unsaturated fatty acids (e.g., myristoleic acid, palmitoleic acid, sapienic acid, etc.).

In some embodiments, the ethoxylate chain comprises, consists essentially of or consists of an unbranched ethoxylate chain, optionally an unbranched ethoxylate chain that is about/at least 3, 4, 5, 6, 7, 8, 9, 10, 11 or 12 ethylene oxides in length. The ethoxylate chain may comprise, consist essentially of or consist of saturated and/or unsaturated ethylene oxides.

In some embodiments, the ethoxylate chain comprises, consists essentially of or consists of a branched ethoxylate chain, optionally a branched ethoxylate chain comprising an ethylene oxide chain that is about/at least 3, 4, 5, 6, 7, 8, 9, 10, 11 or 12 ethylene oxides in length.

Non-limiting examples of surfactants that may be used to incorporate LCO molecules into micelles, include alcohol ethoxylates (e.g., isodecyl alcohol ethoxylates).

It is to be understood that micelle-forming surfactants may be used individually or in combination.

The amount/concentration of micelle-forming surfactant(s) required to incorporate LCO molecules into micelles will depend upon various factors, including, but not limited to, the structure(s) of the LCO molecules, the amount/concentration of LCO molecules, the identity(ies) of the aqueous solvent(s) in the composition, whether other molecules will be incorporated into the micelles, the pH of the composition, the temperature of the composition, the pH at which the composition will be stored, and the temperature(s) at which the composition will be stored. Those skilled in the art will understand how to select an effective amount/concentration using routine dose-response experiments.

In some embodiments, the surfactant(s) used to incorporate LCO molecules into micelles is/are used at a concentration ranging from about 0.001 to about 0.05% w/w (based upon the total weight of the composition), optionally about/at least 0.001, 0.0011, 0.0012, 0.0013, 0.0014, 0.0015, 0.0016, 0.0017, 0.0018, 0.0019, 0.002, 0.0021, 0.0022, 0.0023, 0.0024, 0.0025, 0.0026, 0.0027, 0.0028, 0.0029, 0.003, 0.0031, 0.0032, 0.0033, 0.0034, 0.0035, 0.0036, 0.0037, 0.0038, 0.0039, 0.004, 0.0041, 0.0042, 0.0043, 0.0044, 0.0045, 0.0046, 0.0047, 0.0048, 0.0049 or 0.005 to about/less than 0.01, 0.011, 0.012, 0.013, 0.014, 0.015, 0.016, 0.017, 0.018, 0.019, 0.02, 0.021, 0.022, 0.023, 0.024, 0.025, 0.026, 0.027, 0.028, 0.029, 0.03, 0.031, 0.032, 0.033, 0.034, 0.035, 0.036, 0.037, 0.038, 0.039, 0.04, 0.041, 0.042, 0.043, 0,044, 0.045, 0.046, 0.047, 0.048, 0,049 or 0.05% w/w (based upon the total weight of the composition), optionally about 0.001, 0.0015, 0.002, 0.0025, 0.003, 0.0035, 0.004, 0.0045, 0.005.0.0055, 0.006, 0.0065, 0.007, 0.0075, 0.008, 0.0085, 0.009, 0.0095, 0.01, 0.011, 0.012, 0.013, 0.014, 0.015, 0.016, 0.017, 0.018, 0.019 or 0.02% w/w (based upon the total weight of the composition).

The size(s) of the micelles into which LCO molecules are incorporated will depend upon various factors, including, but not limited to, the structure(s) of the LCO molecules and the structure(s) of the surfactant(s) included in the micelles.

In some embodiments, LCOs are incorporated into micelles having an average diameter ranging from about 0.1 to about 0.4 μm, optionally about/at least 0.1, 0.11, 0.12, 0.13, 0.14, 0.15, 0.16, 0.17, 0.18, 0.19 or 0.2 to about/less than 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39 or 0.4 μm, optionally about 0.15, 0.16, 0.17, 0.18, 0.19, 0.2, 0.21, 0.22, 0.23, 0.24, 0.25, 0.26, 0.27, 0.28, 0.29 or 0.3 μm.

It is to be understood that LCOs and surfactants may be combined in any suitable manner—LCOs may be introduced into a surfactant-containing aqueous solution/composition, surfactants may be introduced into an LCO-containing aqueous composition, LCOs and surfactants may be combined as solids, etc.

In those embodiments comprising the use of an anti-agglomeration surfactant (or combination of anti-agglomeration surfactants) and a micelle-forming surfactant (or combination of micelle-forming surfactants), the total surfactant amount/concentration required to achieve a desired end (e.g., emulsification and micellar solubilization of about/at least 50, 60, 65, 70, 75, 80, 85, 90, 95% or more of the LCO molecules in an aqueous solvent/composition) will depend upon various factors, including, but not limited to, the structure(s) of the LCO molecules, the amount/concentration of LCO molecules, the identity(ies) of the aqueous solvent(s) in the composition, whether other solutes are/will be included in the composition, the pH of the solvent/composition, the temperature of the solvent/composition, the pH at which the composition will be stored, and the temperature(s) at which the composition will be stored. Those skilled in the art will understand how to select an effective amount/concentration using routine dose-response experiments.

In some embodiments, each of the anti-agglomeration surfactant (or combination of anti-agglomeration surfactants) and the micelle-forming surfactant (or combination of micelle-forming surfactants) is used at a concentration less than its critical micelle concentration.

In those embodiments, the combination of the anti-agglomeration surfactant (or combination of anti-agglomeration surfactants) and micelle-forming surfactant (or combination of micelle-forming surfactants) is used at a concentration less than the critical micelle concentration calculated for said combination.

In some embodiments, the anti-agglomeration surfactant (or combination of anti-agglomeration surfactants) is/are used at a concentration ranging from about 0.01 to about 0.5% w/w (based upon the total weight of the composition), optionally about/at least 0.01, 0.011, 0.012, 0.013, 0.014, 0.015, 0.016, 0.017, 0.018, 0.019 or 0.02 to about/less than 0.1, 0.11, 0.12, 0.13, 0.14, 0.15, 0.16, 0.17, 0.18, 0.19 or 0.20% w/w (based upon the total weight of the composition),optionally about 0.01, 0.015, 0.02, 0.025, 0.03, 0.035, 0.04, 0.045, 0.05.0.055, 0.06, 0.065, 0.07, 0.075, 0.08, 0.085, 0.09, 0.095, 0.1, 0.11, 0.12, 0.13, 0.14, 0.15, 0.16, 0.17, 0.18, 0.19 or 0.2% w/w (based upon the total weight of the composition).

In some embodiments, the micelle-forming surfactant (or combination of micelle-forming surfactants) is/are used at a concentration ranging from about 0.001 to about 0.05% w/w (based upon the total weight of the composition), optionally about/at least 0.001, 0.0011, 0.0012, 0.0013, 0.0014, 0.0015, 0.0016, 0.0017, 0.0018, 0.0019, 0.002, 0.0021, 0.0022, 0.0023, 0.0024, 0.0025, 0.0026, 0.0027, 0.0028, 0.0029, 0.003, 0.0031, 0.0032, 0.0033, 0.0034, 0.0035, 0.0036, 0.0037, 0.0038, 0.0039, 0.004, 0.0041, 0.0042, 0.0043, 0.0044, 0.0045, 0.0046, 0.0047, 0.0048, 0.0049 or 0.005 to about/less than 0.01, 0.011, 0.012, 0.013, 0.014, 0.015, 0.016, 0.017, 0.018, 0.019, 0.02, 0.021, 0.022, 0.023, 0.024, 0.025, 0.026, 0.027, 0.028, 0.029, 0.03, 0.031, 0.032, 0.033, 0.034, 0.035, 0.036, 0.037, 0.038, 0.039, 0.04, 0.041, 0.042, 0.043, 0,044, 0.045, 0.046, 0.047, 0.048, 0,049 or 0.05% w/w (based upon the total weight of the composition), optionally about 0.001, 0.0015, 0.002, 0.0025, 0.003, 0.0035, 0.004, 0.0045, 0.005.0.0055, 0.006, 0.0065, 0.007, 0.0075, 0.008, 0.0085, 0.009, 0.0095, 0.01, 0.011, 0.012, 0.013, 0.014, 0.015, 0.016, 0.017, 0.018, 0.019 or 0.02% w/w (based upon the total weight of the composition).

It is to be understood that uses and methods of the present disclosure are applicable to temperature and pH conditions that would otherwise make it impractical (or even impossible) to reduce and/or prevent agglomeration of LCO molecules in an aqueous solvent/composition, to emulsify LCO molecules in an aqueous solvent/composition, to facilitate the formation of micelles containing LCO molecules in an aqueous solvent/composition, and/or to solubilize LCO molecules in an aqueous solvent/composition. In some embodiments, uses and methods of the present disclosure are carried out at a temperature less than 30° C., optionally about/less than 10, 11, 12, 13, 14, 15, 16, 17, 18, 19, 20, 21, 22, 23, 24 or 25° C., and/or at a pH ranging from about 6 to about 8, optionally about 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, or 8.

It is to be understood that uses and methods of the present disclosure are applicable to myriad LCOs, including, but not limited to, LCOs represented by formula I:

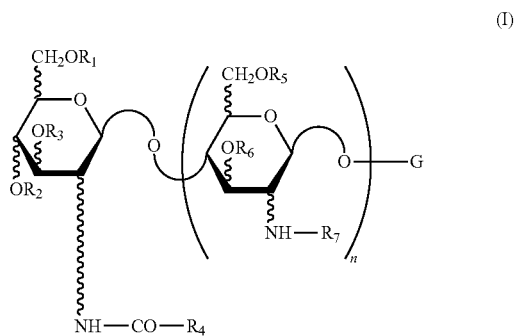

(I)

in which G is a hexosamine which can be substituted, for example, by an acetyl group on the nitrogen, a sulfate group, an acetyl group and/or an ether group on an oxygen; $R_1$, $R_2$, $R_3$, $R_5$, $R_6$ and $R_7$, which may be identical or different, represent H, $CH_3CO$—, $C_xH_yCO$— where x is an integer between 0 and 17 and y is an integer between 1 and 35, or any other acyl group such as, for example, a carbamoyl; $R_4$ represents a saturated or mono-, di- or tri-unsaturated aliphatic chain containing at least 12 carbon atoms; and n is an integer between 1 and 4.

In some embodiments, uses and methods of the present disclosure are applied to one, two, three, four, five or more LCOs represented by formula II:

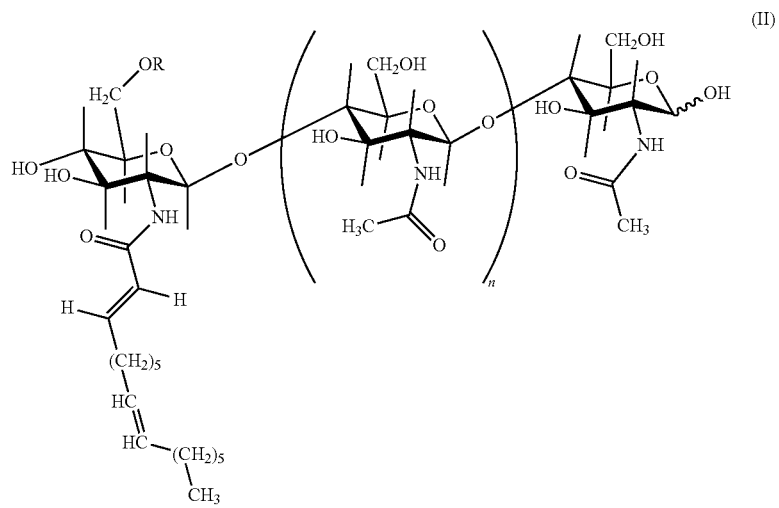

(II)

in which R represents H or $CH_3CO-$ and n is equal to 2 or 3. See, e.g., U.S. Pat. No. 5,549,718. A number of *Bradyrhizobium japonicum*-derived LCOs have also been described, including BjNod-V ($C_{18:1}$), BjNod-V ($A_C$, $C_{18:1}$), BjNod-V ($C_{16:1}$) and BjNod-V ($A_C$, $C_{16:0}$) (with "V" indicating the presence of five N-acetylglucosamines, "Ac" an acetylation, the number following the "C" indicating the number of carbons in the fatty acid side chain and the number following the ":" indicating the number of double bonds). See, e.g., U.S. Pat. Nos. 5,175,149 and 5,321,011. Additional LCOs obtained from bacterial strains include NodRM, NodRM-1, NodRM-3. When acetylated (the R=$CH_3CO-$), they become AcNodRM-1 and AcNodRM-3, respectively (U.S. Pat. No. 5,545,718).

In some embodiments, uses and methods of the present disclosure are applied to one, two, three, four, five or more LCOs represented by formula III:

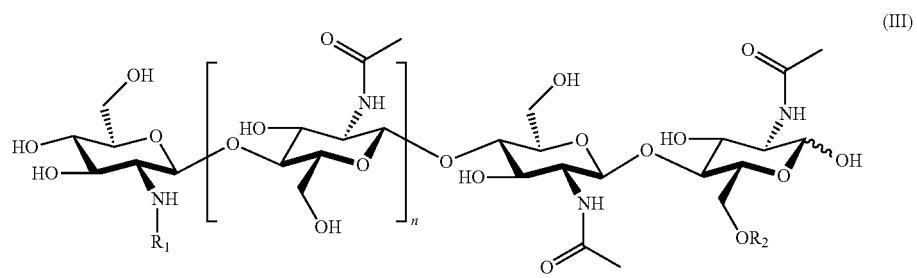

(III)

in which n=1 or 2; $R_1$ represents C16, C16:0, C16:1, C16:2, C18:0, C18:1Δ9Z or C18:1Δ11Z; and $R_2$ represents hydrogen or $SO_3H$.

In some embodiments, uses and methods of the present disclosure are applied to one, two, three, four, five or more LCOs represented by formula IV:

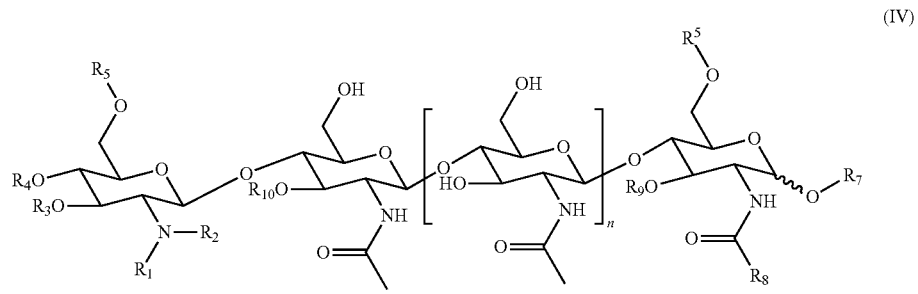

(IV)

in which $R_1$ represents C14:0, 3OH—C14:0, iso-C15:0, C16:0, 3-OH—C16:0, iso-C15:0, C16:1, C16:2, C16:3, iso-C17:0, iso-C17:1, C18:0, 3OH—C18:0, C18:0/3-OH, C18:1, OH—C18:1, C18:2, C18:3, C18:4, C19:1 carbamoyl, C20:0, C20:1, 3-OH—C20:1, C20:1/3-OH, C20:2, C20:3, C22:1 and C18-26(ω-1)-OH (which according to D'Haeze, et al., Glycobiology 12:79R-105R (2002), includes C18, C20, C22, C24 and C26 hydroxylated species and C16:1Δ9, C16:2 (Δ2,9) and C16:3 (Δ2,4,9)); $R_2$ represents hydrogen or methyl; $R_3$ represents hydrogen, acetyl or carbamoyl; $R_4$ represents hydrogen, acetyl or carbamoyl; $R_5$ represents hydrogen, acetyl or carbamoyl; $R_6$ represents hydrogen, arabinosyl, fucosyl, acetyl, $SO_3H$, sulfate ester, 3-0-S-2-0-MeFuc, 2-0-MeFuc and 4-0-AcFuc; $R_7$ represents hydrogen, mannosyl or glycerol; $R_8$ represents hydrogen, methyl, or —$CH_2OH$; $R_9$ represents hydrogen, arabinosyl, or fucosyl; $R_{10}$ represents hydrogen, acetyl or fucosyl; and n represents 0, 1, 2 or 3. Naturally occurring LCOs embraced by this structure are described in D'Haeze, et al., supra.

In some embodiments, uses and methods of the present disclosure are applied to one, two, three, four, five or more of the LCOs set forth below as structures V-XXXIII:

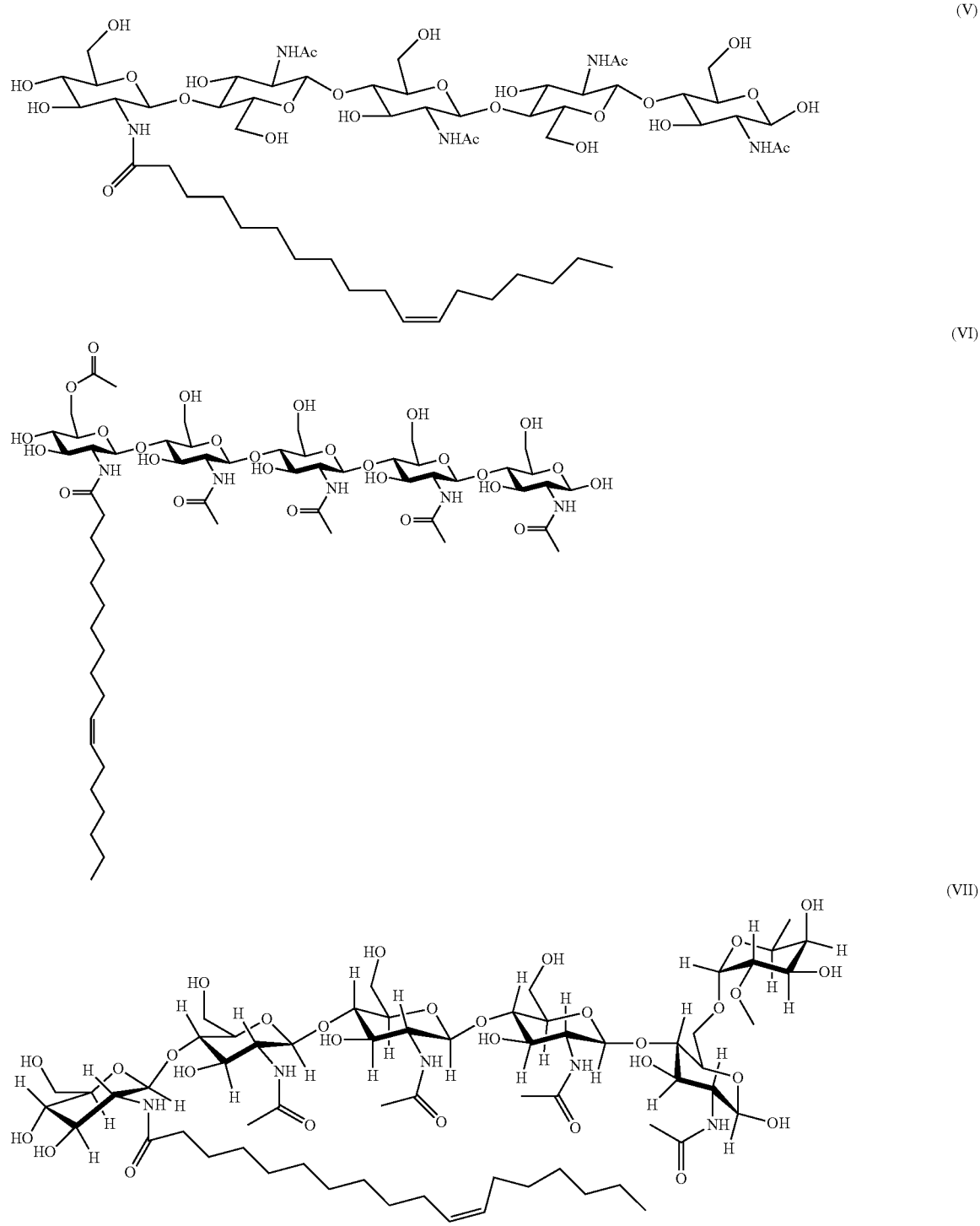

(VIII)
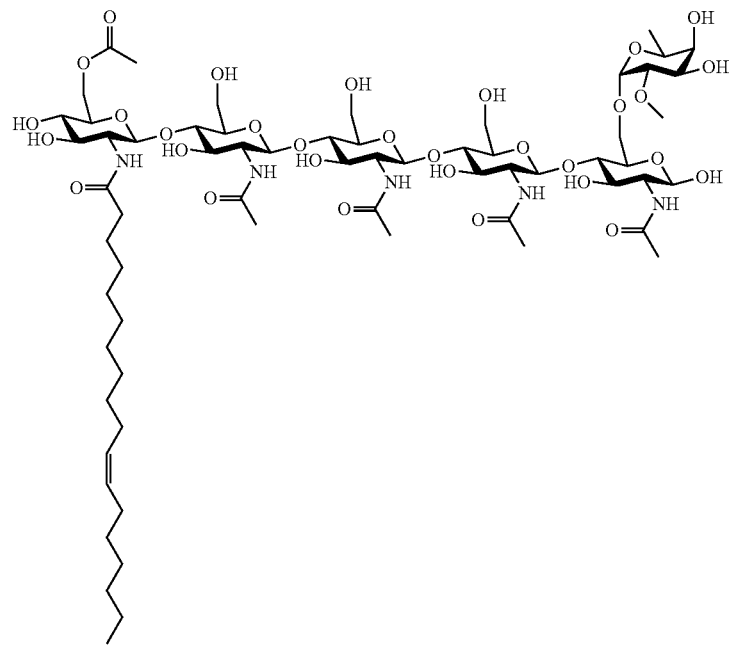
(IX)
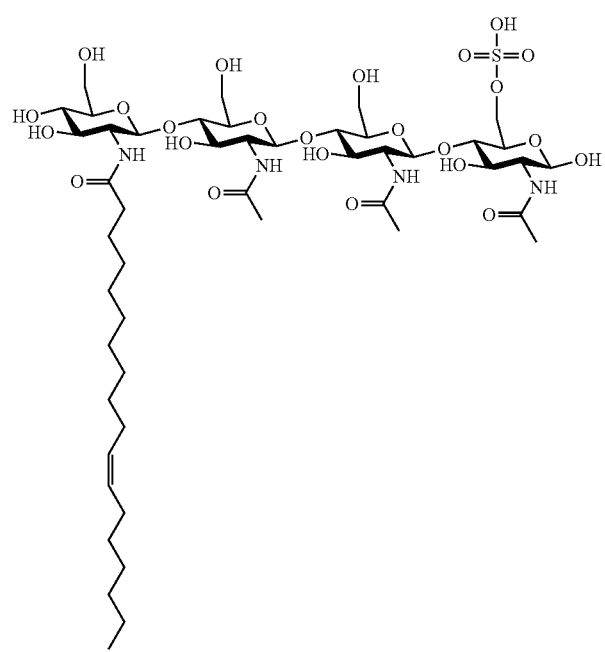

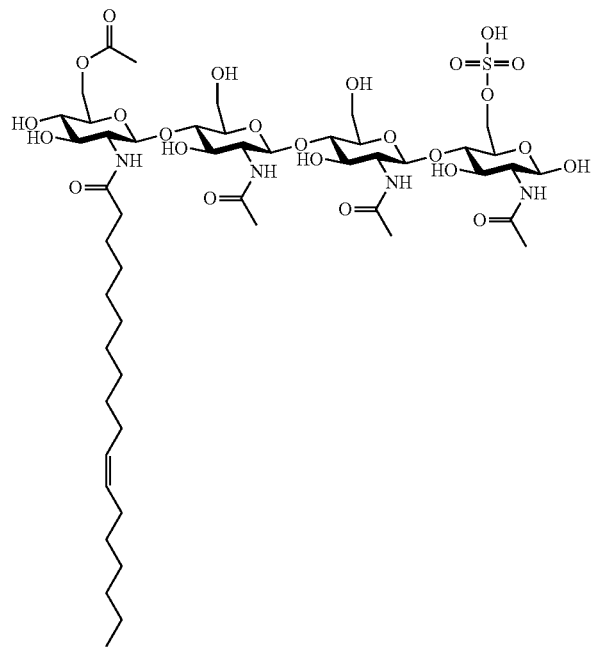
(X)
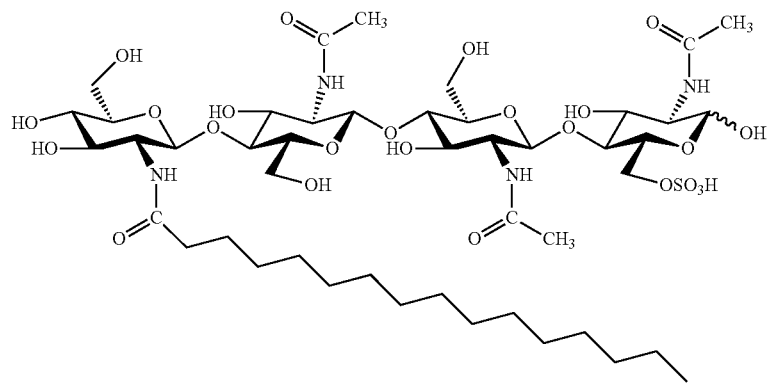
(XI)
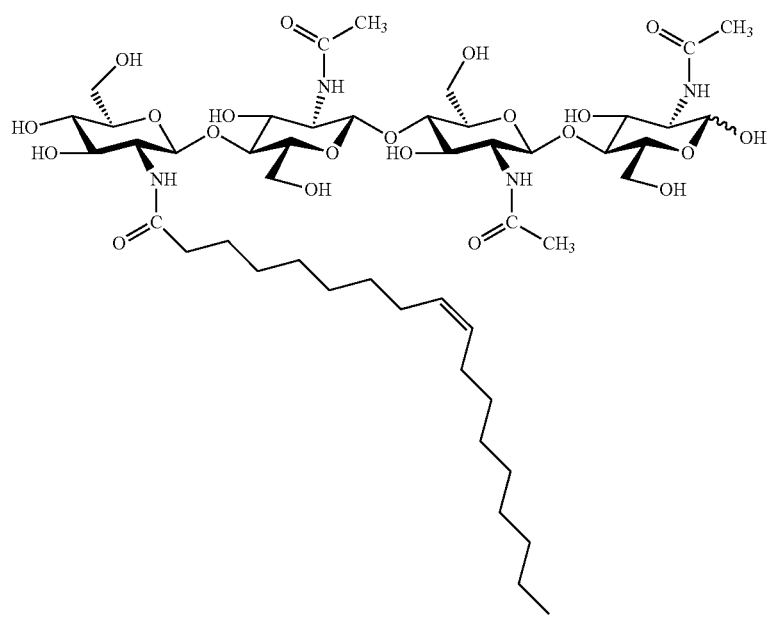
(XII)

-continued
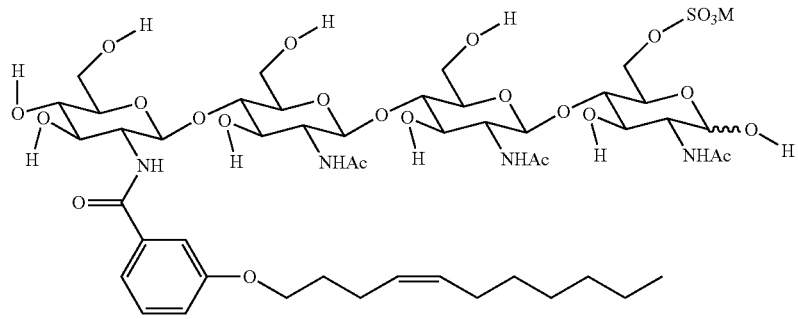
(XIII)
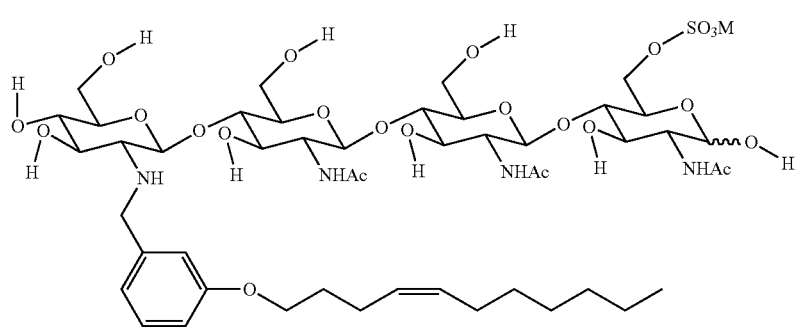
(XIV)
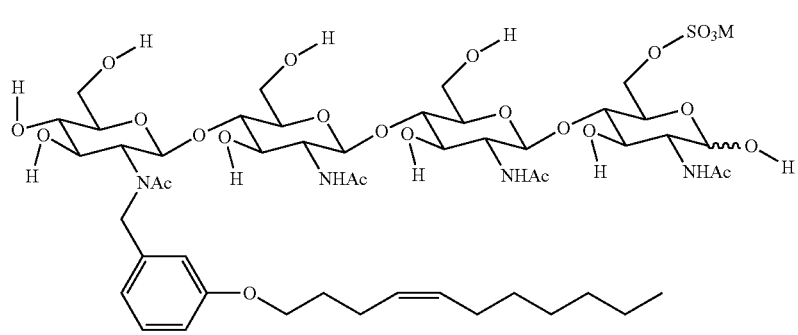
(XV)
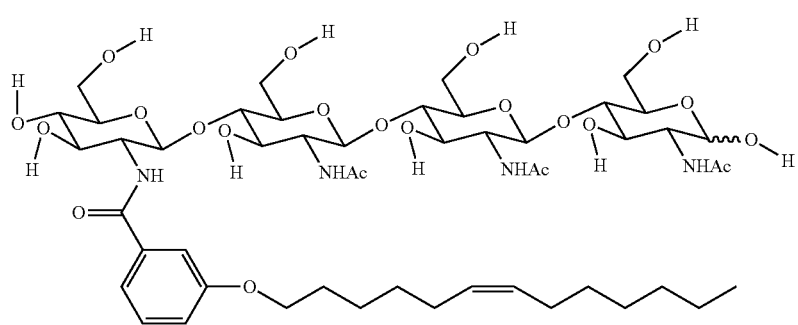
(XVI)
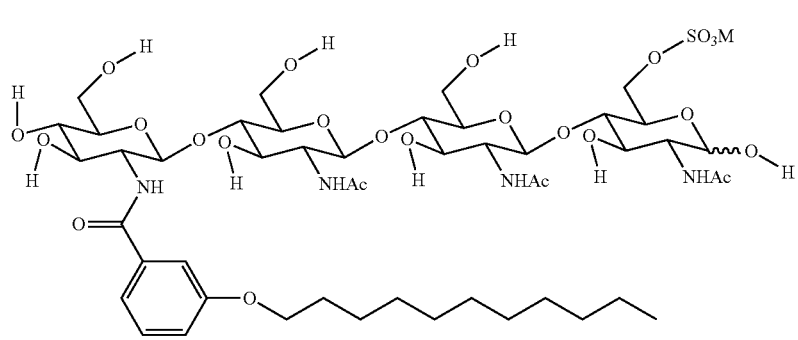
(XVII)

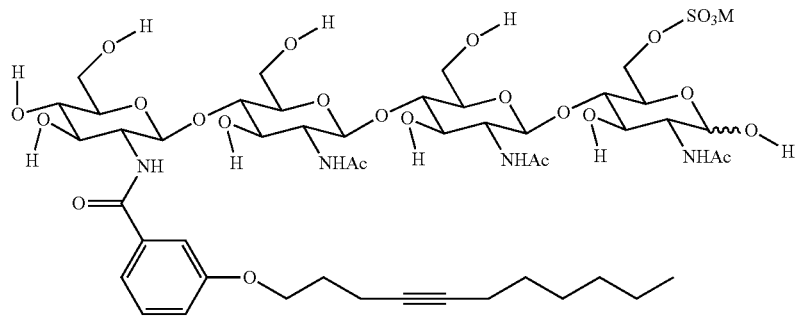
(XVIII)
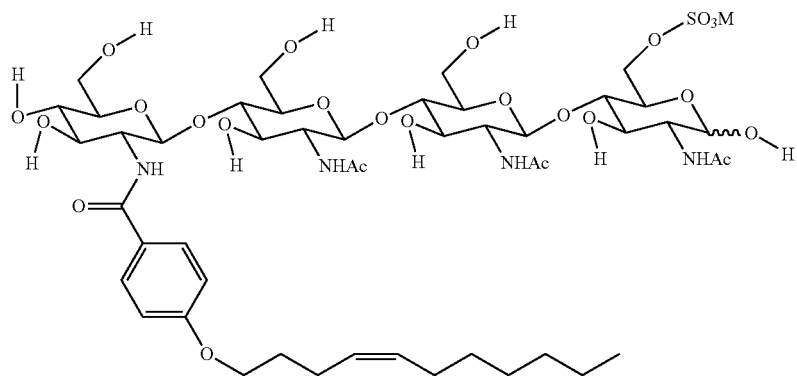
(XIX)
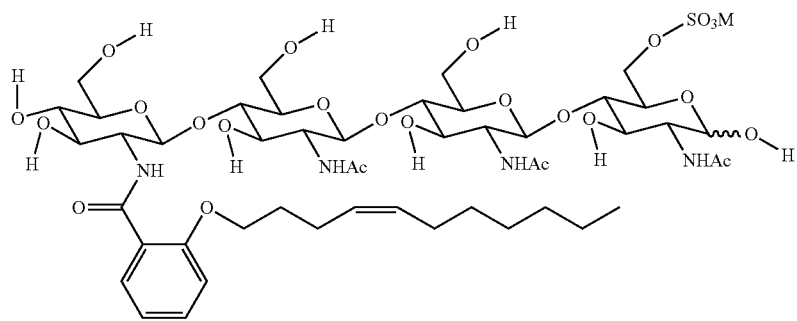
(XX)
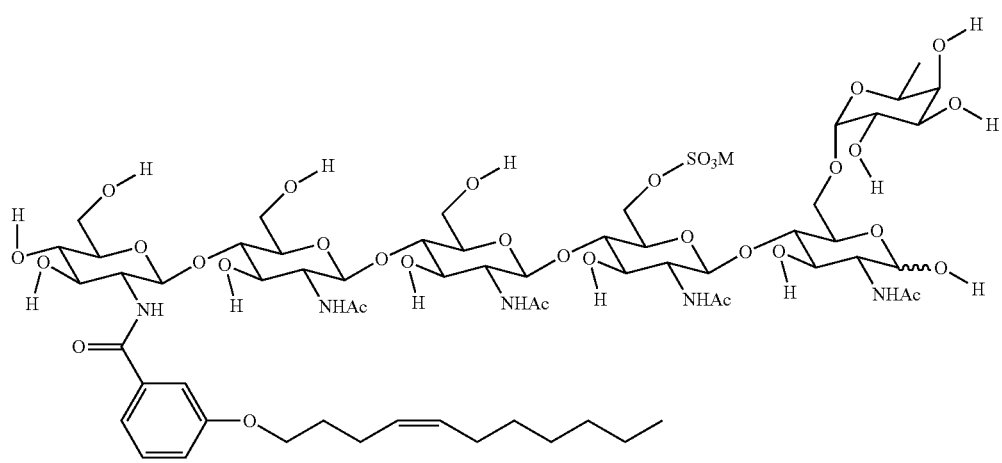
(XXI)

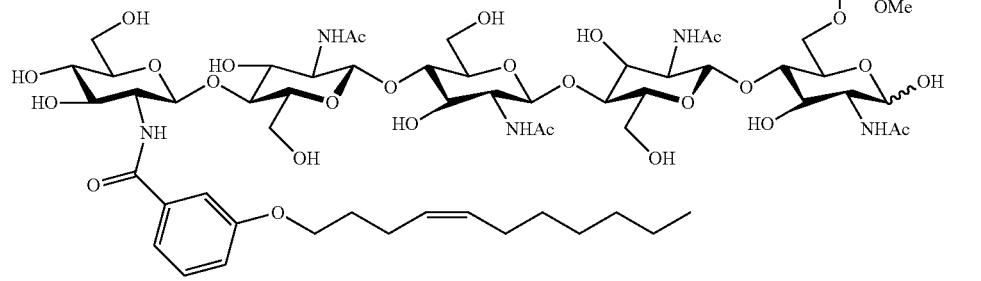
(XXII)
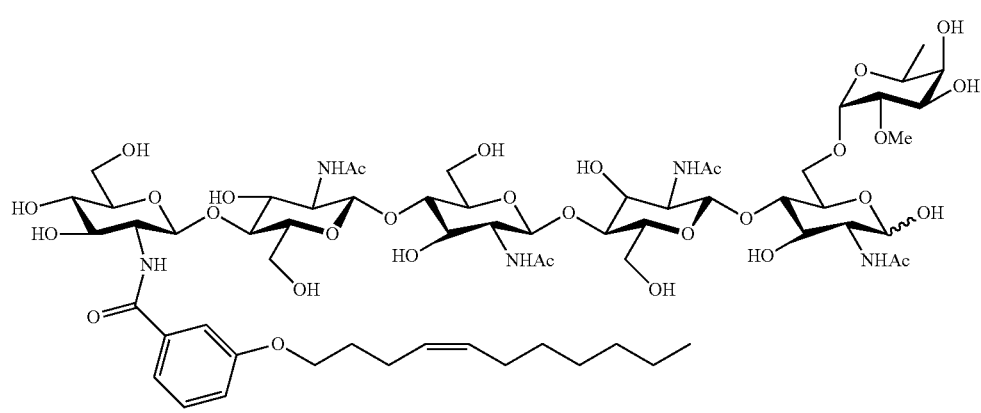
(XXIII)
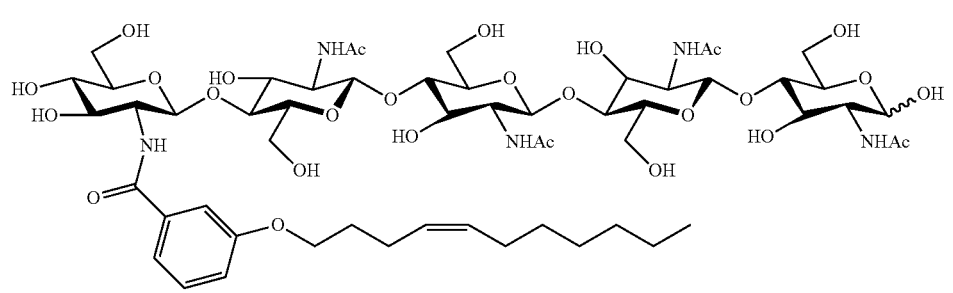
(XXIV)
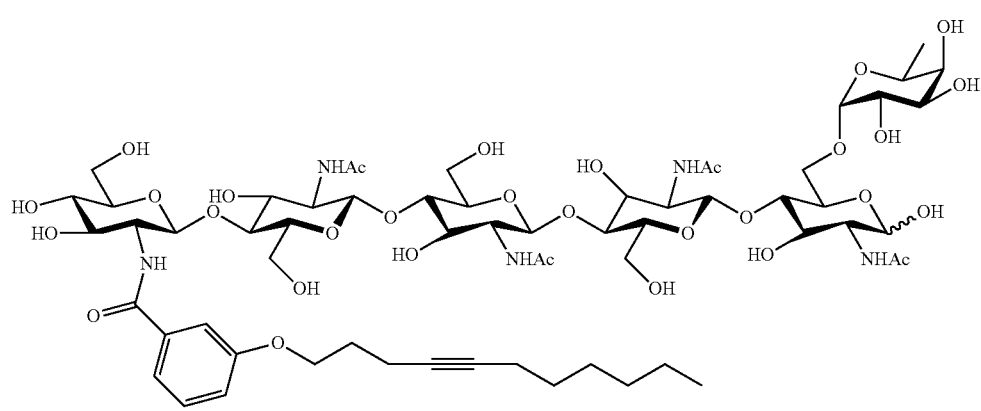
(XXV)

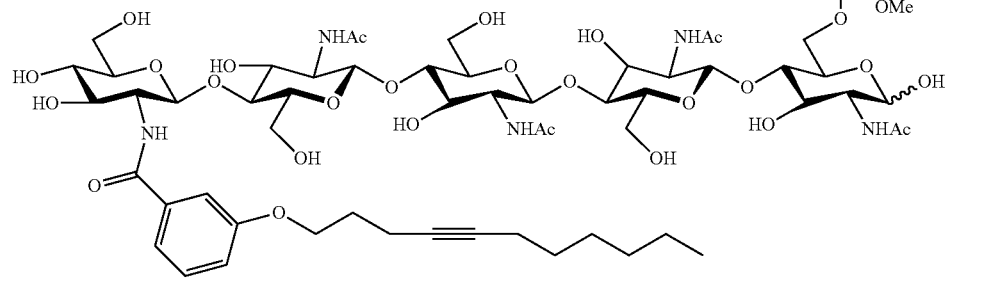
(XXVI)
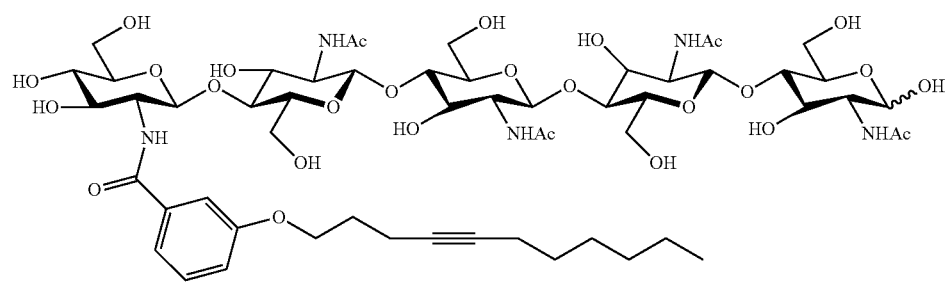
(XXVII)
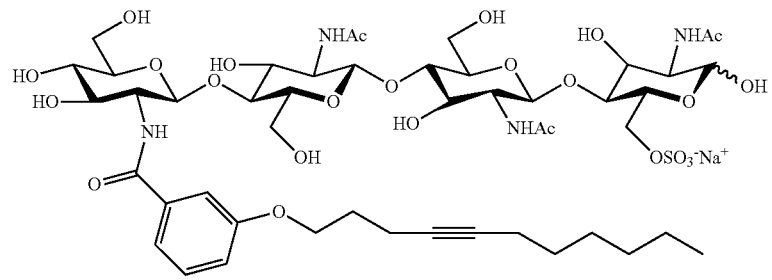
(XXVIII)
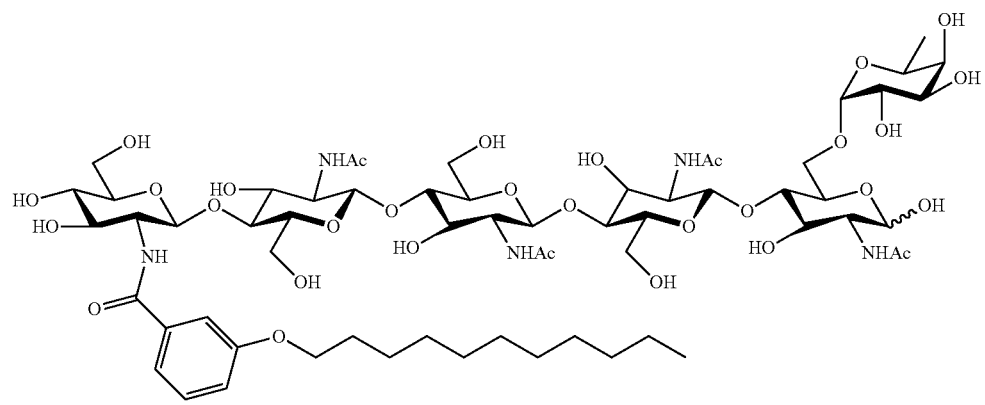
(XXIX)

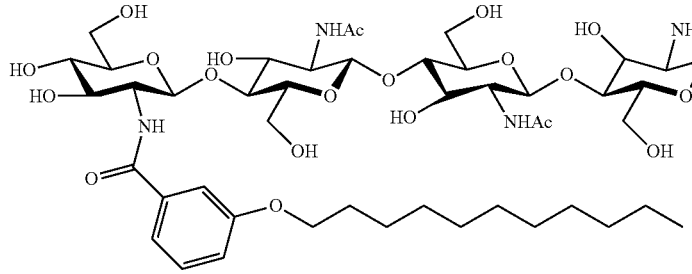

(XXX)

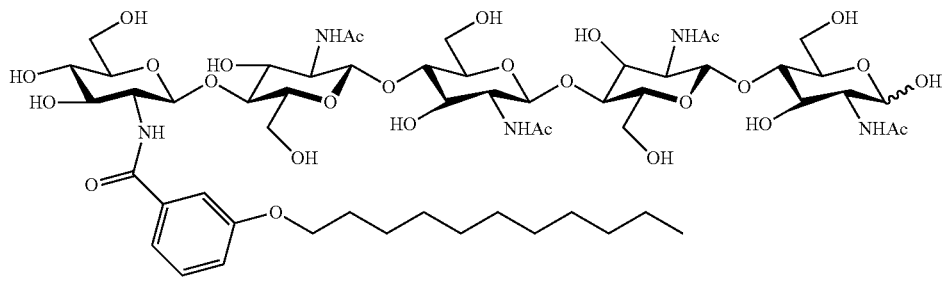

(XXXI)

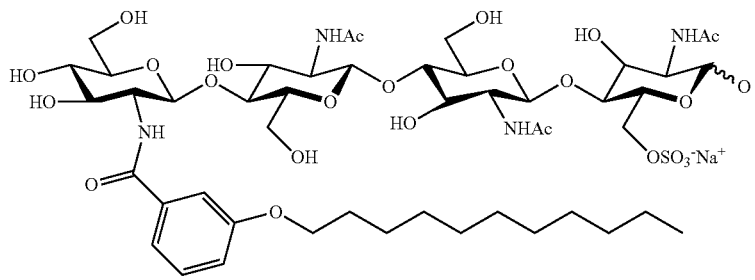

(XXXII)

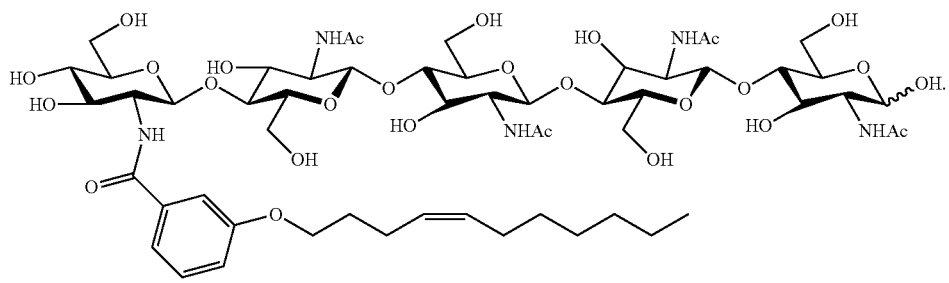

(XXXIII)

It is to be understood that uses and methods of the present disclosure may also be applied to water insoluble analogues and derivatives of LCOs. Thus, in some embodiments, uses and methods of the present disclosure comprise, consist essentially of or consist of using one or more of the surfactants described above to reduce and/or prevent the agglomeration of one, two, three, four, five or more analogues and/or derivatives of LCOs represented by one or more of formulas I-IV and/or structures V-XXXIII.

It is to be understood that uses and methods of the present disclosure are applicable to myriad LCO concentrations.

In some embodiments, one or more anti-agglomeration surfactants is/are used to reduce and/or prevent agglomeration of LCO molecules having a concentration of about $1\times10^{-20}$ M to about $1\times10^{-1}$ M, optionally about $1\times10^{-15}$ M to about $1\times10^{-10}$ M, about $1\times10^{-14}$ M to about $1\times10^{-8}$ M, about $1\times10^{-14}$ M to about $1\times10^{-6}$ M, about $1\times10^{-12}$ M to about $1\times10^{-8}$ M, about $1\times10^{-12}$ M to about $1\times10^{-6}$ M, about $1\times10^{-10}$ M to about $1\times10^{-6}$ M, or about $1\times10^{-8}$ M to about $1\times10^{-2}$ M. For example, in some embodiments, one or more anti-agglomeration surfactants is/are used to reduce and/or prevent agglomeration of LCO molecules in an aqueous solvent/composition comprising said LCOs molecules at a concentration of $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{-4}$ M, $1\times10^{-3}$ M, $1\times10^{-2}$ M, $1\times10^{-1}$ M or more.

In some embodiments, one or more anti-agglomeration surfactants is/are used to emulsify LCO molecules having a concentration of about $1\times10^{-20}$ M to about $1\times10^{-1}$ M, optionally about $1\times10^{-15}$ M to about $1\times10^{-10}$ M, about $1\times10^{-14}$ M to about $1\times10^{-8}$ M, about $1\times10^{-14}$ M to about $1\times10^{-6}$ M, about $1\times10^{-12}$ M to about $1\times10^{-8}$ M, about $1\times10^{-12}$ M to about $1\times10^{-6}$ M, about $1\times10^{-10}$ M to about $1\times10^{-6}$ M, or about $1\times10^{-8}$ M to about $1\times10^{-2}$ M. For example, in some embodiments, one or more anti-agglomeration surfactants is/are used to emulsify LCO molecules in an aqueous solvent/composition comprising said LCOs molecules at a concentration of $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{-4}$ M, $1\times10^{-3}$ M, $1\times10^{-2}$ M, $1\times10^{-1}$ M or more.

In some embodiments, one or more anti-agglomeration surfactants is/are used to facilitate the formation of micelles in an aqueous solvent/compositions comprising LCO molecules at a concentration of about $1\times10^{-20}$ M to about $1\times10^{-1}$ M, optionally about $1\times10^{-15}$ M to about $1\times10^{-10}$ M, about $1\times10^{-14}$ M to about $1\times10^{-8}$ M, about $1\times10^{-14}$ M to about $1\times10^{-6}$ M, about $1\times10^{-12}$ M to about $1\times10^{-8}$ M, about $1\times10^{-12}$ M to about $1\times10^{-6}$ M, about $1\times10^{-10}$ M to about $1\times10^{-6}$ M, or about $1\times10^{-8}$ M to about $1\times10^{-2}$ M. For example, in some embodiments, one or more anti-agglomeration surfactants is/are used to facilitate the formation of micelles comprising LCO molecules in an aqueous solvent/composition comprising said LCOs molecules at a concentration of $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{-4}$ M, $1\times10^{-3}$ M, $1\times10^{-2}$ M, $1\times10^{-1}$ M or more.

In some embodiments, one or more anti-agglomeration surfactants is/are used to solubilize LCO molecules in an aqueous solvent/compositions comprising LCO molecules at a concentration of about $1\times10^{-20}$ M to about $1\times10^{-1}$ M, optionally about $1\times10^{-15}$ M to about $1\times10^{-10}$ M, about $1\times10^{-14}$ M to about $1\times10^{-8}$ M, about $1\times10^{-14}$ M to about $1\times10^{-6}$ M, about $1\times10^{-12}$ M to about $1\times10^{-8}$ M, about $1\times10^{-12}$ M to about $1\times10^{-6}$ M, about $1\times10^{-10}$ M to about $1\times10^{-6}$ M, or about $1\times10^{-8}$ M to about $1\times10^{-2}$ M. For example, in some embodiments, one or more anti-agglomeration surfactants is/are used to solubilize LCO molecules in an aqueous solvent/composition comprising said LCOs molecules at a concentration of $1\times10^{-20}$ M $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{-4}$ M, $1\times10^{-3}$ M, $1\times10^{-2}$ M, $1\times10^{-1}$ M or more.

In some embodiments, one or more micelle-forming surfactants is/are used to form micelles comprising deagglomerated and/or emulsified LCO molecules in an aqueous solvent/compositions comprising LCO molecules at a concentration of about $1\times10^{-20}$ M to about $1\times10^{-1}$ M, optionally about $1\times10^{-15}$ M to about $1\times10^{-10}$ M, about $1\times10^{-14}$ M to about $1\times10^{-8}$ M, about $1\times10^{-14}$ M to about $1\times10^{-6}$ M, about $1\times10^{-12}$ M to about $1\times10^{-8}$ M, about $1\times10^{-12}$ M to about $1\times10^{-6}$ M, about $1\times10^{-10}$ M to about $1\times10^{-6}$ M, or about $1\times10^{-8}$ M to about $1\times10^{-7}$ M. For example, in some embodiments, one or more micelle-forming surfactants is/are used to form micelles comprising deagglomerated and/or emulsified LCO molecules in an aqueous solvent/compositions comprising LCO molecules at a concentration of $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{-4}$ M, $1\times10^{-3}$ M, $1\times10^{-2}$ M, $1\times10^{-1}$ M or more.

In some embodiments, one or more anti-agglomeration surfactants and one or more micelle-forming surfactants are used to solubilize LCO molecules having a concentration of about $1\times10^{-20}$ M to about $1\times10^{-1}$ M, optionally about $1\times10^{-15}$ M to about $1\times10^{-10}$ M, about $1\times10^{-14}$ M to about $1\times10^{-8}$ M, about $1\times10^{-14}$ M to about $1\times10^{-6}$ M, about $1\times10^{-12}$ M to about $1\times10^{-8}$ M, about $1\times10^{-12}$ M to about $1\times10^{-6}$ M, about $1\times10^{-10}$ M to about $1\times10^{-6}$ M, or about $1\times10^{-8}$ M to about $1\times10^{-2}$ M. For example, in some embodiments, one or more anti-agglomeration and one or more micelle-forming surfactants are used to solubilize LCO molecules in an aqueous solvent/composition comprising said LCOs molecules at a concentration of $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{-4}$ M, $1\times10^{-3}$ M, $1\times10^{-2}$ M, $1\times10^{-1}$ M or more.

It is to be understood that uses and methods of the present disclosure are applicable to myriad aqueous solvents, including, but not limited to, pure water. In some embodiments, the LCO(s) is/are emulsified and solubilized in an aqueous composition comprising an aqueous solvent (e.g., water) and one or more co-solvents, such as acetone, alkylpyrrolidones (e.g., AGSOLEX™ wetting agents; Ashland, Inc., Covington, KY), dichloromethane, dodecane, ethanol, ethyl lactate, hexane, isopropanol, methanol, methyl soyate/ethyl lactate blends (e.g., STEPOSOL™, Stepan), propan-2-ol, 1,2-propanediol, and trichloroethylene.

As indicated above, the present disclosure extends to aqueous compositions comprising one or more LCOs solubilized in an aqueous solvent. As one skilled in the art will appreciate, the present disclosure also encompasses aqueous compositions comprising LCO molecules that have been deagglomerated and/or emulsified but not fully solubilized.

In some embodiments, aqueous compositions of the present disclosure comprise, consist essentially of or consist of an aqueous solvent (e.g., water), one or more LCOs (e.g., one, two, three, four, five or more of the LCOs set forth above as structures V-XXXIII), and one or more anti-agglomeration surfactants (e.g., one or more alkyl sulfates (e.g., one or more octyl sulfates, nonyl sulfates, decyl sulfates, undecyl sulfates and/or dodecyl sulfates) and/or alkyl sulfonates (e.g., one or more alkylbenzene sulfonates, such as alkyl($C_{10-16}$)benzene sulfonates)) in an amount/concentration sufficient to reduce and/or prevent agglomeration of said one or more LCOs and/or to emulsify said one or more LCOs with said aqueous solvent.

In some embodiments, aqueous compositions of the present disclosure comprise, consist essentially of or consist of an aqueous solvent (e.g., water), one or more LCOs (e.g., one, two, three, four, five or more of the LCOs set forth above as structures V-XXXIII), an anti-agglomeration surfactant (or combination of anti-agglomeration surfactants) (e.g., one or more alkyl sulfates (e.g., one or more octyl sulfates, nonyl sulfates, decyl sulfates, undecyl sulfates and/or dodecyl sulfates) and/or alkyl sulfonates (e.g., one or more alkylbenzene sulfonates, such as alkyl($C_{10-16}$)benzene sulfonates)) in an amount/concentration sufficient to reduce and/or prevent agglomeration of said one or more LCOs and/or to emulsify said one or more LCOs, and a micelle-forming surfactant (or combination of micelle-forming surfactants) (e.g., one or more alcohol ethoxylates (e.g., one or more isodecyl alcohol ethoxylates)) in an amount/concentration sufficient to form micelles comprising said one or more LCOs.

Compositions of the present disclosure may comprise any suitable aqueous solvent(s), including, but not limited to, pure water.

Compositions of the present disclosure may comprise any suitable co-solvent(s), including, but not limited to, acetone, alkylpyrrolidones (e.g., AGSOLEX™ wetting agents; Ashland, Inc., Covington, KY), dichloromethane, dodecane, ethanol, ethyl lactate, hexane, isopropanol, methanol, methyl soyate/ethyl lactate blends (e.g., STEPOSOL™, Stepan), propan-2-ol, 1,2-propanediol, and trichloroethylene.

Compositions of the present disclosure may comprise any suitable LCO(s), including, but not limited to, the LCOs represented by one or more formulas I-IV and structures V-XXXIII above (and analogues and derivatives thereof).

LCOs may be obtained from any suitable source. In some embodiments, compositions of the present disclosure comprise one or more LCOs obtained (i.e., isolated and/or purified) from a bacterial strain. For example, in some embodiments, compositions of the present disclosure comprise one or more LCOs obtained from a of *Azorhizobium*, *Bradyrhizobium* (e.g., *B. japonicum*), *Mesorhizobium*, *Rhizobium* (e.g., *R. leguminosarum*), or *Sinorhizobium* (e.g., *S. meliloti*). In some embodiments, the LCO is obtained (i.e., isolated and/or purified) from a mycorrhizal fungus. For example, in some embodiments, compositions of the present disclosure comprise one or more LCOs obtained from a strain of Glomerocycota (e.g., *Glomus infraradicus*). See, e.g., WO 2010/049751 (in which the LCOs are referred to as "Myc factors"). In some embodiments, the LCO is synthetic. For example, in some embodiments, compositions of the present disclosure comprise one or more of the synthetic LCOs described in WO 2005/063784, WO 2007/117500 and/or WO 2008/071674. In some embodiments, the synthetic LCO contains one or more modifications or substitutions, such as those described in Spaink, CRIT. REV. PLANT SCI. 54:257 (2000) and D'Haeze, supra. LCOs and precursors for the construction of LCOs (e.g., chitin oligomers, which are themselves useful as plant signal molecules) may be synthesized by genetically engineered organisms. See, e.g., Samain et al., CARBOHYDRATE RES. 302:35 (1997); Cottaz, et al., METH. ENG. 7(4):311 (2005); and Samain, et al., J. BIOTECHNOL. 72:33 (1999).

LCOs (and derivatives thereof) may be utilized in various forms of purity and may be used alone or in the form of a culture of LCO producing bacteria or fungi. In some embodiments, the LCO(s) is/are at least 50%, 55%, 60%, 65%, 70%, 75%, 80%, 85%, 90%, 91%, 92%, 93%, 94%, 95%, 96%, 97%, 98%, 99%, 99.5% or more pure.

Compositions of the present disclosure may comprise any anti-agglomeration surfactant(s), including, but not limited to, the anti-agglomeration surfactants described in detail above.

Compositions of the present disclosure may comprise any micelle-forming surfactant(s), including, but not limited to, the micelle-forming surfactants described in detail above.

Aqueous solvents, LCOs, anti-agglomeration surfactants and micelle-forming surfactants may be incorporated into compositions of the present disclosure in any suitable amount(s)/concentration(s). The absolute value of the amount/concentration that is/are sufficient to cause the desired effect(s) may be affected by factors such as the volume of the composition, the structure(s) of the LCO molecules, the structure(s) of the surfactant(s), and storage conditions (e.g., temperature, duration). Those skilled in the art will understand how to select effective amounts/concentrations using routine dose-response experiments.

In some embodiments, water comprises about/at least 75, 76, 77, 78, 79, 80, 81, 82, 83, 84, 85, 86, 87, 88, 89, 90, 91, 92, 93, 94, 95, 96, 97, 98, 99, 99.1, 99.2, 99.3, 99.4, 99.5, 99.6, 99.7, 99.8, 99.9% or more of said composition (by weight, based upon the total weight of the composition).

In some embodiments, compositions of the present disclosure comprise one or more LCOs at a concentration of about about $1\times10^{-20}$ M to about $1\times10^{-1}$ M, optionally $1\times10^{-15}$ M to about $1\times10^{-10}$ M, about $1\times10^{-14}$ M to about $1\times10^{-8}$ M, about $1\times10^{-14}$ M to about $1\times10^{-6}$ M, about $1\times10^{-12}$ M to about $1\times10^{-8}$ M, about $1\times10^{-12}$ M to about $1\times10^{-6}$ M, about $1\times10^{-10}$ M to about $1\times10^{-6}$ M, or about $1\times10^{-8}$ M to about $1\times10^{-2}$ M. For example, compositions of the present disclosure may comprise about $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{-4}$ M, $1\times10^{-3}$ M, $1\times10^{-2}$ M, $1\times10^{-1}$ M or more of one or more LCOs (e.g., one, two, three, four or more of the LCOs set forth as structures V-XXXIII above.

In some embodiments, each anti-agglomeration surfactant is present at a concentration less than its critical micelle concentration.

In those embodiments, a combination of anti-agglomeration surfactants is present at a concentration less than the critical micelle concentration calculated for said combination.

In some embodiments, the anti-agglomeration surfactant(s) is/are present at a concentration ranging from about 0.01 to about 0.5% w/w (based upon the total weight of the composition), optionally about/at least 0.01, 0.011, 0.012, 0.013, 0.014, 0.015, 0.016, 0.017, 0.018, 0.019 or 0.02 to about/less than 0.1, 0.11, 0.12, 0.13, 0.14, 0.15, 0.16, 0.17, 0.18, 0.19 or 0.20% w/w (based upon the total weight of the composition),optionally about 0.01, 0.015, 0.02, 0.025, 0.03, 0.035, 0.04, 0.045, 0.05.0.055, 0.06, 0.065, 0.07, 0.075, 0.08, 0.085, 0.09, 0.095, 0.1, 0.11, 0.12, 0.13, 0.14, 0.15, 0.16, 0.17, 0.18, 0.19 or 0.2% w/w (based upon the total weight of the composition)

In some embodiments, each micelle-forming surfactant is present at a concentration less than its critical micelle concentration.

In those embodiments, a combination of micelle-forming surfactants is present at a concentration less than the critical micelle concentration calculated for said combination.

In some embodiments, the micelle-forming surfactant(s) is/are present at a concentration ranging from 0.001 to about 0.05% w/w (based upon the total weight of the composition), optionally about/at least 0.001, 0.0011, 0.0012, 0.0013, 0.0014, 0.0015, 0.0016, 0.0017, 0.0018, 0.0019, 0.002, 0.0021, 0.0022, 0.0023, 0.0024, 0.0025, 0.0026, 0.0027, 0.0028, 0.0029, 0.003, 0.0031, 0.0032, 0.0033, 0.0034, 0.0035, 0.0036, 0.0037, 0.0038, 0.0039, 0.004, 0.0041, 0.0042, 0.0043, 0.0044, 0.0045, 0.0046, 0.0047, 0.0048, 0.0049 or 0.005 to about/less than 0.01, 0.011, 0.012, 0.013, 0.014, 0.015, 0.016, 0.017, 0.018, 0.019, 0.02, 0.021, 0.022, 0.023, 0.024, 0.025, 0.026, 0.027, 0.028, 0.029, 0.03, 0.031, 0.032, 0.033, 0.034, 0.035, 0.036, 0.037, 0.038, 0.039, 0.04, 0.041, 0.042, 0.043, 0.044, 0.045, 0.046, 0.047, 0.048, 0.049 or 0.05% w/w (based upon the total weight of the composition),optionally about 0.001, 0.0015, 0.002, 0.0025, 0.003, 0.0035, 0.004, 0.0045, 0.005.0.0055, 0.006, 0.0065, 0.007, 0.0075, 0.008, 0.0085, 0.009, 0.0095, 0.01, 0.011, 0.012, 0.013, 0.014, 0.015, 0.016, 0.017, 0.018, 0.019 or 0.02% w/w (based upon the total weight of the composition).

In some embodiments, each of the anti-agglomeration surfactant (or combination of anti-agglomeration surfactants) and the micelle-forming surfactant (or combination of micelle-forming surfactants) is used at a concentration less than its critical micelle concentration.

In those embodiments, the anti-agglomeration surfactant (or combination of anti-agglomeration surfactants) and the micelle-forming surfactant (or combination of micelle-forming surfactants) are used at a total concentration less than the critical micelle concentration calculated for said combination.

It is to be understood that uses and methods of the present disclosure may be applied to produce any suitable LCO-containing composition, including, but not limited to, agricultural compositions suitable for on-seed, in-furrow and/or foliar application.

Accordingly, LCOs may be solubilized in aqueous compositions comprising myriad agriculturally beneficial agents (e.g., agriculturally beneficial microorganisms, biostimulants, chitin oligomers, chitosan oligomers, flavonoids, karrakins, microbial extracts, non-flavonoid nod-gene inducers, nutrients, pest attractants and/or feeding stimulants, and/or pesticides, such as acaricides, fungicides, herbicides, insecticides, and nematicides) and stabilizing compounds (e.g., maltodextrins, monosaccharides, disaccharides, oligosaccharides, sugar alcohols, humic acids, fulvic acids, malt extracts, peat extracts, betaines, prolines, sarcosines, peptones, skim milks, oxidation control components, hygroscopic polymers and/or UV protectants).

Compositions of the present disclosure may comprise any suitable agriculturally beneficial microorganism(s), including, but not limited to, diazotrophs, phosphate-solubilizing microorganisms, mycorrhizal fungi and biopesticides.

Non-limiting examples of bacteria that may be included in compositions of the present disclosure include *Azospirillum brasilense* INTA Az-39, *Bacillus amyloliquefaciens* D747, *Bacillus amyloliquefaciens* NRRL B 50349, *Bacillus amyloliquefaciens* TJ1000, *Bacillus amyloliquefaciens* FZB24, *Bacillus amyloliquefaciens* FZB42, *Bacillus amyloliquefaciens* IN937a, *Bacillus amyloliquefaciens* IT-45, *Bacillus amyloliquefaciens* TJ1000, *Bacillus amyloliquefaciens* MBI600, *Bacillus amyloliquefaciens* BS27 (deposited as NRRL B-5015), *Bacillus amyloliquefaciens* BS2084 (deposited as NRRL B-50013), *Bacillus amyloliquefaciens* 15AP4 (deposited as ATCC PTA-6507), *Bacillus amyloliquefaciens* 3AP4 (deposited as ATCC PTA-6506), *Bacillus amyloliquefaciens* LSSA01 (deposited as NRRL B-50104), *Bacillus amyloliquefaciens* ABP278 (deposited as NRRL B-50634), *Bacillus amyloliquefaciens* 1013 (deposited as NRRL B-50509), *Bacillus amyloliquefaciens* 918 (deposited as NRRL B-50508), *Bacillus amyloliquefaciens* 22CP1 (deposited as ATCC PTA-6508) and *Bacillus amyloliquefaciens* BS18 (deposited as NRRL B-50633), *Bacillus cereus* I-1562, *Bacillus firmus* I-1582, *Bacillus lichenformis* BA842 (deposited as NRRL B-50516), *Bacillus lichenformis* BL21 (deposited as NRRL B-50134), *Bacillus mycoides* NRRL B-21664, *Bacillus pumilus* NRRL B 21662, *Bacillus pumilus* NRRL B-30087, *Bacillus pumilus* ATCC 55608, *Bacillus pumilus* ATCC 55609, *Bacillus pumilus* GB34, *Bacillus pumilus* KFP9F, *Bacillus pumilus* QST 2808, *Bacillus subtilis* ATCC 55078, *Bacillus subtilis* ATCC 55079, *Bacillus subtilis* MBI 600, *Bacillus subtilis* NRRL B-21661, *Bacillus subtilis* NRRL B-21665, *Bacillus subtilis* CX-9060, *Bacillus subtilis* GB03, *Bacillus subtilis* GB07, *Bacillus subtilis* QST-713, *Bacillus subtilis* FZB24, *Bacillus subtilis* D747, *Bacillus subtilis* 3BP5 (deposited as NRRL B-50510), *Bacillus thuringiensis* ATCC 13367, *Bacillus thuringiensis* GC-91, *Bacillus thuringiensis* NRRL B-21619, *Bacillus thuringiensis* ABTS-1857, *Bacillus thuringiensis* SAN 401 I, *Bacillus thuringiensis* ABG-6305, *Bacillus thuringiensis* ABG-6346, *Bacillus thuringiensis* AM65-52, *Bacillus thuringiensis* SA-12, *Bacillus thuringiensis* SB4, *Bacillus thuringiensis* ABTS-351, *Bacillus thuringiensis* HD-1, *Bacillus thuringiensis* EG 2348, *Bacillus thuringiensis* EG 7826, *Bacillus thuringiensis* EG 7841, *Bacillus thuringiensis* DSM 2803, *Bacillus thuringiensis* NB-125, *Bacillus thuringiensis* NB-176, BRADY, *Pseudomonas jessenii* PS06, *Rhizobium leguminosarum* SO12A-2 (IDAC 080305-01), *Sinorhizobium fredii* CCBAU114, *Sinorhizobium fredii* USDA 205, *Yersinia entomophaga* O82KB8 and combinations thereof, as well as microorganisms having at least at least 75, 80, 85, 90, 95, 96, 97, 97.5. 98, 98.5, 99, 99.5, 99.6, 99.7, 99.8, 99.9% or more identical to any of the aforementioned strains on the basis of 16S rDNA sequence identity.

Non-limiting examples of fungi that may be included in compositions of the present disclosure include *Gliocladium virens* ATCC 52045, *Gliocladium virens* GL-21, *Glomus infraradices* RTI-801, *Metarhizium anisopliae* F52, PENI, *Trichoderma asperellum* SKT-1, *Trichoderma asperellum* ICC 012, *Trichoderma afroviride* LC52, *Trichoderma atroviride* CNCM 1-1237, *Trichoderma fertile* JM41R, *Trichoderma gamsii* ICC 080, *Trichoderma hamatum* ATCC 52198, *Trichoderma harzianum* ATCC 52445, *Trichoderma harzianum* KRL-AG2, *Trichoderma harzianum* T-22, *Trichoderma harzianum* TH-35, *Trichoderma harzianum* T-39, *Trichoderma harzianum* ICC012, *Trichoderma reesi* ATCC 28217, *Trichoderma virens* ATCC 58678, *Trichoderma virens* Gl-3, *Trichoderma virens* GL-21, *Trichoderma virens* G-41, *Trichoderma viridae* ATCC 52440, *Trichoderma viridae* ICC080, *Trichoderma viridae* TV1 and combinations thereof, as well as microorganisms having at least at least 75, 80, 85, 90, 95, 96, 97, 97.5. 98, 98.5, 99, 99.5, 99.6, 99.7, 99.8, 99.9% or more identical to any of the aforementioned strains on the basis of internal transcribed spacer (ITS) and/or cytochrome c oxidase (CO1) sequence identity.

Non-limiting examples of mycorrhizal fungi that may be included in compositions of the present disclosure include mycorrhizal strains such as *Gigaspora margarita*, *Glomus aggregatum*, *Glomus brasilianum*, *Glomus clarum*, *Glomus deserticola*, *Glomus etunicatum*, *Glomus intraradices*, *Glomus monosporum*, *Glomus mosseae*, *Laccaria bicolor*, *Laccaria laccata*, *Paraglomus brazilianum*, *Pisolithus tinctorius*, *Rhizopogon amylopogon*, *Rhizopogon fulvigleba*, *Rhizopogon luteolus*, *Rhizopogon villosuli*, *Scleroderma cepa* and *Scleroderma citrinum* and combinations thereof.

Additional examples of microorganisms that may be added to compositions of the present disclosure can be found in Appendix A.

Compositions of the present disclosure may comprise any suitable biostimulant(s), including, but not limited to, seaweed extracts (e.g., *Ascophyllum nodosum* extracts, such as alginate, *Ecklonia maxima* extracts, etc.), myo-inositol, glycine and combinations thereof.

Compositions of the present disclosure may comprise any suitable chitin oligomer(s) and/or chitosan oligomer(s). See, e.g., D'Haeze et al., GLYCOBIOL. 12(6):79R (2002); Demont-Caulet et al., PLANT PHYSIOL. 120(1):83 (1999); Hanel et al., PLANTA 232:787 (2010); Muller et al., PLANT PHYSIOL. 124:733 (2000); Robina et al., TETRAHEDRON 58:521-530 (2002);

Rouge et al., *Docking of Chitin Oligomers and Nod Factors on Lectin Domains of the LysM-RLK Receptors in the Medicago-Rhizobium Symbiosis,* in THE MOLECULAR IMMUNOLOGY OF COMPLEX CARBOHYDRATES-3 (Springer Science, 2011); Van der Holst et al., CURR. OPIN. STRUC. BIOL. 11:608 (2001); Wan et al., PLANT CELL 21:1053 (2009); and PCT/F100/00803 (2000).

In some embodiments, compositions of the present disclosure comprise one or more chitin oligosaccharides represented by formula XXXIV:

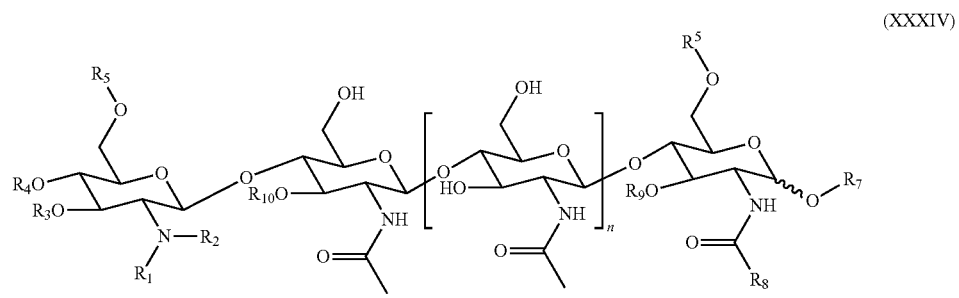

(XXXIV)

in which $R_1$ represents hydrogen or methyl; $R_2$ represents hydrogen or methyl; $R_3$ represents hydrogen, acetyl or carbamoyl; $R_4$ represents hydrogen, acetyl or carbamoyl; $R_5$ represents hydrogen, acetyl or carbamoyl; $R_6$ represents hydrogen, arabinosyl, fucosyl, acetyl, sulfate ester, 3-0-S-2-0-MeFuc, 2-0-MeFuc and 4-0-AcFuc; $R_7$ represents hydrogen, mannosyl or glycerol; $R_8$ represents hydrogen, methyl, or —$CH_2OH$; $R_9$ represents hydrogen, arabinosyl, or fucosyl; $R_{10}$ represents hydrogen, acetyl or fucosyl; and n represents 0, 1, 2 or 3.

In some embodiments, compositions of the present disclosure comprise one or more chitin oligosaccharides represented by formula XXXV:

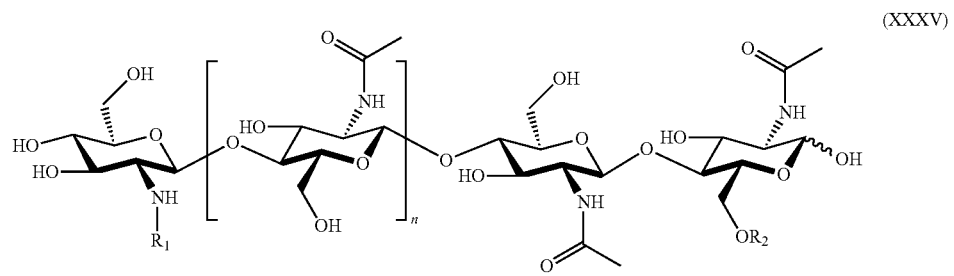

(XXXV)

in which n=1 or 2; $R_1$ represents hydrogen or methyl; and $R_2$ represents hydrogen or $SO_3H$.

Further examples of oligosaccharides (and derivatives thereof) that may be included in compositions of the present disclosure are provided below as structures XXXVI-LXXXIII:

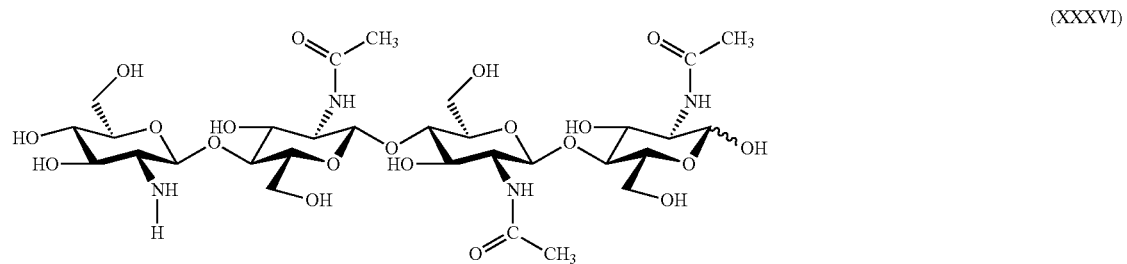

(XXXVI)

-continued
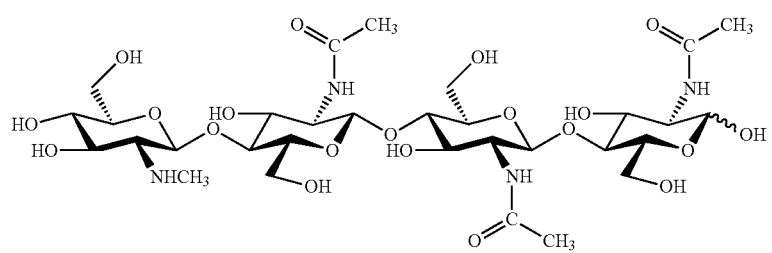
(XXXVII)
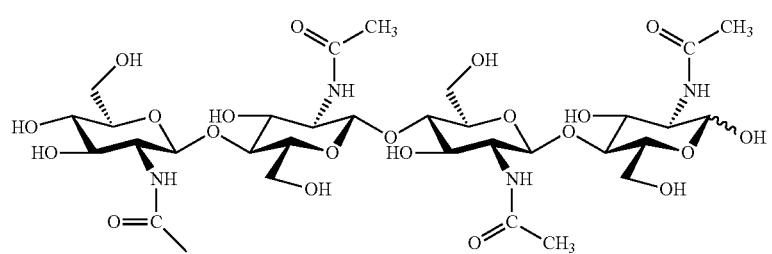
(XXXVIII)
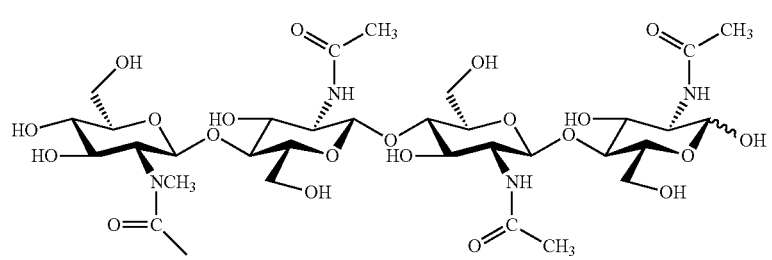
(XXXIX)
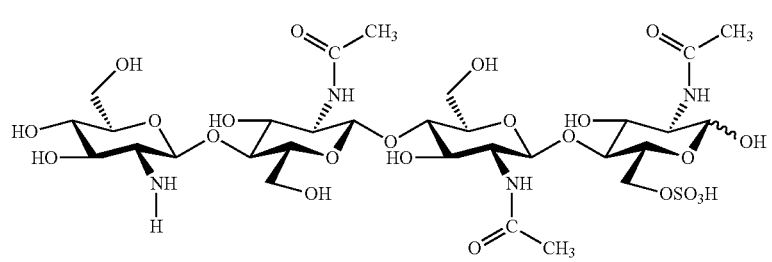
(XXXX)
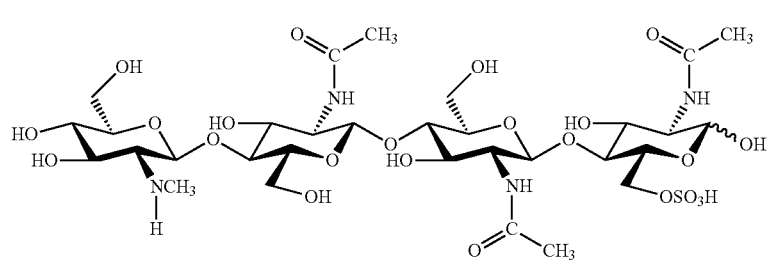
(XXXXI)
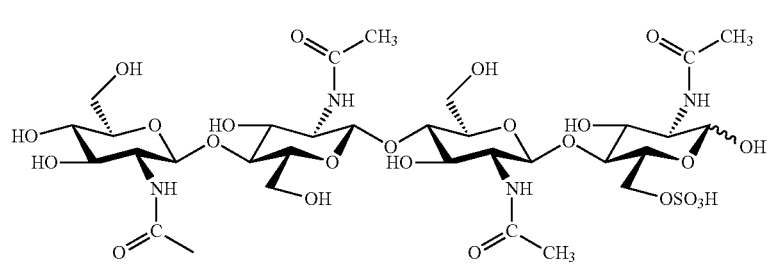
(XXXXII)

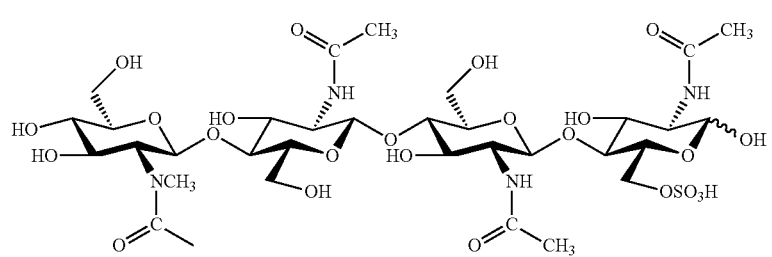
(XXXXIII)
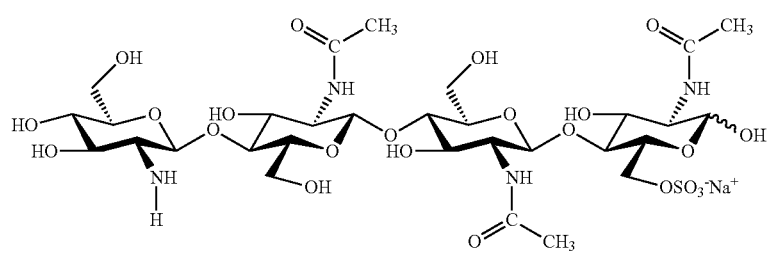
(XXXXIV)
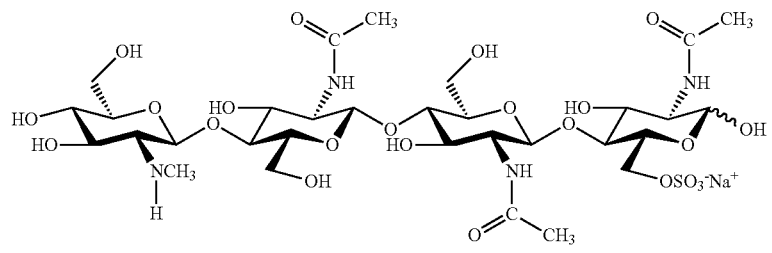
(XXXXV)
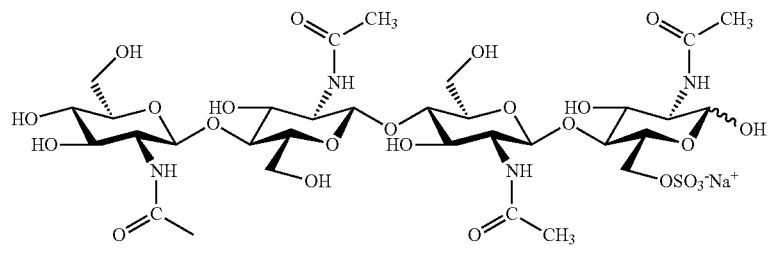
(XXXXVI)
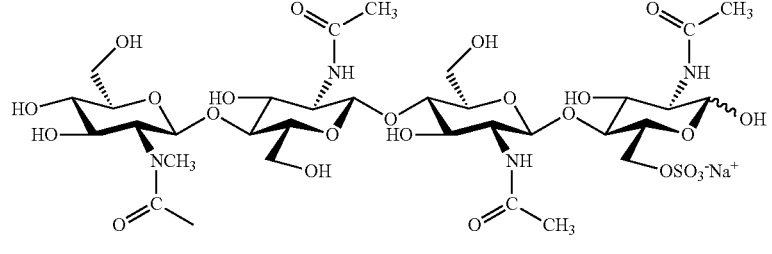
(XXXXVII)
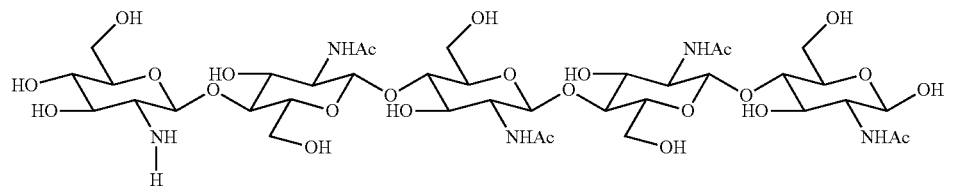
(XXXXVIII)
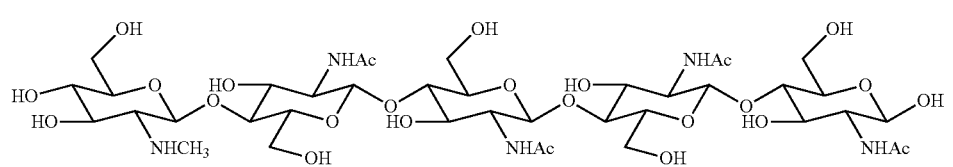
(XXXXIX)

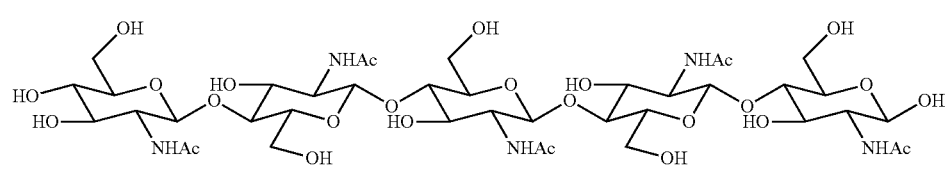
(L)
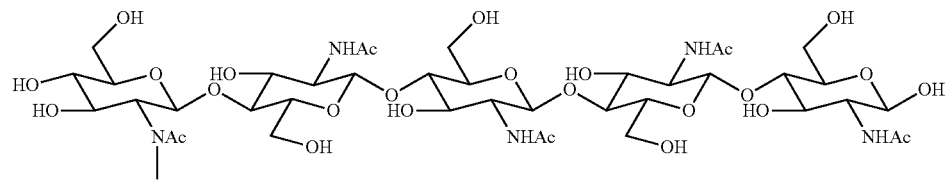
(LI)
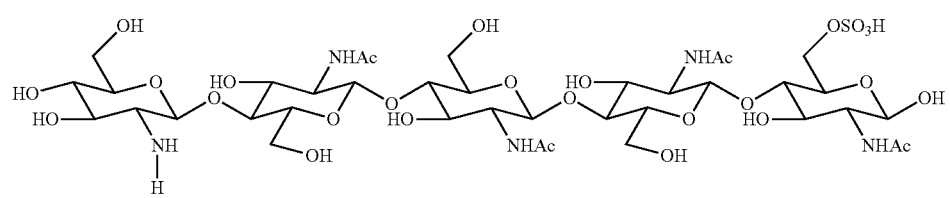
(LII)
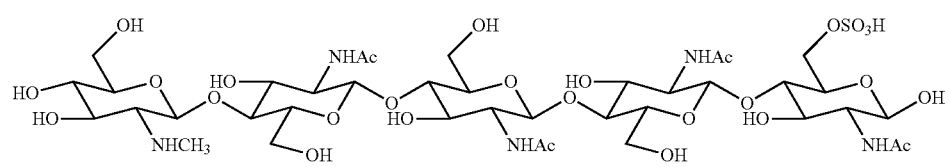
(LIII)
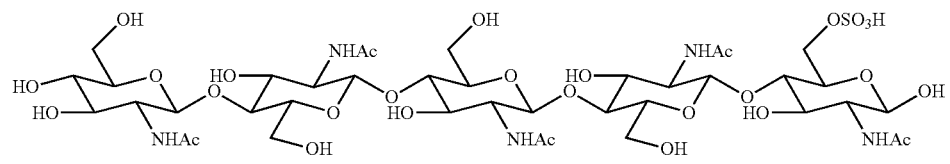
(LIV)
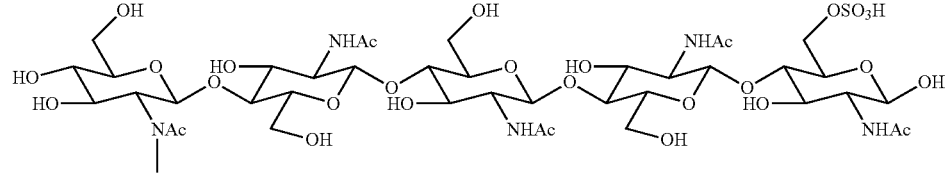
(LV)
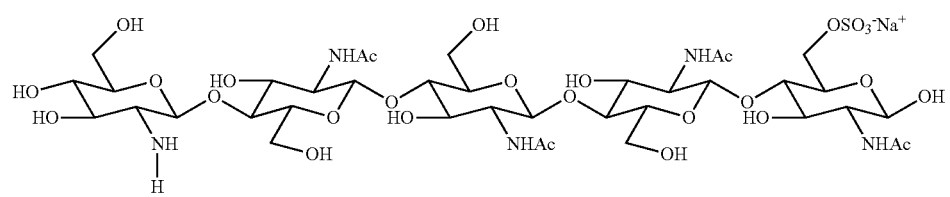
(LVI)
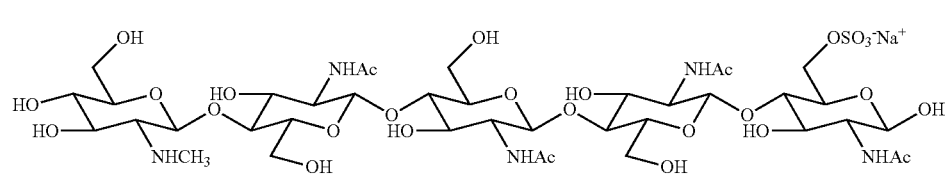
(LVII)
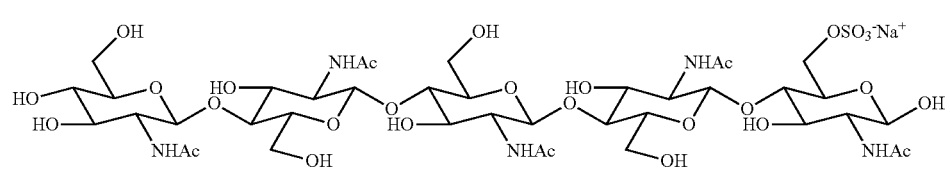
(LVIII)

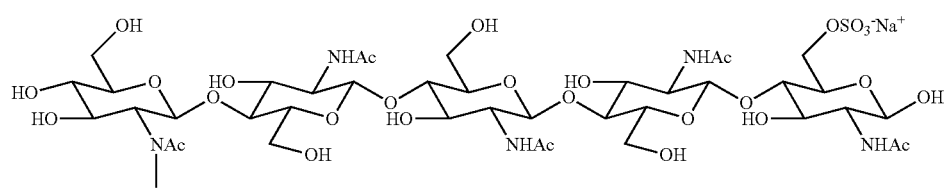
(LIX)
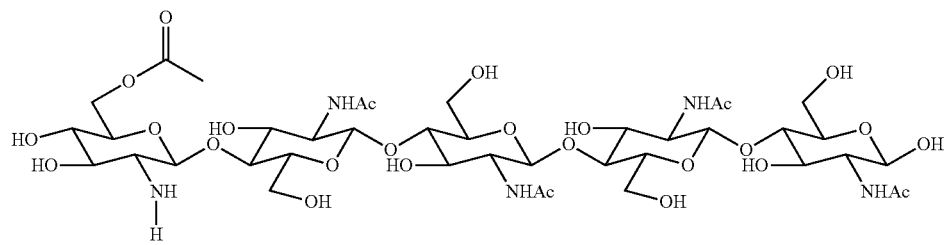
(LX)
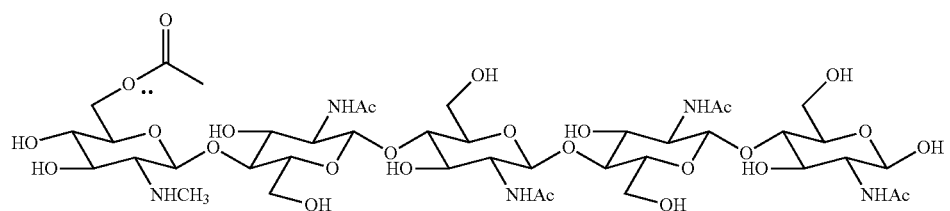
(LXI)
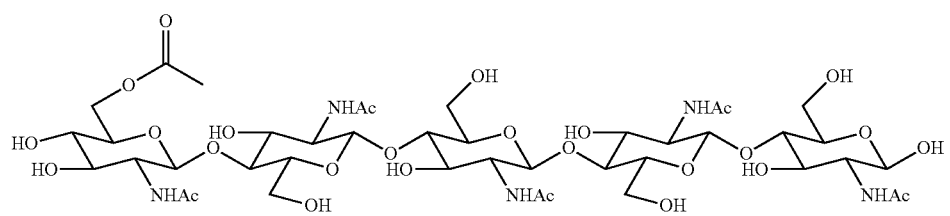
(LXII)
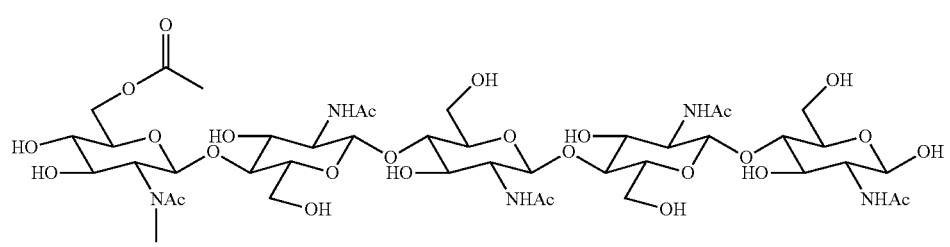
(LXIII)
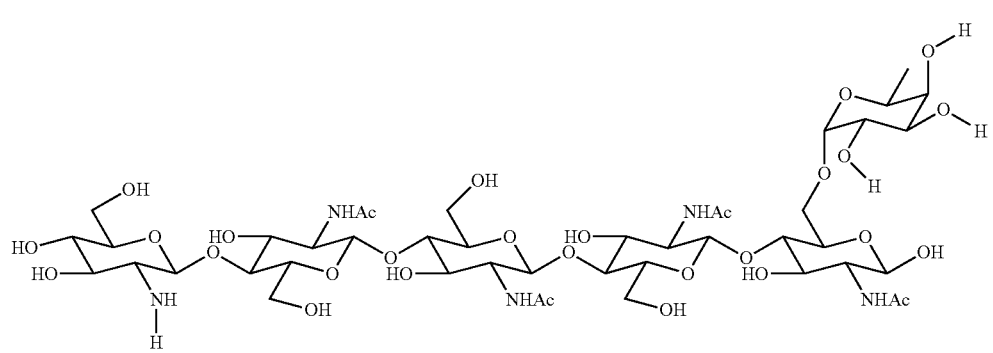
(LXIV)

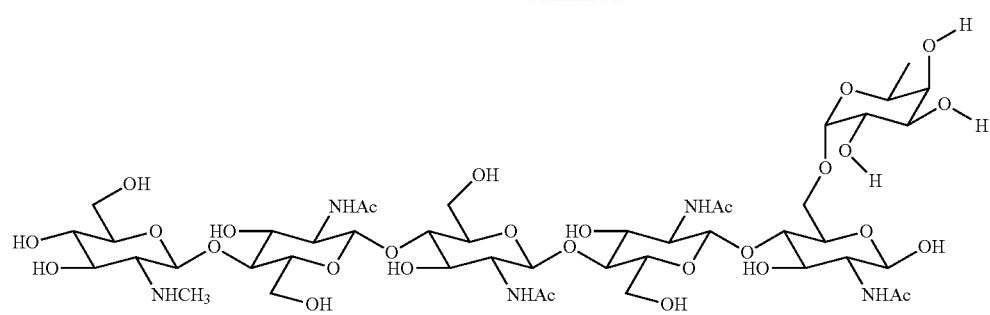
(LXV)
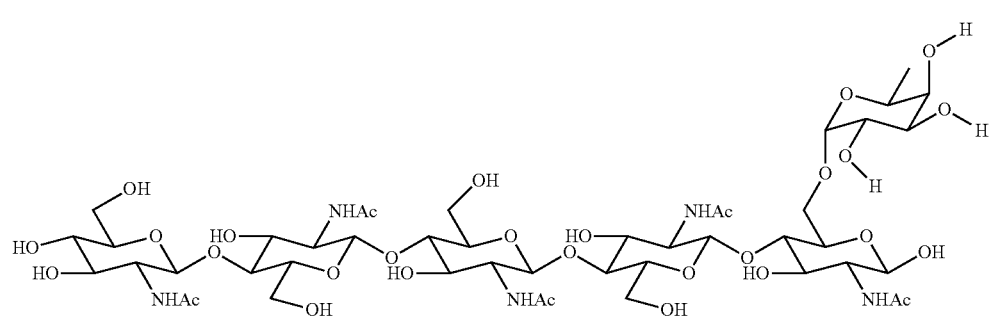
(LXVI)
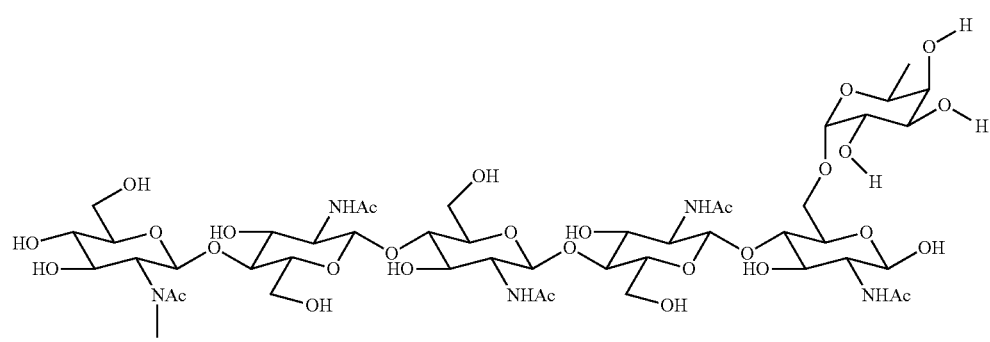
(LXVII)
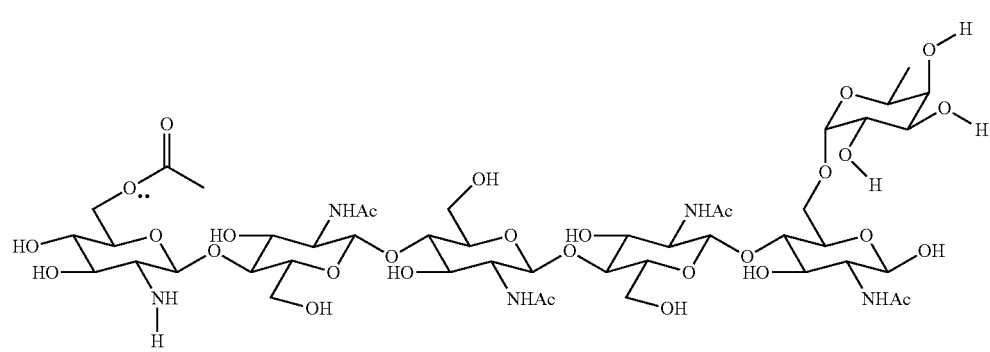
(LXVIII)
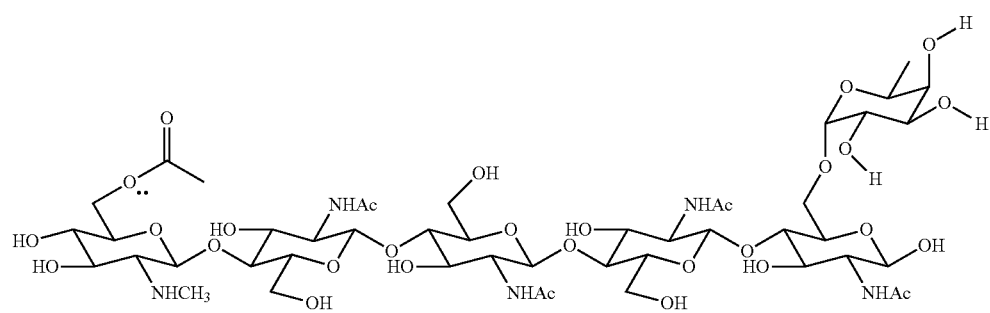
(LXIX)

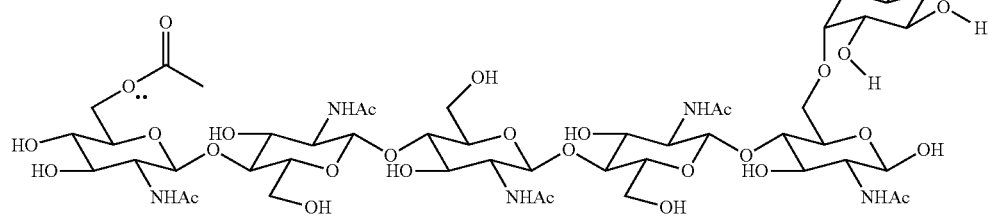
(LXX)
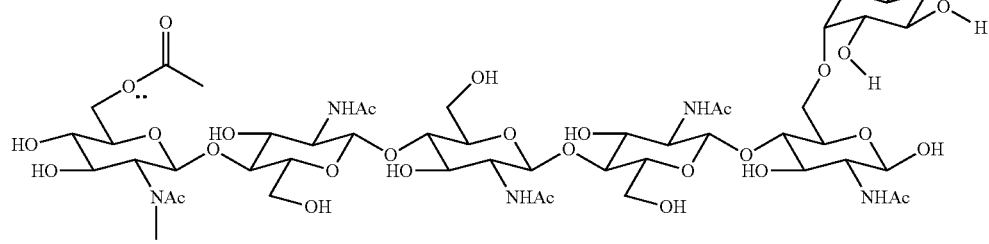
(LXXI)
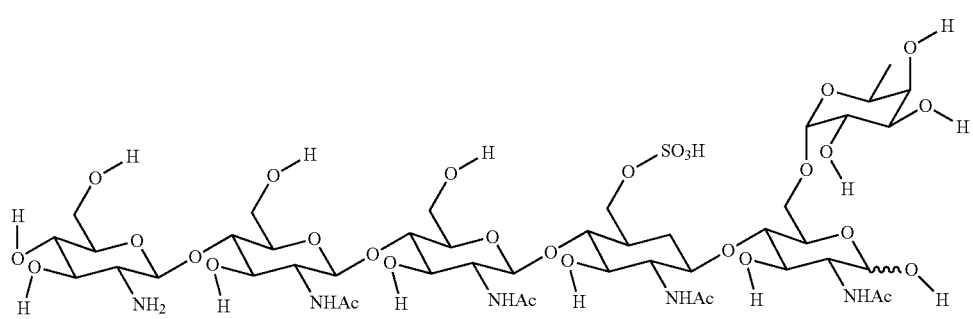
(LXXII)
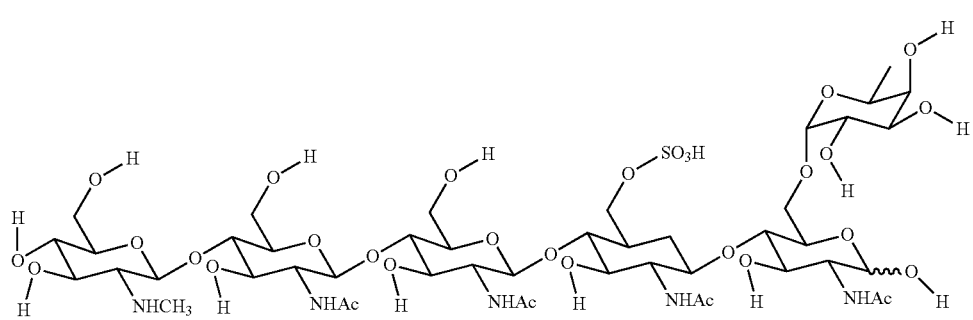
(LXXIII)
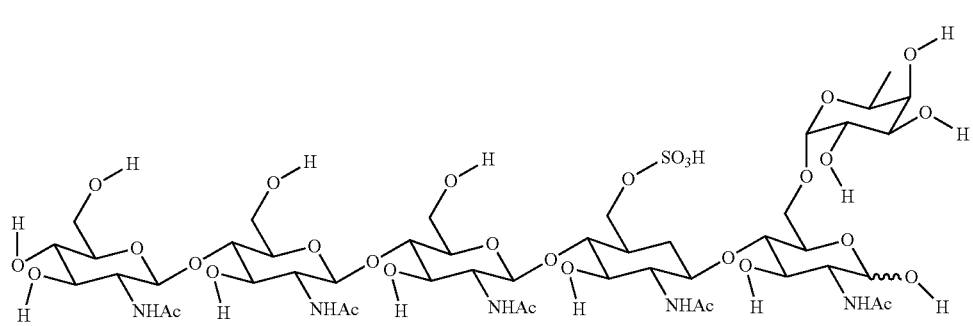
(LXXIV)

-continued
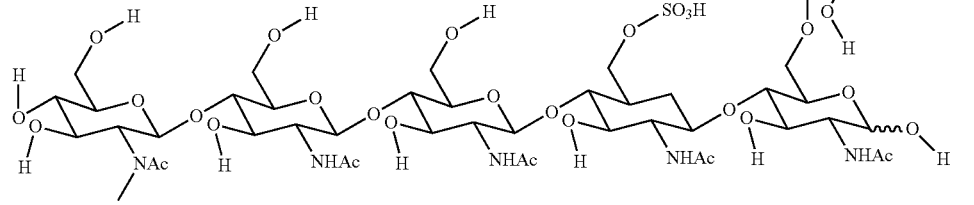
(LXXV)
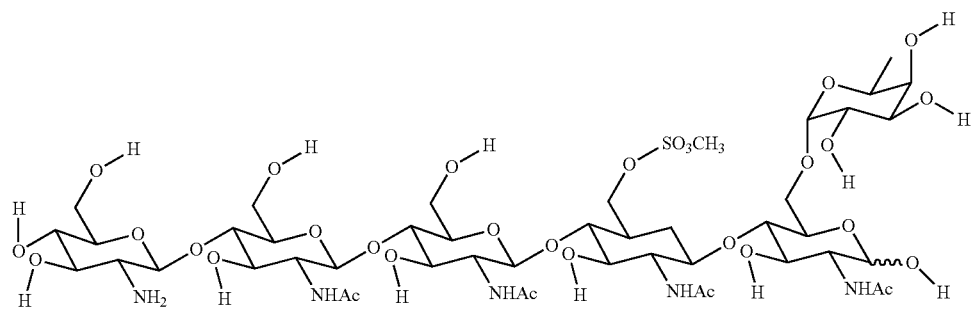
(LXXVI)
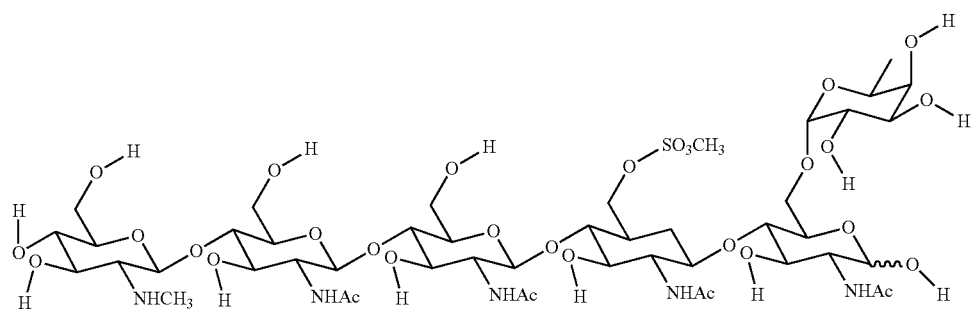
(LXXVII)
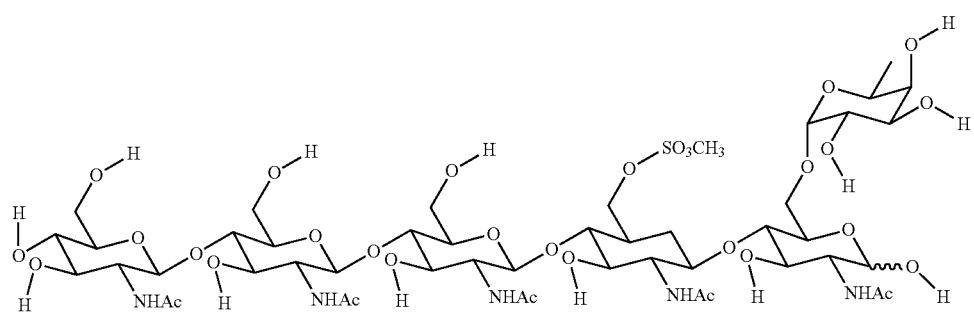
(LXXVIII)
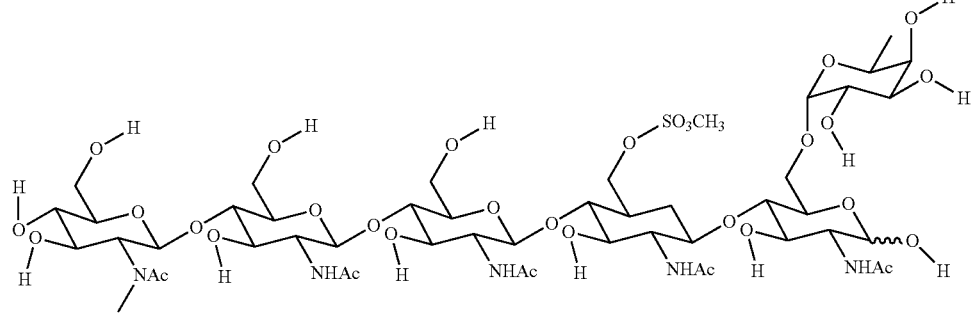
(LXXIX)

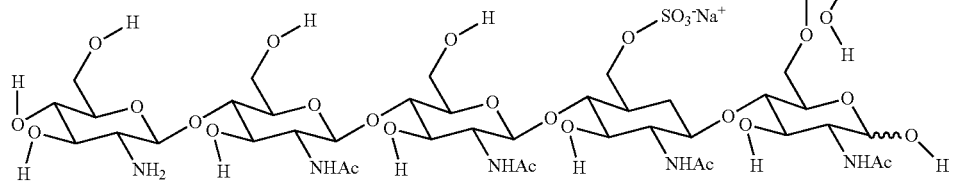

(LXXX)

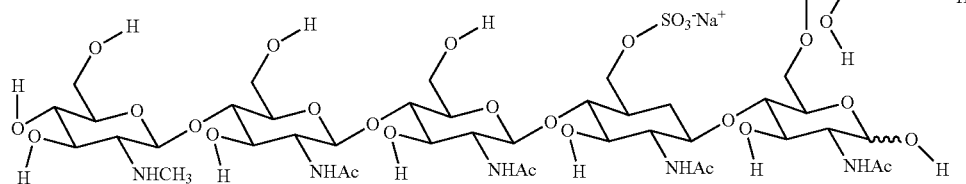

(LXXXI)

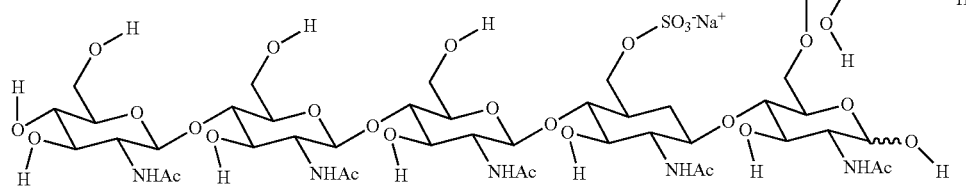

(LXXXII)

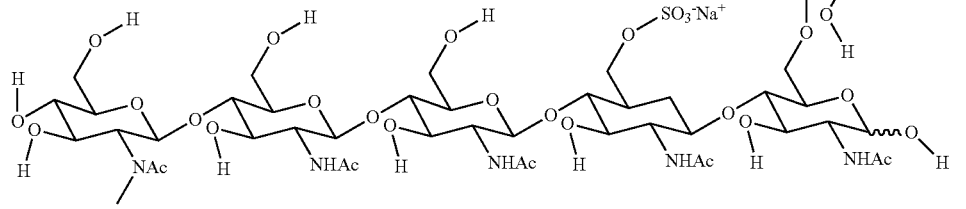

(LXXXIII)

In some embodiments, compositions of the present disclosure comprise one or more of the oligosaccharides set forth above as structures XXXVI-LXXXIII in a deacetylated form (e.g., an oligosaccharide corresponding to structure XXXVI above except that one or more of the acetyl groups has been removed, optionally replaced by a hydrogen or methyl group).

Chitin oligosaccharides and chitosan oligosaccharides may be obtained from any suitable source. Chitin oligosaccharides and chitosan oligosaccharides may be harvested from chitin/chitosan (see, e.g., Aam et al., MAR. DRUGS 8:1482 (2010); D'Haeze et al., GLYCOBIOL. 12(6):79R (2002); Demont-Caulet et al., PLANT PHYSIOL. 120(1):83 (1999); Hanel et al., PLANTA 232:787 (2010); Limpanavech et al., SCIENTIA HORTICULTURAE 116:65 (2008); Lodhi et al., BIOMED RES. INTL. Vol. 2014 Art. 654913 (March 2014); Mourya et al., POLYMER SCI. 53(7):583 (2011); Muller et al., PLANT PHYSIOL. 124:733 (2000); Robina et al., TETRAHEDRON 58:521 (2002); Rouge et al., *The Molecular Immunology of Complex Carbohydrates,* in ADVANCES IN EXPERIMENTAL MEDICINE AND BIOLOGY (Springer Science, 2011); Van der Holst et al., CURR. OPIN. STRUC. BIOL. 11:608 (2001); Wan et al., PLANT CELL 21:1053 (2009); Xia et al., FOOD HYDROCOLLOIDS 25:170 (2011); PCT/F100/00803 (2000)). They may also be synthetically generated (see, e.g., Cottaz et al., METH. ENG. 7(4):311 (2005); Samain et al., CARBOHYDRATE RES. 302:35 (1997); Samain et al., J. BIOTECHNOL. 72:33 (1999)). In some embodiments, they are derived from a naturally occurring LCO. For example, in some embodiments, compositions of the present disclosure comprise one or more chitin/chitosan oligosaccharides derived from an LCO obtained (i.e., isolated and/or purified) from a strain of *Azorhizobium, Bradyrhizobium* (e.g., *B. japonicum*), *Mesorhizobium, Rhizobium* (e.g., *R. leguminosarum*), *Sinorhizobium* (e.g., *S. meliloti*), or mycorhizzal fungus (e.g., *Glomus infraradicus*). In some embodiments, compositions of the present disclosure comprise one or more chitin oligosaccharides and/or chitosan oligosaccharides derived from an LCO obtained (i.e., isolated and/or purified) from a strain of *Azorhizobium, Bradyrhizobium* (e.g., *B. japonicum*), *Mesorhizobium, Rhizobium* (e.g., *R. leguminosarum*), *Sinorhizobium* (e.g., *S. meliloti*), or mycorrhizal fungus (e.g., *Glomus infraradicus*). In some embodiments, the chitin oligosaccharide(s) and/or chitosan oligosaccharide(s) is/are derived from an LCO represented by one or more of formulas I-IV and/or structures V-XXXIII. Thus, in some embodiments, compositions of the present disclosure may comprise one or more chitin oligosaccharides represented by one or more of formulas I-IV and/or structures V-XXXIII except that the pendant fatty acid is replaced with a hydrogen or methyl group.

It is to be understood that compositions of the present disclosure may comprise analogues, derivatives, hydrates, isomers, salts and/or solvates of chitin oligosaccharides and/or chitosan oligosaccharides. Thus, in some embodiments, compositions of the present disclosure comprise one, two, three, four, five, six, seven, eight, nine, ten, or more chitin oligosaccharides represented by one or more of formulas XXXIV-XXXV and/or structures XXXVI-LXXXIII and/or one, two, three, four, five, six, seven, eight, nine, ten, or more analogues, derivatives, hydrates, isomers, salts and/or solvates of chitin oligosaccharides represented by one or more of formulas XXXIV-XXXV and/or structures XXXVI-LXXXIII.

Chitin oligosaccharides and chitosan oligosaccharides (and analogues, derivatives, hydrates, isomers, salts and/or solvates thereof) may be utilized in various forms of purity and may be used alone or in the form of a culture of CO-producing bacteria or fungi. In some embodiments, the chitin oligosaccharides and/or chitosan oligosaccharides included in compositions of the present disclosure is/are at least 50%, 55%, 60%, 65%, 70%, 75%, 80%, 85%, 90%, 91%, 92%, 93%, 94%, 95%, 96%, 97%, 98%, 99%, 99.5% or more pure.

Compositions of the present disclosure may comprise any suitable chitinous compound(s), including, but not limited to, chitin (IUPAC: N-[5-[[3-acetylamino-4,5-dihydroxy-6-(hydroxymethyl)oxan-2yl]methoxymethyl]-2-[[5-acetylamino-4,6-dihydroxy-2-(hydroxymethyl)oxan-3 -yl]methoxymethyl]-4-hydroxy-6-(hydroxymethyl)oxan-3-ys]ethanamide), chitosan(IUPAC: 5-amino-6-[5-amino-6-[5-amino-4,6-dihydroxy-2(hydroxymethyl)oxan-3-yl]oxy-4-hydroxy-2-(hydroxymethyl)oxan-3-yl]oxy-2(hydroxymethyl)oxane-3,4-diol) and isomers, salts and solvates thereof.

Chitins and chitosans, which are major components of the cell walls of fungi and the exoskeletons of insects and crustaceans, are composed of GlcNAc residues.

Chitins and chitosans may be obtained commercially or prepared from insects, crustacean shells, or fungal cell walls. Methods for the preparation of chitin and chitosan are known in the art. See, e.g., U.S. Pat. Nos. 4,536,207 (preparation from crustacean shells) and 5,965,545 (preparation from crab shells and hydrolysis of commercial chitosan); Pochanavanich, et al., LETT. APPL. MICROBIOL. 35:17 (2002) (preparation from fungal cell walls).

Deacetylated chitins and chitosans may be obtained that range from less than 35% to greater than 90% deacetylation and cover a broad spectrum of molecular weights, e.g., low molecular weight chitosan oligomers of less than 15 kD and chitin oligomers of 0.5 to 2 kD; "practical grade" chitosan with a molecular weight of about 15 kD; and high molecular weight chitosan of up to 70 kD. Chitin and chitosan compositions formulated for seed treatment are commercially available. Commercial products include, for example, ELEXA® (Plant Defense Boosters, Inc.) and BEYOND™ (Agrihouse, Inc.).

Compositions of the present disclosure may comprise any suitable flavonoid(s), including, but not limited to, anthocyanidins, anthoxanthins, chalcones, coumarins, flavanones, flavanonols, flavans and isoflavonoids, as well as analogues, derivatives, hydrates, isomers, polymers, salts and solvates thereof.

Flavonoids are phenolic compounds having the general structure of two aromatic rings connected by a three-carbon bridge. Classes of flavonoids include are known in the art. See, e.g., Jain et al., J. PLANT BIOCHEM. & BIOTECHNOL. 11:1 (2002); Shaw et al., ENVIRON. MICROBIOL. 11:1867 (2006). Flavonoid compounds are commercially available, e.g., from Novozymes BioAg, Saskatoon, Canada; Natland International Corp., Research Triangle Park, NC; MP Biomedicals, Irvine, CA; LC Laboratories, Woburn MA. Flavonoid compounds may be isolated from plants or seeds, e.g., as described in U.S. Pat. Nos. 5,702,752; 5,990,291; and 6,146,668. Flavonoid compounds may also be produced by genetically engineered organisms, such as yeast, as described in Ralston et al., PLANT PHYSIOL. 137:1375 (2005).

In some embodiments, compositions of the present disclosure comprise one or more anthocyanidins According to some embodiments, the composition comprises cyanidin, delphinidin, malvidin, pelargonidin, peonidin and/or petunidin.

In some embodiments, compositions of the present disclosure comprise one or more anthoxanthins According to some embodiments, the composition comprises one or more flavones (e.g., apigenin, baicalein, chrysin, 7,8-dihydroxyflavone, diosmin, flavoxate, 6-hydroxyflavone, luteolin, scutellarein, tangeritin and/or wogonin) and/or flavonols (e.g., amurensin, astragalin, azaleatin, azalein, fisetin, furanoflavonols galangin, gossypetin, 3-hydroxyflavone, hyperoside, icariin, isoquercetin, kaempferide, kaempferitrin, kaempferol, isorhamnetin, morin, myricetin, myricitrin, natsudaidain, pachypodol, pyranoflavonols quercetin, quericitin, rhanmazin, rhamnetin, robinin, rutin, spiraeoside, troxerutin and/or zanthorhamnin).

In some embodiments, compositions of the present disclosure comprise one or more flavanones. According to some embodiments, the composition comprises butin, eriodictyol, hesperetin, hesperidin, homoeriodictyol, isosakuranetin, naringenin, naringin, pinocembrin, poncirin, sakuranetin, sakuranin and/or sterubin.

In some embodiments, compositions of the present disclosure comprise one or more flavanonols. According to some embodiments, the composition comprises dihydrokaempferol and/or taxifolin.

In some embodiments, compositions of the present disclosure comprise one or more flavans. According to some embodiments, the composition comprises one or more flavan-3-ols (e.g., catechin (C), catechin 3-gallate (Cg), epicatechins (EC), epigallocatechin (EGC) epicatechin 3-gallate (ECg), epigallcatechin 3-gallate (EGCg), epiafzelechin, fisetinidol, gallocatechin (GC), gallcatechin 3-gallate (GCg), guibourtinidol, mesquitol, robinetinidol, theaflavin-3-gallate, theaflavin-3'-gallate, theflavin-3,3'-digallate, thearubigin), flavan-4-ols (e.g., apiforol and/or luteoforol) and/or flavan-3,4-diols (e.g., leucocyanidin, leucodelphinidin, leucofisetinidin, leucomalvidin, luecopelargonidin, leucopeonidin, leucorobinetinidin, melacacidin and/or teracacidin) and/or dimers, trimers, oligomers and/or polymers thereof (e.g., one or more proanthocyanidins)

In some embodiments, compositions of the present disclosure comprise one or more isoflavonoids. According to some embodiments, the composition comprises one or more isoflavones (e.g, biochanin A, daidzein, formononetin, genistein and/or glycitein), isoflavanes (e.g., equol, ionchocarpane and/or laxifloorane), isoflavandiols, isoflavenes (e.g., glabrene, haginin D and/or 2-methoxyjudaicin), coumestans (e.g., coumestrol, plicadin and/or wedelolactone), pterocarpans and/or roetonoids.

Compositions of the present disclosure may comprise any suitable flavonoid derivative, including, but not limited to, neoflavonoids (e.g, calophyllolide, coutareagenin, dalbergichromene, dalbergin, nivetin) and pterocarpans (e.g., bitucarpin A, bitucarpin B, eiybraedin A, erybraedin B, eiythrabyssin II, erthyrabissin-1, erycristagallin, glycinol, glyceollidins, glyceollins, glycyrrhizol, maackiain, medicarpin, morisianine, orientanol, phaseolin, pisatin, striatine, trifolirhizin)

Flavonoids and derivatives thereof may be incorporated into compositions of the present disclosure in any suitable form, including, but not limited to, polymorphic and crystalline forms.

Compositions of the present disclosure may comprise any suitable non-flavonoid nod-gene inducer(s), including, but not limited to, jasmonic acid ([1R-[1α,2β(Z)]]-3-oxo-2-(pentenyl)cyclopentaneacetic acid; JA), linoleic acid ((Z,Z)-9,12-Octadecadienoic acid) and linolenic acid ((Z,Z,Z)-9,12,15-octadecatrienoic acid), as well as analogues, derivatives, hydrates, isomers, polymers, salts and solvates thereof.

Jasmonic acid and its methyl ester, methyl jasmonate (MeJA), collectively known as jasmonates, are octadecanoid-based compounds that occur naturally in some plants (e.g., wheat), fungi (e.g., *Botryodiplodia theobromae, Gibbrella fujikuroi*), yeast (e.g., *Saccharomyces cerevisiae*) and bacteria (e.g., *Escherichia coli*). Linoleic acid and linolenic acid may be produced in the course of the biosynthesis of jasmonic acid. Jasmonates, linoleic acid and linolenic acid (and their derivatives) are reported to be inducers of nod gene expression or LCO production by rhizobacteria. See, e.g., Mabood, et al. PLANT PHYSIOL. BIOCHEM. 44(11):759 (2006); Mabood et al., AGR. J. 98(2):289 (2006); Mabood, et al., FIELD CROPS RES. 95(2-3):412 (2006); Mabood & Smith, *Linoleic and linolenic acid induce the expression of nod genes in Bradyrhizobium japonicum USDA 3*, PLANT BIOL. (2001). Non-limiting examples of derivatives of jasmonic acid, linoleic acid, linolenic acid include esters, amides, glycosides and salts. Representative esters are compounds in which the carboxyl group of linoleic acid, linolenic acid, or jasmonic acid has been replaced with a —COR group, where R is an —OR$^1$ group, in which R$^1$ is: an alkyl group, such as a $C_1$-$C_8$ unbranched or branched alkyl group, e.g., a methyl, ethyl or propyl group; an alkenyl group, such as a $C_2$-$C_8$ unbranched or branched alkenyl group; an alkynyl group, such as a $C_2$-$C_8$ unbranched or branched alkynyl group; an aryl group having, for example, 6 to 10 carbon atoms; or a heteroaryl group having, for example, 4 to 9 carbon atoms, wherein the heteroatoms in the heteroaryl group can be, for example, N, O, P, or S. Representative amides are compounds in which the carboxyl group of linoleic acid, linolenic acid, or jasmonic acid has been replaced with a —COR group, where R is an NR$^2$R$^3$ group, in which R$^2$ and R$^3$ are independently: hydrogen; an alkyl group, such as a $C_1$-$C_8$ unbranched or branched alkyl group, e.g., a methyl, ethyl or propyl group; an alkenyl group, such as a $C_2$-$C_8$ unbranched or branched alkenyl group; an alkynyl group, such as a $C_2$-$C_8$ unbranched or branched alkynyl group; an aryl group having, for example, 6 to 10 carbon atoms; or a heteroaryl group having, for example, 4 to 9 carbon atoms, wherein the heteroatoms in the heteroaryl group can be, for example, N, O, P, or S. Esters may be prepared by known methods, such as acid-catalyzed nucleophilic addition, wherein the carboxylic acid is reacted with an alcohol in the presence of a catalytic amount of a mineral acid. Amides may also be prepared by known methods, such as by reacting the carboxylic acid with the appropriate amine in the presence of a coupling agent such as dicyclohexyl carbodiimide (DCC), under neutral conditions. Suitable salts of linoleic acid, linolenic acid and jasmonic acid include e.g., base addition salts. The bases that may be used as reagents to prepare metabolically acceptable base salts of these compounds include those derived from cations such as alkali metal cations (e.g., potassium and sodium) and alkaline earth metal cations (e.g., calcium and magnesium). These salts may be readily prepared by mixing together a solution of linoleic acid, linolenic acid, or jasmonic acid with a solution of the base. The salts may be precipitated from solution and be collected by filtration or may be recovered by other means such as by evaporation of the solvent.

Compositions of the present disclosure may comprise any suitable karrakin(s), including, but not limited to, 2H-furo[2,3-c]pyran-2-ones, as well as analogues, derivatives, hydrates, isomers, polymers, salts and solvates thereof.

In some embodiments, the composition comprises one or more karrakins represented by formula LXXXIV:

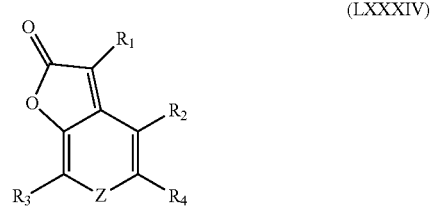

(LXXXIV)

in which Z is O, S or NR$_5$; R$_1$, R$_2$, R$_3$ and R$_4$ are each independently H, alkyl, alkenyl, alkynyl, phenyl, benzyl, hydroxy, hydroxyalkyl, alkoxy, phenyloxy, benzyloxy, CN, COR$_6$, COOR=, halogen, NR$_6$R$_7$, or NO$_2$; and R$_5$, R$_6$ and R$_7$ are each independently H, alkyl or alkenyl, or a biologically acceptable salt thereof.

Examples of biologically acceptable salts of karrakins include acid addition salts formed with biologically acceptable acids, examples of which include hydrochloride, hydrobromide, sulphate or bisulphate, phosphate or hydrogen phosphate, acetate, benzoate, succinate, fumarate, maleate, lactate, citrate, tartrate, gluconate; methanesulphonate, benzenesulphonate and p-toluenesulphonic acid. Additional biologically acceptable metal salts may include alkali metal salts, with bases, examples of which include the sodium and potassium salts. Examples of compounds embraced by formula XXXX and which may be suitable for use in the present disclosure include 3-methyl-2H-furo[2,3-c]pyran-2-one (where R$_1$=CH$_3$, R$_2$, R$_3$, R$_4$=H), 2H-furo[2,3-c]pyran-2-one (where R$_1$, R$_2$, R$_3$, R4=H), 7-methyl-2H-furo[2,3-c]pyran-2-one (where R$_1$, R$_2$, R$_4$=H, R$_3$=CH$_3$), 5-methyl-2H-furo[2,3-c]pyran-2-one (where R$_1$, R$_2$, R$_3$=H, $R_4$=$CH_3$), 3,7-dimethyl-2H-furo[2,3-c]pyran-2-one (where $R_1$, $R_3$=$CH_3$, $R_2$, $R_4$=H), 3,5-dimethyl- 2H-furo[2,3-c]pyran-2-one (where $R_1$, $R_4$=$CH_3$, $R_2$, $R_3$=H), 3,5,7-trimethyl-2H-furo[2,3-c]pyran-2-one (where $R_1$, $R_3$, $R_4$=$CH_3$, $R_2$=H), 5-methoxymethyl-3-methyl-2H-furo[2,3-c]pyran-2-one (where $R_1$=$CH_3$, $R_2$, $R_3$=H, $R_4$=$CH_2OCH_3$), 4-bromo-3,7-dimethyl-2H-furo[2,3-c]pyran-2-one (where $R_1$, $R_3$=$CH_3$, $R_2$=Br, $R_4$=H), 3-methylfuro[2,3-c]pyridin-2(3H)-one (where Z=NH, $R_1$=$CH_3$, $R_2$, $R_3$, $R_4$=H) and 3,6-dimethylfuro[2,3-c]pyridin-2(6H)-one (where Z=N—$CH_3$, $R_1$=$CH_3$, $R_2$, $R_3$, $R_4$=H). See, e.g., U.S. Pat. No. 7,576,213; Halford, *Smoke Signals*, in CHEM. ENG. NEWS (Apr. 12, 2010) (reporting that karrikins or butenolides contained in smoke act as growth stimulants and spur seed germination after a forest fire and can invigorate seeds such as corn, tomatoes, lettuce and onions that had been stored).

Compositions of the present disclosure may comprise any suitable microbial extract(s), including, but not limited to, bacterial extracts, fungal extracts and combinations thereof. In some embodiments, aqueous compositions of the present disclosure comprise one or more extracts of media comprising one or more diazotrophs, phosphate-solubilizing microorganisms and/or biopesticides. In some embodiments, aqueous compositions of the present disclosure comprise an extract of media comprising one or more of the microbial strains included in Appendix A.

Compositions of the present disclosure may comprise any suitable nutrient(s), including, but not limited to, organic acids (e.g., acetic acid, citric acid, lactic acid, malic acid, taurine, etc.), macrominerals (e.g., phosphorous, calcium, magnesium, potassium, sodium, iron, etc.), trace minerals (e.g., boron, cobalt, chloride, chromium, copper, fluoride, iodine, iron, manganese, molybdenum, selenium, zinc, etc.), vitamins, (e.g., vitamin A, vitamin B complex (i.e., vitamin $B_1$, vitamin $B_2$, vitamin $B_3$, vitamin $B_5$, vitamin $B_6$, vitamin $B_7$, vitamin $B_8$, vitamin $B_9$, vitamin $B_{12}$, choline) vitamin C, vitamin D, vitamin E, vitamin K, carotenoids (α-carotene, β-carotene, cryptoxanthin, lutein, lycopene, zeaxanthin, etc.) and combinations thereof. In some embodiments, aqueous compositions of the present disclosure comprise phosphorous, boron, chlorine, copper, iron, manganese, molybdenum and/or zinc.

Compositions of the present disclosure may comprise any suitable pest attractant(s) and/or feeding stimulant(s), including, but not limited to, brevicomin, ceralure, codlelure, cue-lure, disparlure, dominicalure, eugenol, frontalin, gossyplure, grandlure, hexalure, ipsdienol, ipsenol, japonilure, latitlure, lineatin, litlure, looplure, medlure, megatomic acid, methyl eugenol, moguchun, α-multistriatin, muscalure, orfalure, oryctalure, ostramone, rescalure, siglure, sulcatol, trimedlure and/or trunc-call.

Compositions of the present disclosure may comprise any suitable pesticide(s), including, but not limited to, acaricides, fungicides, herbicides, insecticides and nematicides.

Fungicides may be selected so as to provide effective control against a broad spectrum of phytopathogenic fungi (and fungus-like organisms), including, but not limited to, soil-borne fungi from the classes Ascomycetes, Basidiomycetes, Chytridiomycetes, Deuteromycetes (syn. Fungi imperfecti), Peronosporomycetes (syn. Oomycetes), Plasmodiophoromycetes and Zygomycetes. According to some embodiments, the composition comprises a fungicide (or combination of fungicides) that is toxic to one or more strains of *Albugo* (e.g., *A. candida*), *Alternaria* (e.g. *A. alternata*), *Aspergillus* (e.g., *A. candidus, A. clavatus, A. flavus, A. fumigatus, A. parasiticus, A. restrictus, A. sojae, A. solani*), *Blumeria* (e.g., *B. graminis*), *Botrytis* (e.g., *B. cinerea*), *Cladosporum* (e.g., *C. cladosporioides*), *Colletotrichum* (e.g., *C. acutatum, C. boninense, C. capsici, C. caudatum, C. coccodes, C. crassipes, C. dematium, C. desfructivum, C. fragariae, C. gloeosporioides, C. graminicola, C. kehawee, C. lindemuthianum, C. musae, C. orbiculare, C. spinaceae, C. sublineolum, C. trifolii, C. truncatum*), *Fusarium* (e.g., *F. graminearum, F. moniliforme, F. oxysporum, F. roseum, F. fricinctum*), *Helminthosporium, Magnaporthe* (e.g., *M. grisea, M. oryzae*), *Melamspora* (e.g., *M. lini*), *Mycosphaerella* (e.g., *M. graminicola*), *Nematospora, Penicillium* (e.g., *P. rugulosum, P. verrucosum*), *Phakopsora* (e.g., *P. pachyrhizi*), *Phomopsis, Phytiphtoria* (e.g., *P. infestans*), *Puccinia* (e.g., *P. graminis, P. striiformis, P. fritici, P. friticina*), *Pucivinia* (e.g., *P. graministice*), *Pythium, Pytophthora, Rhizoctonia* (e.g., *R. solani*), *Scopulariopsis, Selerotinia, Thielaviopsis* and/or *Ustilago* (e.g. *U. maydis*). Additional examples of fungi may be found in Bradley, *Managing Diseases*, in ILLINOIS AGRONOMY HANDBOOK (2008).

Herbicides may be selected so as to provide effective control against a broad spectrum of plants, including, but not limited to, plants from the families Asteraceae, Caryophyllaceae, Poaceae and Polygonaceae. According to some embodiments, the composition comprises an herbicide (or combination of herbicides) that is toxic to one or more strains of *Echinochloa* (e.g., *E. brevipedicellata, E. callopus, E. chacoensis, E. colona, E. crus-galli, E. crus-pavonis, E. elliptica, E. esculenta, E. frumentacea, E. glabrescens, E. haploclada, E. helodes, E. holciformis, E. inundata, E. jaliscana, E. Jubata, E. kimberleyensis, E. lacunaria, E. macrandra, E. muricata, E. obtusiflora, E. oplismenoides, E. orzyoides, E. paludigena, E. picta, E. pithopus, E. polystachya, E. praestans, E. pyramidalis, E. rotundiflora, E. stagnina, E. telmatophila, E. turneriana, E. ugandensis, E. walteri*), *Fallopia* (e.g., *F. baldschuanica, F. japonica, F. sachalinensis*), *Stellaria* (e.g., *S. media*) and/or *Taraxacum* (e.g., *T. albidum, T. aphrogenes, T. brevicorniculatum, T. californicum, T. cenfrasiatum, T. ceratophorum, T. erythrospermum, T. farinosum, T. holmboei, T. japonicum, T. kok-saghyz, T. laevigatum T. officinale, T. platycarpum*). Additional species of plants that may be targeted by compositions of the present disclosure may be found in Hager, *Weed Management*, in ILLINOIS AGRONOMY HANDBOOK (2008) and LOUX ET AL., WEED CONTROL GUIDE FOR OHIO, INDIANA AND ILLINOIS (2015).

Insecticides may be selected so as to provide effective control against a broad spectrum of insects, including, but not limited to, insects from the orders Coleoptera, Dermaptera, Diptera, Hemiptera, Homoptera, Hymenoptera, Lepidoptera, Orthoptera and Thysanoptera. For example, compositions of the present disclosure may comprise one or more insecticides toxic to insects from the families Acrididae, Aleytodidae, Anobiidae, Anthomyiidae, Aphididae, Bostrichidae, Bruchidae, Cecidomyiidae, Cerambycidae, Cercopidae, Chrysomelidae, Cicadellidae, Coccinellidae, Cryllotalpidae, Cucujidae, Curculionidae, Dermestidae, Elateridae, Gelechiidae, Lygaeidae, Meloidae, Membracidae, Miridae, Noctuidae, Pentatomidae, Pyralidae, Scarabaeidae, Silvanidae, Spingidae, Tenebrionidae and/or Thripidae. According to some embodiments, the composition comprises an insecticide (or combination of insecticides) that is toxic to one or more species of *Acalymma, Acanthaoscelides* (e.g., *A. obtectus*,), *Anasa* (e.g., *A. fristis*), *Anastrepha* (e.g., *A. ludens*), *Anoplophora* (e.g., *A. glabripennis*), *Anthonomus* (e.g., *A. eugenii*), *Acyrthosiphon* (e.g., *A. pisum*), *Bacfrocera* (e.g. *B. dosalis*), *Bemisia* (e.g., *B. argentifolii, B. tabaci*), *Brevicoryne* (e.g., *B. brassicae*), *Bruchidius* (e.g., *B. afrolineatus*), *Bruchus* (e.g., *B. atomarius, B. dentipes, B.

*lentis, B. pisorum* and/or *B. rufipes*), *Callosobruchus* (e.g., *C. chinensis, C. maculatus, C. rhodesianus, C. subinnotatus, C. theobromae*), *Caryedon* (e.g., *C. serratus*), *Cassadinae, Ceratitis* (e.g., *C. capitata*), *Chrysomelinae, Circulifer* (e.g., *C. tenellus*), *Criocerinae, Cryptocephalinae, Cryptolestes* (e.g., *C. ferrugineus, C. pusillis, C. pussilloides*), *Cylas* (e.g., *C. formicarius*), *Delia* (e.g., *D. antiqua*), *Diabrotica, Diaphania* (e.g., *D. nitidalis*), *Diaphorina* (e.g., *D. cifri*), *Donaciinae, Ephestia* (e.g., *E. cautella, E. elutella, E., keuhniella*), *Epilachna* (e.g., *E. varivesfris*), *Epiphyas* (e.g., *E. postvittana*), *Eumolpinae, Galerucinae, Helicoverpa* (e.g., *H. zea*), *Heteroligus* (e.g., *H. meles*), *Iobesia* (e.g., *I. bofrana*), *Lamprosomatinae, Lasioderma* (e.g., *L. serricorne*), *Leptinotarsa* (e.g., *L. decemlineata*), *Leptoglossus, Liriomyza* (e.g., *L. frifolii*), *Manducca, Melittia* (e.g., *M. cucurbitae*), *Myzus* (e.g., *M. persicae*), *Nezara* (e.g., *N. viridula*), *Orzaephilus* (e.g., *O. merator, O. surinamensis*), *Osfrinia* (e.g., *O. nubilalis*), *Phthorimaea* (e.g., *P. operculella*), *Pieris* (e.g., *P. rapae*), *Plodia* (e.g., *P. interpunctella*), *Plutella* (e.g., *P. xylostella*), *Popillia* (e.g., *P. japonica*), *Prostephanus* (e.g., *P. truncates*), *Psila, Rhizopertha* (e.g., *R. dominica*), *Rhopalosiphum* (e.g., *R. maidis*), *Sagrinae, Solenopsis* (e.g., *S. Invicta*), *Spilopyrinae, Sitophilus* (e.g., *S. granaries, S. oryzae* and/or *S. zeamais*), *Sitofroga* (e.g., *S. cerealella*), *Spodoptera* (e.g., *S. frugiperda*), *Stegobium* (e.g., *S. paniceum*), *Synetinae, Tenebrio* (e.g., *T. malens* and/or *T. molitor*), *Thrips* (e.g., *T. tabaci*), *Trialeurodes* (e.g., *T. vaporariorum*), *Tribolium* (e.g., *T. castaneum* and/or *T. confusum*), *Trichoplusia* (e.g., *T. ni*), *Trogoderma* (e.g., *T. granarium*) and *Trogossitidae* (e.g., *T. mauritanicus*). Additional species of insects that may be targeted by compositions of the present disclosure may be found in CAPINERA, HANDBOOK OF VEGETABLE PESTS (2001) and Steffey and Gray, *Managing Insect Pests*, in ILLINOIS AGRONOMY HANDBOOK (2008).

Nematicides may be selected so as to provide effective control against a broad spectrum of nematodes, including, but not limited to, phytoparasitic nematodes from the classes Chromadorea and Enoplea. According to some embodiments, the composition comprises a nematicide (or combination of nematicides) that is toxic to one or more strains of *Anguina, Aphelenchoides, Belonolaimus, Bursaphelenchus, Ditylenchus, Globodera, Helicotylenchus, Heterodera, Hirschmanniella, Meloidogyne, Naccobus, Pratylenchus, Radopholus, Rotylenshulus, Trichodorus, Tylenchulus* and/or *Xiphinema*. Additional species that may be targeted by compositions of the present disclosure may be found in CAPINERA, HANDBOOK OF VEGETABLE PESTS (2001) and Niblack, *Nematodes*, in ILLINOIS AGRONOMY HANDBOOK (2008).

In some embodiments, compositions of the present disclosure comprise one or more chemical fungicides. Non-limiting examples of chemical fungicides include strobilurins, such as azoxystrobin, coumethoxystrobin, coumoxystrobin, dimoxystrobin, enestroburin, fluoxastrobin, kresoxim-methyl, metominostrobin, orysastrobin, picoxystrobin, pyraclostrobin, pyrametostrobin, pyraoxystrobin, pyribencarb, trifloxystrobin, 2-[2-(2,5-dimethyl-phenoxymethyl)-phenyl]-3-methoxy-acrylic acid methyl ester and 2-(2-(3-(2,6-dichlorophenyl)-1-methyl-allylideneaminooxymethyl)-phenyl)-2-methoxyimino-N-methyl-acetamide; carboxamides, such as carboxanilides (e.g., benalaxyl, benalaxyl-M, benodanil, bixafen, boscalid, carboxin, fenfuram, fenhexamid, flutolanil, fluxapyroxad, furametpyr, isopyrazam, isotianil, kiralaxyl, mepronil, metalaxyl, metalaxyl-M (mefenoxam), ofurace, oxadixyl, oxycarboxin, penflufen, penthiopyrad, sedaxane, tecloftalam, thifluzamide, tiadinil, 2-amino-4-methyl-thiazole-5-carboxanilide, N-(4'-trifluoromethylthiobiphenyl-2-yl)-3-difluoromethyl-1-methyl-1H-pyrazole-4-carboxamide, N-(2-(1,3,3-trimethylbutyl)-phenyl)-1,3-dimethyl-5-fluoro-1H-pyrazole-4-carboxamide), carboxylic morpholides (e.g., dimethomorph, flumorph, pyrimorph), benzoic acid amides (e.g., flumetover, fluopicolide, fluopyram, zoxamide), carpropamid, dicyclomet, fenehexamid, mandiproamid, oxytetracyclin, silthiofam, spiroxamine, and N-(6-methoxy-pyridin-3-yl) cyclopropanecarboxylic acid amide; azoles, such as triazoles (e.g., azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole) and imidazoles (e.g., cyazofamid, imazalil, pefurazoate, prochloraz, triflumizol); heterocyclic compounds, such as pyridines (e.g., fluazinam, pyrifenox (cf.D1b), 3-[5-(4-chloro-phenyl)-2,3-dimethyl-isoxazolidin-3-yl]-pyridine, 3-[5-(4-methyl-phenyl)-2,3-dimethyl-isoxazolidin-3-yl]-pyridine), pyrimidines (e.g., bupirimate, cyprodinil, diflumetorim, fenarimol, ferimzone, mepanipyrim, nitrapyrin, nuarimol, pyrimethanil), piperazines (e.g., triforine), pirroles (e.g., fenpiclonil, fludioxonil), morpholines (e.g., aldimorph, dodemorph, dodemorph-acetate, fenpropimorph, tridemorph), piperidines (e.g., fenpropidin), dicarboximides (e.g., fluoroimid, iprodione, procymidone, vinclozolin), non-aromatic 5-membered heterocycles (e.g., famoxadone, fenamidone, flutianil, octhilinone, probenazole, 5-amino-2-isopropyl-3-oxo-4-ortho-tolyl-2,3-dihydro-pyrazole-1-carbothioic acid S-allyl ester), acibenzolar-S-methyl, ametoctradin, amisulbrom, anilazin, blasticidin-S, captafol, captan, chinomethionat, dazomet, debacarb, diclomezine, difenzoquat, difenzoquat-methylsulfate, fenoxanil, Folpet, oxolinic acid, piperalin, proquinazid, pyroquilon, quinoxyfen, triazoxide, tricyclazole, 2-butoxy-6-iodo-3-propylchromen-4-one, 5-chloro-1-(4,6-dimethoxy-pyrimidin-2-yl)-2-methyl-1H-benzoimidazole and 5-chloro-7-(4-methylpiperidin-1-yl)-6-(2,4,6-trifluorophenyl)-[1,2,4]triazolo-[1,5-a]pyrimidine; benzimidazoles, such as carbendazim; and other active substances, such as guanidines (e.g., guanidine, dodine, dodine free base, guazatine, guazatine-acetate, iminoctadine), iminoctadine-triacetate and iminoctadine-tris(albesilate); antibiotics (e.g., kasugamycin, kasugamycin hydrochloride-hydrate, streptomycin, polyoxine and validamycin A); nitrophenyl derivates (e.g., binapacryl, dicloran, dinobuton, dinocap, nitrothal-isopropyl, tecnazen); organometal compounds (e.g., fentin salts, such as fentin-acetate, fentin chloride, fentin hydroxide); sulfur-containing heterocyclyl compounds (e.g., dithianon, isoprothiolane); organophosphorus compounds (e.g., edifenphos, fosetyl, fosetyl-aluminum, iprobenfos, phosphorus acid and its salts, pyrazophos, tolclofos-methyl); organochlorine compounds (e.g., chlorothalonil, dichlofluanid, dichlorophen, flusulfamide, hexachlorobenzene, pencycuron, pentachlorphenole and its salts, phthalide, quintozene, thiophanate-methyl, thiophanate, tolylfluanid, N-(4-chloro-2-nitro-phenyl)-N-ethyl-4-methyl-benzenesulfonamide) and inorganic active substances (e.g., Bordeaux mixture, copper acetate, copper hydroxide, copper oxychloride, basic copper sulfate, sulfur) and combinations thereof. In some embodiments, compositions of the present disclosure comprise acibenzolar-S-methyl, azoxystrobin, benalaxyl, bixafen, boscalid, carbendazim, cyproconazole, dimethomorph, epoxiconazole, fludioxonil, fluopyram, fluoxastrobin, flutianil, flutolanil, fluxapyroxad, fosetyl-Al, ipconazole, isopyrazam, kresoxim-methyl, mefenoxam, metalaxyl, metconazole, myclobutanil, orysastrobin, penflufen, penthiopyrad, picoxystrobin, propiconazole, prothioconazole, pyraclostrobin, sedaxane, silthiofam, tebuconazole, thiabendazole, thifluzamide, thiophanate, tolclofos-methyl, trifloxystrobin and triticonazole. In some embodiments, compositions of the present disclosure comprise azoxystrobin, pyraclostrobin, fluoxastrobin, trifloxystrobin, ipconazole, prothioconazole, sedaxane, fludioxonil, metalaxyl, mefenoxam, thiabendazole, fluxapyroxad and/or fluopyram. In some embodiments, compositions of the present disclosure comprise one or more aromatic hydrocarbons, benzimidazoles, benzthiadiazole, carboxamides, carboxylic acid amides, morpholines, phenylamides, phosphonates, quinone outside inhibitors (e.g. strobilurins), thiazolidines, thiophanates, thiophene carboxamides and/or triazoles.

In some embodiments, aqueous compositions of the present disclosure comprise one or more chemical herbicides. Non-limiting examples of chemical herbicides include 2,4-dichlorophenoxyacetic acid (2,4-D), 2,4,5-trichlorophenoxyacetic acid (2,4,5-T), ametryn, amicarbazone, aminocyclopyrachlor, acetochlor, acifluorfen, alachlor, atrazine, azafenidin, bentazon, benzofenap, bifenox, bromacil, bromoxynil, butachlor, butafenacil, butroxydim, carfentrazone-ethyl, chlorimuron, chlorotoluro, clethodim, clodinafop, clomazone, cyanazine, cycloxydim, cyhalofop, desmedipham, desmetryn, dicamba, diclofop, diflufenican, dimefuron, diuron, dithiopyr, ethofumesate, fenoxaprop, fluazifop, fluazifop-P, flufenacet, fluometuron, flufenpyr-ethyl, flumiclorac-pentyl, flumioxazin, fluoroglycofen, fluthiacet-methyl, fomesafe, fomesafen, foramsulfuron, glyphosate, glufosinate, haloxyfop, hexazinone, imazamox, imazaquin, imazethapyr, indaziflam, iodosulfuron, ioxynil, isoproturon, isoxaflutole, lactofen, linuron, mecoprop, mecoprop-P, mesosulfuron, mesotrion, metamitron, metazochlor, methibenzuron , metolachlor (and S-metolachlor), metoxuron, metribuzin, monolinuron, oxadiargyl, oxadiazon, oxaziclomefone, oxyfluorfen, phenmedipham, pretilachlor, profoxydim, prometon, prometry, propachlor, propanil , propaquizafop, propisochlor, propoxycarbazone, pyraflufen-ethyl, pyrazon, pyrazolynate, pyrazoxyfen, pyridate, quizalofop, quizalofop-P (e.g., quizalofop-ethyl, quizalofop-P-ethyl, clodinafop-propargyl, cyhalofop-butyl, diclofop-methyl, fenoxaprop-P-butyl, fluazifop-P-butyl, haloxyfop-methyl, haloxyfop-R-methyl), saflufenacil, sethoxydim, siduron, simazine, simetryn, sulcotrione, sulfentrazone, tebuthiuron, tembotrione, tepraloxydim, terbacil, terbumeton, terbuthylazine, thaxtomin (e.g., the thaxtomins described in US Pat. No.: 7,989,393), thenylchlor, thiencarbazone-methyl, tralkoxydim, triclopyr, trietazine, tropramezone, salts and esters thereof; racemic mixtures and resolved isomers thereof and combinations thereof. In some embodiments, compositions of the present disclosure comprise acetochlor, clethodim, dicamba, flumioxazin, fomesafen, glyphosate, glufosinate, mesotrione, quizalofop, saflufenacil, sulcotrione, S-3100 and/or 2,4-D. In some embodiments, compositions of the present disclosure comprise glyphosate, glufosinate, dicamba, 2,4-D, acetochlor, metolachlor, pyroxasulfone, flumioxazin, fomesafen, lactofen, metribuzin, mesotrione, and/or ethyl 2-((3-(2-chloro-4-fluoro-5-(3-methyl-2,6-dioxo-4-(trifluoromethyl)-2,3-dihydropyrimidin-1(6H)-yl)phenoxy)pyridin-2-yl)oxy)acetate. In some embodiments, compositions of the present disclosure comprise one or more acetyl CoA carboxylase (ACCase) inhibitors, acetolactate synthase (ALS) inhibitors, acetohydroxy acid synthase (AHAS) inhibitors, photosystem II inhibitors, photosystem I inhibitors, protoporphyrinogen oxidase (PPO or Protox) inhibitors, carotenoid biosynthesis inhibitors, enolpyruvyl shikimate-3-phosphate (EPSP) synthase inhibitor, glutamine synthetase inhibitor, dihydropteroate synthetase inhibitor, mitosis inhibitors, 4-hydroxyphenyl-pyruvate-dioxygenase (4-HPPD) inhibitors, synthetic auxins, auxin herbicide salts, auxin transport inhibitors, nucleic acid inhibitors and/or one or more salts, esters, racemic mixtures and/or resolved isomers thereof.

In some embodiments, aqueous compositions of the present disclosure comprise one or more chemical insecticides and/or nematicides. Non-limiting examples of chemical insecticides and nematicides include abamectin, acrinathrin, aldicarb, aldoxycarb, alpha-cypermethrin, betacyfluthrin, bifenthrin, cyhalothrin, cypermethrin, deltamethrin, esfenvalerate, etofenprox, fenpropathrin, fenvalerate, flucythrinate, fosthiazate, lambda-cyhalothrin, gamma-cyhalothrin, permethrin, tau-fluvalinate, transfluthrin, zeta-cypermethrin, cyfluthrin, bifenthrin, tefluthrin, eflusilanat, fubfenprox, pyrethrin, resmethrin, imidacloprid, acetamiprid, thiamethoxam, nitenpyram, thiacloprid, dinotefuran, clothianidin, chlorfluazuron, diflubenzuron, lufenuron, teflubenzuron, triflumuron, novaluron, flufenoxuron, hexaflumuron, bistrifluoron, noviflumuron, buprofezin, cyromazine, methoxyfenozide, tebufenozide, halofenozide, chromafenozide, endosulfan, fipronil, ethiprole, pyrafluprole, pyriprole, flubendiamide, chlorantraniliprole, cyazypyr, emamectin, emamectin benzoate, abamectin, ivermectin, milbemectin, lepimectin, tebufenpyrad, fenpyroximate, pyridaben, fenazaquin, pyrimidifen, tolfenpyrad, dicofol, cyenopyrafen, cyflumetofen, acequinocyl, fluacrypyrin, bifenazate, diafenthiuron, etoxazole, clofentezine, spinosad, triarathen, tetradifon, propargite, hexythiazox, bromopropylate, chinomethionat, amitraz, pyrifluquinazon, pymetrozine, flonicamid, pyriproxyfen, diofenolan, chlorfenapyr, metaflumizone, indoxacarb, chlorpyrifos, spirodiclofen, spiromesifen, spirotetramat, pyridalyl, spinctoram, acephate, triazophos, profenofos, oxamyl, spinetoram, fenamiphos, fenamipclothiahos, 4-{[(6-chloropyrid-3-yl)methyl](2,2-difluoroethyl) amino}furan-2(5H)-one, 3,5-disubstituted-1,2,4-oxadiazole compounds, 3-phenyl-5-(thien-2-yl)-1,2,4-oxadiazole, cadusaphos, carbaryl, carbofuran, ethoprophos, thiodicarb, aldicarb, aldoxycarb, metamidophos, methiocarb, sulfoxaflor, methamidophos, cyantraniliprole and tioxazofen and combinations thereof. In some embodiments, compositions of the present disclosure comprise abamectin, aldicarb, aldoxycarb, bifenthrin, carbofuran, chlorantraniliporle, chlothianidin, cyfluthrin, cyhalothrin, cypermethrin, cyantraniliprole, deltamethrin, dinotefuran, emamectin, ethiprole, fenamiphos, fipronil, flubendiamide, fosthiazate, imidacloprid, ivermectin, lambda-cyhalothrin, milbemectin, nitenpyram, oxamyl, permethrin, spinetoram, spinosad, spirodichlofen, spirotetramat, tefluthrin, thiacloprid, thiamethoxam, tioxazofen and/or thiodicarb. In some embodiments, compositions of the present disclosure comprise one or more carbamates, diamides, macrocyclic lactones, neonicotinoids, organophosphates, phenylpyrazoles, pyrethrins, spinosyns, synthetic pyrethroids, tetronic acids and/or tetramic acids. In some embodiments, compositions of the present disclosure comprise an insecticide selected from the group consisting of clothianidin, thiamethoxam, imidacloprid, cyantraniliprole, chlorantraniliprole, fluopyram and tioxazafen.

In some embodiments, aqueous compositions of the present disclosure comprise one or more biopesticides (e.g., one or more biofungicides, bioinsecticides and/or bionematicides). Examples of microbial strains that exhibit biopesticidal activity are included in Appendix A, along with strains that exhibit nitrogen-fixing activity, phosphate-solubilizing activity, etc. Additional examples of pesticides may be found in Bradley, *Managing Diseases*, in ILLINOIS AGRONOMY HANDBOOK (2008); Hager, *Weed Management*, in ILLINOIS AGRONOMY HANDBOOK (2008); LOUX ET AL., WEED CONTROL GUIDE FOR OHIO, INDIANA AND ILLINOIS (2015); Niblack, *Nematodes*, in ILLINOIS AGRONOMY HANDBOOK (2008); and Steffey and Gray, *Managing Insect Pests*, in ILLINOIS AGRONOMY HANDBOOK (2008).

Compositions of the present disclosure may comprise any suitable stabilizing compound(s), including, but not limited to, maltodextrins, monosaccharides, disaccharides, oligosaccharides, sugar alcohols, humic acids, fulvic acids, malt extracts, peat extracts, betaines, prolines, sarcosines, peptones, skim milks, oxidation control components, hygroscopic polymers and UV protectants.

In some embodiments, the composition comprises one or more maltodextrins (e.g., one or more maltodextrins having a dextrose equivalent value (DEV) of about 3, 4, 5, 6, 7, 8, 9, 10, 11, 12, 13, 14, 15, 16, 17, 18, 19, 20, 21, 22, 23, 24, or 25). According to some embodiments, the composition comprises one or more maltodextrins having a DEV of about 5 to about 6, 7, 8, 9, 10, 11, 12, 14, 15, 16, 17, 18, 19 or 20, about 10 to about 11, 12, 14, 15, 16, 17, 18, 19 or 20, or about 15 to about 16, 17, 18, 19 or 20. According to some embodiments, the composition comprises a combination of maltodextrins having a DEV of about 5 to about 6, 7, 8, 9, 10, 11, 12, 14, 15, 16, 17, 18, 19 or 20, about 10 to about 11, 12, 14, 15, 16, 17, 18, 19 or 20, or about 15 to about 16, 17, 18, 19 or 20. Non-limiting examples of maltodextrins include MALTRIN® M040 (DEV=5; molecular weight=3600; Grain Processing Corporation, Muscatine, IA), MALTRIN® M100 (DEV=10; molecular weight=1800; Grain Processing Corporation, Muscatine, IA), MALTRIN® M150 (DEV=15; molecular weight=1200; Grain Processing Corporation, Muscatine, IA), MALTRIN® M180 (DEV=18; molecular weight=1050; Grain Processing Corporation, Muscatine, IA), MALTRIN® M200 (DEV=20; molecular weight=900; Grain Processing Corporation, Muscatine, IA), MALTRIN® M250 (DEV=25; molecular weight=720; Grain Processing Corporation, Muscatine, IA); MALTRIN QD® M580 (DEV=16.5-19.9; Grain Processing Corporation, Muscatine, Iowa); MALTRIN QD® M585 (DEV=15.0-19.9; Grain Processing Corporation, Muscatine, IA); MALTRIN QD® M600 (DEV=20.0-23.0; Grain Processing Corporation, Muscatine, IA); GLOBE® Plus 15 DE (Ingredion Inc., Westchester, IL); and combinations thereof.

In some embodiments, the composition comprises one or more monosaccharides (e.g., allose, altrose, arabinose, fructose, galactose, glucose, gulose, iodose, lyxose, mannose, ribose, talose, threose and/or xylose). According to some embodiments, the composition comprises gluscose. According to some embodiments, the composition does not comprise glucose.

In some embodiments, the composition comprises one or more disaccharides (e.g., cellobiose, chitobiose, gentiobiose, gentiobiulose, isomaltose, kojibiose, lactose, lactulose, laminaribiose, maltose (e.g., maltose monohydrate, anhydrous maltose), maltulose, mannobiose, melibiose, melibiulose, nigerose, palatinose, rutinose, rutinulose, sophorose, sucrose, trehalose, turanose and/or xylobiose). According to some embodiments, the composition comprises maltose. According to some embodiments, the composition does not comprise maltose. According to some embodiments, the composition comprises trehalose. According to some embodiments, the composition does not comprise trehalose.

In some embodiments, the composition comprises one or more oligosaccharides (e.g., fructo-oligosaccharides, galacto-oligosaccharides, mannon-oligosaccharides and/or raffinose).

In some embodiments, the composition comprises one or more sugar alcohols (e.g., arabitol, erythritol, fucitol, galactitol, glycerol, iditol, inositol, isomalt, lactitol, maltitol, maltotetraitol, maltotriitol, mannitol, polyglycitol, ribitol, sorbitol, threitol, volemitol and/or xylitol).

In some embodiments, the composition comprises one or more humic acids (e.g., one or more leonardite humic acids, lignite humic acids, peat humic acids and water-extracted humic acids). In some embodiments, the composition comprises ammonium humate, boron humate, potassium humate and/or sodium humate. In some embodiments, one or more of ammonium humate, boron humate, potassium humate and sodium humate is/are excluded from the composition. Non-limiting examples of humic acids that may be useful in embodiments of the present disclosure include MDL Number MFCD00147177 (CAS Number 1415-93-6), MDL Number MFCD00135560 (CAS Number 68131-04-4), MDL Number MFCS22495372 (CAS Number 68514-28-3), CAS Number 93924-35-7, and CAS Number 308067-45-0.

In some embodiments, the composition comprises one or more fulvic acids (e.g., one or more leonardite fulvic acids, lignite fulvic acids, peat fulvic acids and/or water-extracted fulvic acids). In some embodiments, the composition comprises ammonium fulvate, boron fulvate, potassium fulvate and/or sodium fulvate. In some embodiments, one or more of ammonium fulvate, boron fulvate, potassium fulvate and sodium fulvate is/are excluded from compositions of the present disclosure. Nonlimiting examples of fulvic acids that may be useful in embodiments of the present disclosure include MDL Number MFCD09838488 (CAS Number 479-66-3).

In some embodiments, the composition comprises one or more betaines (e.g., trimethylglycine).

In some embodiments, the composition comprises one or more peptones (e.g., bacterial peptones, meat peptones, milk peptones, vegetable peptones and yeast peptones).

In some embodiments, the composition comprises one or more oxidation control components (e.g., one or more antioxidants and/or oxygen scavengers). According to some embodiments, the composition comprises one or more oxygen scavengers, such as ascrobic acid, ascorbate salts, catechol and/or sodium hydrogen carbonate. According to some embodiments, the composition comprises one or more antioxidants, such as ascorbic acid, ascorbyl palmitate, ascorbyl stearate, calcium ascorbate, carotenoids, lipoic acid, phenolic compounds (e.g., flavonoids, flavones, flavonols), potassium ascorbate, sodium ascorbate, thiols (e.g., glutathione, lipoic acid, N-acetyl cysteine), tocopherols, tocotrienols, ubiquinone and/or uric acid. Non-limiting examples of antioxidants include those that are soluble in the cell membrane (e.g., alpha tocopherol (vitamin E), ascorbyl palmitate) and those that are soluble in water (e.g., ascorbic acid and isomers or ascorbic acid, sodium or potassium salts of ascorbic acid or isomers or ascorbic acid, glutathione, sodium or potassium salts of glutathione). In some embodiments, use of a membrane-soluble antioxidant necessitates the addition of one or more surfactants to adequately disperse the antioxidant within the composition. According to some embodiments, the composition is/comprises ascorbic acid and/or glutathione.

In some embodiments, the composition comprises one or more hygroscopic polymers (e.g., hygroscopic agars, albumins, alginates, carrageenans, celluloses, gums (e.g., cellulose gum, guar gum, gum arabic, gum combretum, xantham gum), methyl celluloses, nylons, pectins, polyacrylic acids, polycaprolactones, polycarbonates, polyethylene glycols (PEG), polyethylenimines (PEI), polylactides, polymethylacrylates (PMA), polyurethanes, polyvinyl alcohols (PVA), polyvinylpyrrolidones (PVP), propylene glycols, sodium carboxymethyl celluloses and/or starches). Non-limiting examples of polymers include AGRIMER™ polymers (e.g., 30, AL-10 LC, AL-22, AT/ATF, VA 3E, VA 31, VA 5E, VA 51, VA 6, VA 6E, VA 7E, VA 71, VEMA AN-216, VEMA AN-990, VEMA AN-1200, VEMA AN-1980, VEMA H-815 MS; Ashland Specialty Ingredients, Wilmington, DE), EASYSPERSE™ polymers (Ashland Specialty Ingredients, Wilmington, DE); DISCO™ AG polymers (e.g., L-250, L-280, L-285, L-286, L-320, L-323, L-517, L-519, L-520, L800; Incotec Inc , Salinas, CA), KELZAN® polymers (Bri-Chem Supply Ltd., Calgary, Alberta, CA), SEEDWORX™ polymers (e.g., Bio 200; Aginnovation, LLC, Walnut Groove, CA), TICAXAN® xanthan powders, such as PRE-HYDRATED® TICAXAN® Rapid-3 Powder (TIC Gums, White Marsh, MD) and combinations thereof. Additional examples of polymers may be found in Pouci, et al. AM. J. AGRIC. BIOL. SCI. 3(1):299 (2008).

In some embodiments, the composition comprises one or more UV protectants (e.g., one or more aromatic amino acids (e.g., tryptophan, tyrosine), carotenoids, cinnamates, lignosulfonates (e.g., calcium lignosulfonate, sodium lignosulfonate), melanins, mycosporines, polyphenols and/or salicylates). Non-limiting examples of UV protectants include Borregaard LignoTech™ lignosulfonates (e.g., Borresperse 3A, Borresperse CA, Borresperse NA, Marasperse AG, Norlig A, Norlig 11D, Ufoxane 3A, Ultrazine NA, Vanisperse CB; Borregaard Lignotech, Sarpsborg, Norway) and combinations thereof. Additional examples of UV protectants may be found in BURGES, FORMULATION OF MICROBIAL BIOPESTICIDES: BENEFICIAL MICROORGANISMS, NEMATODES AND SEED TREATMENTS (Springer Science & Business Media) (2012).

Compositions of the present disclosure may comprise any suitable excipient(s), including, but not limited to, drying agents, anti-freezing agents, seed flowability agents, safeners, and pH buffers.

Compositions of the present disclosure may comprise any suitable drying agent(s), including, but not limited to, drying powders. Non-limiting examples of drying agents include AEROSIL® hydrophobic fumed silica powders (Evonik Corporation, Parsippany, NJ), BENTOLITE® powders (BYK-Chemie GmbH, Wesel, Germany), INCOTEC® powders (INCOTEC Inc , Salinas, CA), SIPERNAT® silica powders (Evonik Corporation, Parsippany, NJ) and combinations thereof. Additional examples of drying agents may be found in BURGES, FORMULATION OF MICROBIAL BIOPESTICIDES: BENEFICIAL MICROORGANISMS, NEMATODES AND SEED TREATMENTS (Springer Science & Business Media) (2012). In some embodiments, compositions of the present disclosure comprise calcium stearate, clay (e.g., attapulgite clay, montmorillonite clay), graphite, magnesium stearate, magnesium sulfate, powdered milk, silica (e.g., fumed silica, hydrophobically-coated silica, precipitated silica), soy lecithin and/or talc.

Compositions of the present disclosure may comprise any suitable anti-freezing agent(s), including, but not limited to, ethylene glycol, glycerin, propylene glycol and urea.

Compositions of the present disclosure may comprise any seed flowability agent to improve the lubricity of the treated seeds. The flowability agent may comprise one or more liquid lubricants, solid lubricants, liquid emulsions, or suspensions of solid lubricants. Non-limiting examples of flowability agents include, for example, lubricants such as fats and oils, natural and synthetic waxes, graphite, talc, fluoropolymers (e.g., polytetrafluoroethylene), and solid lubricants such as molybdenum disulfide and tungsten disulfide. In some instances, the flowability agent comprises a wax material. Non-limiting examples of wax materials that can be incorporated into the liquid seed treatment composition include plant and animal-derived waxes such as carnauba wax, candelilla wax, ouricury wax, beeswax, spermaceti, and petroleum derived waxes, such as paraffin wax. For example, in some instances, the flowability agent comprises carnauba wax. In some instances, the flowability agent comprises an oil. For example, the flowability agent may comprise soybean oil. Non-limiting examples of commercially available wax materials suitable for use as flowability agents include AQUAKLEAN 418 supplied by Micro Powders, Inc. (an anionic aqueous emulsion comprising extra light carnauba wax at 35% solids content).

Compositions of the present disclosure may comprise any suitable safener(s), including, but not limited to, napthalic anhydride.

Compositions of the present disclosure may comprise any suitable pH buffer(s), including, but not limited to, potassium phosphate monobasic and potassium phosphate dibasic. In some embodiments, the composition comprises one or more pH buffers selected to provide a composition having a pH of less than 10, typically from about 4.5 to about 9.5, from about 6 to about 8, or about 7.

Agriculturally beneficial agents, stabilizing compounds and excipients may be incorporated into compositions of the present disclosure in any suitable amount(s)/concentration (s). The absolute value of the amount/concentration that is/are sufficient to cause the desired effect(s) may be affected by factors such as the type, size and volume of material to which the composition will be applied, the type(s) of microorganisms in the composition, the number of microorganisms in the composition, the stability of the microorganisms in the composition and storage conditions (e.g., temperature, relative humidity, duration). Those skilled in the art will understand how to select effective amounts/concentrations using routine dose-response experiments. Guidance for the selection of appropriate amounts/concentrations can be found, for example, in International Patent Application Nos. PCT/US2016/067714 and PCT/US2017/116846.

In some embodiments, agriculturally beneficial microorganisms is/are present in an amount ranging from about $1 \times 10^1$ to about $1 \times 10^{12}$ colony-forming units (cfu) per gram and/or milliliter of composition. According to some embodiments, the composition comprises about $1 \times 10^1$, $1 \times 10^2$, $1 \times 10^3$, $1 \times 10^4$, $1 \times 10^5$, $1 \times 10^6$, $1 \times 10^7$, $1 \times 10^8$, $1 \times 10^9$, $1 \times 10^{10}$, $1 \times 10^{11}$, $1 \times 10^{12}$ or more cfu of one or more agriculturally beneficial microorganisms per gram and/or milliliter of composition (e.g., about $1 \times 10^4$ to about $1 \times 10^9$ cfu/g of *Bacillus amyloliquefaciens* TJ1000 (also known as 1BE, isolate ATCC BAA-390), *Bradyrhizobium. japonicum* NRRL B-50586 (also deposited as NRRL B-59565), *Bradyrhizobium. japonicum* NRRL B-50587 (also deposited as NRRL B-59566), *Bradyrhizobium. japonicum* NRRL B-50588 (also deposited as NRRL B-59567), *Bradyrhizobium. japonicum* NRRL B-50589 (also deposited as NRRL B-59568), *Bradyrhizobium. japonicum* NRRL B-50590 (also deposited as NRRL B-59569), *Bradyrhizobium.*

*japonicum* NRRL B-50591 (also deposited as NRRL B-59570), *Bradyrhizobium. japonicum* NRRL B-50592 (also deposited as NRRL B-59571), *Bradyrhizobium. japonicum* NRRL B-50593 (also deposited as NRRL B-59572), *Bradyrhizobium. japonicum* NRRL B-50594 (also deposited as NRRL B-50493), *Bradyrhizobium. japonicum* NRRL B-50608, *Bradyrhizobium. japonicum* NRRL B-50609, *Bradyrhizobium. japonicum* NRRL B-50610, *Bradyrhizobium. japonicum* NRRL B-50611, *Bradyrhizobium. japonicum* NRRL B-50612, *Bradyrhizobium. japonicum* NRRL B-50726, *Bradyrhizobium. japonicum* NRRL B-50727, *Bradyrhizobium. japonicum* NRRL B-50728, *Bradyrhizobium. japonicum* NRRL B-50729, *Bradyrhizobium. japonicum* NRRL B-50730, *Bradyrhizobium. japonicum* SEMIA 566, *Bradyrhizobium. japonicum* SEMIA 5079, *Bradyrhizobium. japonicum* SEMIA 5080, *Bradyrhizobium. japonicum* USDA 6, *Bradyrhizobium. japonicum* USDA 110, *Bradyrhizobium. japonicum* USDA 122, *Bradyrhizobium. japonicum* USDA 123, *Bradyrhizobium. japonicum* USDA 127, *Bradyrhizobium. japonicum* USDA 129, *Bradyrhizobium. japonicum* USDA 532C, *Metarhizium anisopliae* F52, *Penicillium bilaiae* ATCC 18309, *Penicillium bilaiae* ATCC 20851, *Penicillium bilaiae* ATCC 22348, *Penicillium bilaiae* NRRL 50162, *Penicillium bilaiae* NRRL 50169, *Penicillium bilaiae* NRRL 50776, *Penicillium bilaiae* NRRL 50777, *Penicillium bilaiae* NRRL 50778, *Penicillium bilaiae* NRRL 50777, *Penicillium bilaiae* NRRL 50778, *Penicillium bilaiae* NRRL 50779, *Penicillium bilaiae* NRRL 50780, *Penicillium bilaiae* NRRL 50781, *Penicillium bilaiae* NRRL 50782, *Penicillium bilaiae* NRRL 50783, *Penicillium bilaiae* NRRL 50784, *Penicillium bilaiae* NRRL 50785, *Penicillium bilaiae* NRRL 50786, *Penicillium bilaiae* NRRL 50787, *Penicillium bilaiae* NRRL 50788, *Penicillium bilaiae* RS7B-SD1, *Trichoderma virens* G1-3, and/or *Yersinia entomophaga* O82KB8). In some embodiments, compositions of the present disclosure comprise at least $1 \times 10^4$, $1 \times 10^5$, $1 \times 10^6$, $1 \times 10^7$, $1 \times 10^8$, $1 \times 10^9$, $1 \times 10^{10}$, $1 \times 10^{11}$, $1 \times 10^{12}$ cfu of one or more agriculturally beneficial microorganisms per gram and/or milliliter of composition.

In some embodiments, spores from one or more agriculturally beneficial microorganisms comprise about 0.1 to about 90% (by weight) of the composition. According to some embodiments, the composition comprises about 0.1, 0.2, 0.3, 0.4, 0.5, 0.6, 0.7, 0.8, 0.9, 1, 1.25, 1.5, 1.75, 2, 2.25, 2.5, 2.75, 3, 3.25, 3.5, 3.75, 4, 4.25, 4.5, 4.75, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, 70, 75, 80, 85, 90, 95% or more (by weight) of microbial spores from one or more agriculturally beneficial microorganisms (e.g., about 10% *Bacillus amyloliquefaciens* TJ1000, *Metarhizium anisopliae* F52, *Penicillium bilaiae* ATCC 18309, *Penicillium bilaiae* ATCC 20851, *Penicillium bilaiae* ATCC 22348, *Penicillium bilaiae* NRRL 50162, *Penicillium bilaiae* NRRL 50169, *Penicillium bilaiae* NRRL 50776, *Penicillium bilaiae* NRRL 50777, *Penicillium bilaiae* NRRL 50778, *Penicillium bilaiae* NRRL 50777, *Penicillium bilaiae* NRRL 50778, *Penicillium bilaiae* NRRL 50779, *Penicillium bilaiae* NRRL 50780, *Penicillium bilaiae* NRRL 50781, *Penicillium bilaiae* NRRL 50782, *Penicillium bilaiae* NRRL 50783, *Penicillium bilaiae* NRRL 50784, *Penicillium bilaiae* NRRL 50785, *Penicillium bilaiae* NRRL 50786, *Penicillium bilaiae* NRRL 50787, *Penicillium bilaiae* NRRL 50788, *Penicillium bilaiae* RS7B-SD1 and/or *Trichoderma virens* G1-3 spores). In some embodiments, the amount/concentration of microbial spores from one or more agriculturally beneficial microorganisms is about 1 to about 25%, about 5 to about 20%, about 5 to about 15%, about 5 to about 10% or about 8 to about 12% (by weight) of the composition.

It is to be understood that agriculturally beneficial microorganisms in compositions of the present disclosure may comprise vegetative cells and/or dormant spores. According to some embodiments, at least 1, 5, 10, 15, 20, 25, 30, 35, 40, 45, 50, 55, 60, 65, 70, 75, 80, 85, 90, 95, 96, 97, 98, 99% or more agriculturally beneficial microorganisms are present in compositions of the present disclosure as vegetative cells. According to some embodiments, at least 1, 5, 10, 15, 20, 25, 30, 35, 40, 45, 50, 55, 60, 65, 70, 75, 80, 85, 90, 95, 96, 97, 98, 99% or more agriculturally beneficial microorganisms are present in compositions of the present disclosure as spores.

In some embodiments, compositions of the present disclosure comprise one or more biostimulants in an amount/concentration of about 0.0001 to about 5% or more (by weight) of the composition. In some embodiments, the biostimulant(s) (e.g., glycine and/or seaweed extract) comprise(s) about 0.0001, 0.0002, 0.0003, 0.0004, 0.0005, 0.0006, 0.0007, 0.0008, 0.0009, 0.001, 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01, 0.015, 0.02, 0.025, 0.03, 0.035, 0.04, 0.045, 0.05, 0.06, 0.07, 0.08, 0.09, 0.1, 0.02, 0.3, 0.4, 0.5, 0.6, 0.7, 0.8, 0.9, 1 to about 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4., 4.5, 4.6, 4.7, 4.8, 4.9, 5% (by weight) of the composition. For example, compositions of the present disclosure may comprise about 0.0005, 0.00075, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4., 4.5, 4.6, 4.7, 4.8, 4.9, 5% or more (by weight) of one or more biostimulants (e.g., glycine and/or seaweed extract).

In some embodiments, compositions of the present disclosure comprise one or more microbial extracts in an amount/concentration of about 0.0001 to about 5% or more (by weight) of the composition. In some embodiments, the microbial extract(s) comprise(s) about 0.0001, 0.0002, 0.0003, 0.0004, 0.0005, 0.0006, 0.0007, 0.0008, 0.0009, 0.001, 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01, 0.015, 0.02, 0.025, 0.03, 0.035, 0.04, 0.045, 0.05, 0.06, 0.07, 0.08, 0.09, 0.1, 0.02, 0.3, 0.4, 0.5, 0.6, 0.7, 0.8, 0.9, 1 to about 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4., 4.5, 4.6, 4.7, 4.8, 4.9, 5% (by weight) of the composition. For example, compositions of the present disclosure may comprise about 0.0005, 0.00075, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4., 4.5, 4.6, 4.7, 4.8, 4.9, 5% or more (by weight) of one or more microbial extracts.

In some embodiments, compositions of the present disclosure comprise one or more nutrients in an amount/concentration of about 0.0001 to about 5% or more (by weight) of the composition. In some embodiments, the nutrient(s) (e.g., phosphorous, boron, chlorine, copper, iron, manganese, molybdenum and/or zinc) comprise(s) about 0.0001, 0.0002, 0.0003, 0.0004, 0.0005, 0.0006, 0.0007, 0.0008, 0.0009, 0.001, 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01, 0.015, 0.02, 0.025, 0.03, 0.035, 0.04, 0.045, 0.05, 0.06, 0.07, 0.08, 0.09, 0.1, 0.02, 0.3, 0.4, 0.5, 0.6, 0.7, 0.8, 0.9, 1 to about 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4., 4.5, 4.6, 4.7, 4.8, 4.9, 5% (by weight) of the composition. For example, compositions of the present disclosure may comprise about 0.0005, 0.00075, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4., 4.5, 4.6, 4.7, 4.8, 4.9, 5% or more (by weight) of one or more the nutrients (e.g., phosphorous, boron, chlorine, copper, iron, manganese, molybdenum and/or zinc).

In some embodiments, compositions of the present disclosure comprise one or more pest attractant(s) and/or feeding stimulant(s) in an amount/concentration of about 0.0001 to about 5% or more (by weight) of the composition. In some embodiments, the pest attractant(s) and/or feeding stimulant(s) comprise(s) about 0.0001, 0.0002, 0.0003, 0.0004, 0.0005, 0.0006, 0.0007, 0.0008, 0.0009, 0.001, 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01, 0.015, 0.02, 0.025, 0.03, 0.035, 0.04, 0.045, 0.05, 0.06, 0.07, 0.08, 0.09, 0.1, 0.02, 0.3, 0.4, 0.5, 0.6, 0.7, 0.8, 0.9, 1 to about 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4., 4.5, 4.6, 4.7, 4.8, 4.9, 5% (by weight) of the composition. For example, compositions of the present disclosure may comprise about 0.0005, 0.00075, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4., 4.5, 4.6, 4.7, 4.8, 4.9, 5% or more (by weight) of one or more pest attractants and/or feeding stimulants.

In some embodiments, compositions of the present disclosure comprise one or more chitin oligomers at a concentration of about $1\times10^{-15}$ M to about $1\times10^{-10}$ M, about $1\times10^{-14}$ M to about $1\times10^{-8}$ M, about $1\times10^{-14}$ M to about $1\times10^{-6}$ M, about $1\times10^{-12}$ M to about $1\times10^{-8}$ M, about $1\times10^{-12}$ M to about $1\times10^{-6}$ M, about $1\times10^{-10}$ M to about $1\times10^{-6}$ M, or about $1\times10^{-8}$ M to about $1\times10^{-2}$ M. For example, compositions of the present disclosure may comprise about $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{4}$ M, $1\times10^{-3}$ M, $1\times10^{-2}$ M, $1\times10^{-1}$ M or more of one or more chitin oligomers (e.g., one, two, three, four or more of the chitin oligomers set forth above as structures XXXVI-LXXXIII).

In some embodiments, compositions of the present disclosure comprise one or more chitosan oligomers at a concentration of about $1\times10^{-15}$ M to about $1\times10^{-10}$ M, about $1\times10^{-14}$ M to about $1\times10^{-8}$ M, about $1\times10^{-14}$ M to about $1\times10^{-6}$ M, about $1\times10^{-12}$ M to about $1\times10^{-8}$ M, about $1\times10^{-12}$ M to about $1\times10^{-6}$ M, about $1\times10^{-10}$ M to about $1\times10^{-6}$ M, or about $1\times10^{-8}$ M to about $1\times10^{-2}$ M. For example, compositions of the present disclosure may comprise about $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{4}$ M, $1\times10^{-3}$ M, $1\times10^{-2}$ M, $1\times10^{-1}$ M or more of one or more chitosan oligomers (e.g., one, two, three, four or more of the chitin oligomers set forth above as structures XXXVI-LXXXIII in a deacetylated form).

In some embodiments, compositions of the present disclosure comprise one or more chitins at a concentration of about $1\times10^{-15}$ M to about $1\times10^{-10}$ M, about $1\times10^{-14}$ M to about $1\times10^{-8}$ M, about $1\times10^{-14}$ M to about $1\times10^{-6}$ M, about $1\times10^{-12}$ M to about $1\times10^{-8}$ M, about $1\times10^{-12}$ M to about $1\times10^{-6}$ M, about $1\times10^{-10}$ M to about $1\times10^{-6}$ M, or about $1\times10^{-8}$ M to about $1\times10^{-2}$ M. For example, compositions of the present disclosure may comprise about $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{4}$ M, $1\times10^{-3}$ M, $1\times10^{-2}$ M, $1\times10^{-1}$ M or more of one or more chitins.

In some embodiments, compositions of the present disclosure comprise one or more chitosans at a concentration of about $1\times10^{-15}$ M to about $1\times10^{-10}$ M, about $1\times10^{-14}$ M to about $1\times10^{-8}$ M, about $1\times10^{-14}$ M to about $1\times10^{-6}$ M, about $1\times10^{-12}$ M to about $1\times10^{-8}$ M, about $1\times10^{-12}$ M to about $1\times10^{-6}$ M, about $1\times10^{-10}$ M to about $1\times10^{-6}$ M, or about $1\times10^{-8}$ M to about $1\times10^{-2}$ M. For example, compositions of the present disclosure may comprise about $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{4}$ M, $1\times10^{-3}$ M, $1\times10^{-2}$ M, $1\times10^{-1}$ M or more of one or more chitosans.

In some embodiments, compositions of the present disclosure comprise one or more stabilizing compounds in an amount/concentration of about 0.0001 to about 95% or more (by weight, based upon the total weight of the composition). For example, compositions of the present disclosure may comprise about 0.0001 to about 0.001, about 0.001 to about 1%, about 0.25 to about 5%, about 1 to about 10%, about 5 to about 25%, about 10% to about 30%, about 20% to about 40%, about 25% to about 50%, about 30 to about 60%, about 50 to about 75%, or about 75 to about 95% (by weight), optionally about 0.0005, 0.001, 0.002, 0.003, 0.004, 0.005, 0.0075, 0.01, 0.02, 0.03, 0.04, 0.05. 0.06, 0.07, 0.08, 0.09, 0.1, 0.2, 0.3, 0.4, 0.5, 1, 1.5, 2, 2.5, 3, 3.5, 4, 4.5, 5, 5.5, 6, 6.5, 7, 7.5, 8, 8.5, 9, 9.5, 10, 15, 20, 25, 30, 35, 40, 45, 50, 55, 60, 65, 70, 75, 80, 85, 90, 95%, of one or more maltodextrins, monosaccharides, disaccharides, sugar alcohols, humic acids, betaines, prolines, sarcosines, peptones, oxidation control components, hygroscopic polymers and/or UV protectants.

In some embodiments, compositions of the present disclosure comprise one or more stabilizing compounds at a concentration of about $1\times10^{-20}$ M to about $1\times10^{-1}$ M. For example, compositions of the present disclosure may comprise about $1\times10^{-15}$ M to about $1\times10^{-10}$ M, about $1\times10^{-14}$ M to about $1\times10^{-8}$ M, about $1\times10^{-14}$ M to about $1\times10^{-6}$ M, about $1\times10^{-12}$ M to about $1\times10^{-8}$ M, about $1\times10^{-12}$ M to about $1\times10^{-6}$ M, about $1\times10^{-10}$ M to about $1\times10^{-6}$ M, or about $1\times10^{-8}$ M to about $1\times10^{-2}$ M, optionally about $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{4}$ M, $1\times10^{-3}$ M, $1\times10^{-2}$ M, $1\times10^{-1}$ M or more, of one or more maltodextrins, monosaccharides, disaccharides, sugar alcohols, humic acids, betaines, prolines, sarcosines, peptones, oxidation control components, hygroscopic polymers and/or UV protectants.

In some embodiments, compositions of the present disclosure comprise one or more buffers in an amount/concentration of about 0.0001 to about 5% or more (by weight) of the composition. In some embodiments, the buffer(s) comprise(s) about 0.0001, 0.0002, 0.0003, 0.0004, 0.0005, 0.0006, 0.0007, 0.0008, 0.0009, 0.001, 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01, 0.015, 0.02, 0.025, 0.03, 0.035, 0.04, 0.045, 0.05, 0.06, 0.07, 0.08, 0.09, 0.1, 0.02, 0.3, 0.4, 0.5, 0.6, 0.7, 0.8, 0.9, 1 to about 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4., 4.5, 4.6, 4.7, 4.8, 4.9, 5% (by weight) of the composition. For example, compositions of the present disclosure may comprise about 0.0005, 0.00075, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4., 4.5, 4.6, 4.7, 4.8, 4.9, 5% or more (by weight) of one or more buffers (e.g., potassium phosphate monobasic and/or potassium phosphate dibasic).

In some embodiments, compositions of the present disclosure comprise one or more commercial carriers, antioxidants, oxygen scavengers, hygroscopic polymers, UV protectants, biostimulants, microbial extracts, nutrients, pest attractants and/or feeding stimulants, pesticides, plant signal molecules, drying agents, anti-freezing agents and/or buffers used in accordance with the manufacturer's recommended amounts/concentrations.

In some embodiments, compositions of the present disclosure are formulated to have a pH of about 5.5 to about 8.5, optionally about 5, 5.5, 6, 6.5, 7, 7.5, 8 or 8.5.

In some embodiments, compositions of the present disclosure have a pH of about 6 to about 8, optionally about 6, 6.5, 7, 7.5 or 8.

The deagglomeration, emulsification and/or solubilization of LCO molecules in compositions of the present disclosure provide(s) numerous benefits, including, but not limited to, enhanced shelf life and ease of use.

In some embodiments, about/at least 50, 60, 65, 70, 75, 80, 85, 90, 95% or more of the LCO molecules in compositions of the present disclosure remain deagglomerated following storage at or below 0, 1, 2, 3, 4, 5, 6, 7, 8, 9, 10, 11, 12, 13, 14, 15, 16, 17 18, 19 or 20° C. for a period of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 months or more. According to some embodiments, all (or substantially all) of the LCO molecules remain deagglomerated following storage at or below 0, 1, 2, 3, 4, 5, 6, 7, 8, 9, 10, 11, 12, 13, 14, 15, 16, 17 18, 19 or 20° C. for a period of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 months or more.

In some embodiments, about/at least 50, 60, 65, 70, 75, 80, 85, 90, 95% or more of the LCO molecules in compositions of the present disclosure remain emulsified with the aqueous solvent following storage at or below 0, 1, 2, 3, 4, 5, 6, 7, 8, 9, 10, 11, 12, 13, 14, 15, 16, 17 18, 19 or 20° C. for a period of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 months or more. According to some embodiments, all (or substantially all) of the LCO molecules in compositions of the present disclosure remain emulsified with the aqueous solvent following storage at or below 0, 1, 2, 3, 4, 5, 6, 7, 8, 9, 10, 11, 12, 13, 14, 15, 16, 17 18, 19 or 20° C. for a period of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 months or more.

In some embodiments, about/at least 50, 60, 65, 70, 75, 80, 85, 90, 95% or more of the LCO molecules in compositions of the present disclosure remain localized in micelles following storage at or below 0, 1, 2, 3, 4, 5, 6, 7, 8, 9, 10, 11, 12, 13, 14, 15, 16, 17 18, 19 or 20° C. for a period of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 months or more. According to some embodiments, all (or substantially all) of the LCO molecules in compositions of the present disclosure remain localized in micelles following storage at or below 0, 1, 2, 3, 4, 5, 6, 7, 8, 9, 10, 11, 12, 13, 14, 15, 16, 17 18, 19 or 20° C. for a period of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 months or more.

In some embodiments, about/at least 50, 60, 65, 70, 75, 80, 85, 90, 95% or more of the LCO molecules in compositions of the present disclosure remain solubilized in the aqueous solvent following storage at or below 0, 1, 2, 3, 4, 5, 6, 7, 8, 9, 10, 11, 12, 13, 14, 15, 16, 17 18, 19 or 20° C. for a period of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 months or more. According to some embodiments, all (or substantially all) of the LCO molecules in compositions of the present disclosure remain solubilized in the aqueous solvent following storage at or below 0, 1, 2, 3, 4, 5, 6, 7, 8, 9, 10, 11, 12, 13, 14, 15, 16, 17 18, 19 or 20° C. for a period of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 months or more.

In some embodiments, about/at least 50, 60, 65, 70, 75, 80, 85, 90, 95% or more of the LCO molecules in compositions of the present disclosure remain in said composition after it is passed through a filter having an average pore size of 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4 μm or smaller at or below 0, 1, 2, 3, 4, 5, 6, 7, 8, 9, 10, 11, 12, 13, 14, 15, 16, 17 18, 19 or 20° C. According to some embodiments, all (or substantially all) of the LCO molecules in compositions of the present disclosure remain in said composition after it is passed through a filter having an average pore size of 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4 μm or smaller at or below 0, 1, 2, 3, 4, 5, 6, 7, 8, 9, 10, 11, 12, 13, 14, 15, 16, 17 18, 19 or 20° C.

In some embodiments, about/at least 50, 60, 65, 70, 75, 80, 85, 90, 95% or more of the LCO molecules in compositions of the present disclosure remain in said composition after it is passed through a filter having an average pore size of 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4 μm or smaller at or below 0, 1, 2, 3, 4, 5, 6, 7, 8, 9, 10, 11, 12, 13, 14, 15, 16, 17 18, 19 or 20° C. following storage at or below 0, 1, 2, 3, 4, 5, 6, 7, 8, 9, 10, 11, 12, 13, 14, 15, 16, 17 18, 19 or 20° C. for a period of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 months or more. According to some embodiments, all (or substantially all) of the LCO molecules in compositions of the present disclosure remain in said composition after it is passed through a filter having an average pore size of 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4 μm or smaller at or below 0, 1, 2, 3, 4, 5, 6, 7, 8, 9, 10, 11, 12, 13, 14, 15, 16, 17 18, 19 or 20° C. following storage at or below 0, 1, 2, 3, 4, 5, 6, 7, 8, 9, 10, 11, 12, 13, 14, 15, 16, 17 18, 19 or 20° C. for a period of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 months or more.

Particular embodiments of the present disclosure are described in the following numbered paragraphs:

1. Use of an anionic surfactant for reducing and/or preventing agglomeration of LCO molecules in an aqueous solvent/composition.
2. Use of an anionic surfactant and, optionally, a nonionic surfactant for solubilizing LCO molecules in an aqueous solvent.
3. The use of paragraph 1 or paragraph 2, wherein said nonionic surfactant is an alcohol ethoxylate, optionally isodecyl alcohol ethoxylate.
4. The use of any one of paragraphs 1-3, wherein said anionic surfactant comprises a hydrocarbon tail that is at least 8, 9, 10, 11, 12, 13, 14, 15 or 16 carbons in length.
5. The use of any one of paragraphs 1-3, wherein said anionic surfactant comprises, consists essentially of or consists of an anionic surfactant comprising a carbonate, phosphate, sulfate, or sulfonate head and a linear hydrocarbon tail, optionally a linear hydrocarbon tail that is at least 8, 9, 10, 11, 12, 13, 14, 15 or 16 carbons in length.
6. The use of any one of paragraphs 1-3, wherein said anionic surfactant comprises, consists essentially of or consists of an alkyl sulfate, optionally a decyl sulfate or a dodecyl sulfate.
7. The use of any one of paragraphs 1-3, wherein said anionic surfactant comprises, consists essentially of or consists of an alkyl sulfonate, optionally an alkylbenzene sulfonate, optionally an alkyl($C_{10-16}$)benzene sulfonate.
8. The use of any one of paragraphs 1-7, wherein said LCO molecules comprise two, three, four, five, six, seven, eight, nine, ten or more structurally distinct LCO molecules.
9. The use of any one of paragraphs 1-7, wherein said LCO molecules comprise, consist essentially of or consist of one, two, three, four, five or more of the LCO molecules set forth above as structures V-XXXIII.
10. The use of any one of paragraphs 1-9, wherein the aqueous solvent/composition consists essentially of or consists of water.
11. A method of solubilizing LCO molecules in an aqueous solvent/composition, said method comprising, consisting essentially of consisting of:
reducing and/or preventing agglomeration of said LCO molecules and/or emulsifying said LCO molecules with said aqueous solvent/composition, optionally at a pH of about 6.5 to about 7.5, optionally at a pH of about 6.5, 6.6, 6.7, 6.8, 6.9, 7.0, 7.1, 7.2, 7.3, 7.4 or 7.5; and
incorporating said LCO molecules into micelles, optionally micelles having an average diameter of about/less than 0.2, 0.21, 0.22, 0.23, 0.24, 0.25, 0.26, 0.27, 0.28, 0.29, or 0.3 μm, optionally at a pH of about 6.5 to about 7.5, optionally at a pH of about 6.5, 6.6, 6.7, 6.8, 6.9, 7.0, 7.1, 7.2, 7.3, 7.4 or 7.5.
12. A method of reducing and/or preventing agglomeration of LCO molecules in an aqueous solvent/composition, emulsifying LCO molecules with an aqueous solvent/composition, facilitating the formation of micelles comprising LCO molecules in an aqueous solvent/composition, and/or solubilizing LCO molecules in an aqueous solvent/composition, said method comprising, consisting essentially of consisting of:
contacting said LCO molecules with an effective amount of an anti-agglomeration surfactant, optionally an anionic anti-agglomeration surfactant, optionally an anionic anti-agglomeration surfactant comprising a hydrocarbon chain that is at least 8, 9, 10, 11, 12, 13, 14, 15 or 16 carbons in length.
13. A method of solubilizing LCO molecules in an aqueous solvent/composition, said method comprising, consisting essentially of consisting of:
contacting said LCO molecules with an anti-agglomeration surfactant, optionally an anionic anti-agglomeration surfactant, optionally an anionic anti-agglomeration surfactant comprising a hydrocarbon tail that is at least 8, 9, 10, 11, 12, 13, 14, 15 or 16 carbons in length, in an amount/concentration sufficient to reduce and/or prevent agglomeration of said LCO molecules; and, optionally,
contacting said LCO molecules with an effective amount of a micelle-forming surfactants, optionally a nonionic micelle-forming surfactant, optionally a nonionic micelle-forming surfactant comprising a hydrocarbon chain and an ethoxylate chain.
14. A method of solubilizing LCO molecules in an aqueous solvent/composition, said method comprising, consisting essentially of consisting of:
contacting said LCO molecules with an anti-agglomeration surfactant, optionally an anionic anti-agglomeration surfactant, optionally an anionic anti-agglomeration surfactant comprising a hydrocarbon tail that is at least 8, 9, 10, 11, 12, 13, 14, 15 or 16 carbons in length, in an amount/concentration sufficient to emulsify said LCO molecules with said aqueous solvent/composition; and, optionally,
contacting said LCO molecules with an effective amount of a micelle-forming surfactant, optionally a nonionic micelle-forming surfactant, optionally a nonionic micelle-forming surfactant comprising a hydrocarbon chain and an ethoxylate chain
15. An aqueous LCO solution, comprising:
an aqueous solvent;
LCO molecules;
an anti-agglomeration surfactant, optionally an anionic anti-agglomeration surfactant, optionally an anionic anti-agglomeration surfactant comprising a hydrocarbon tail that is at least 8, 9, 10, 11, 12, 13, 14, 15 or 16 carbons in length, in an amount/concentration sufficient to reduce and/or prevent agglomeration of said LCO molecules; and, optionally,
a micelle-forming surfactant, optionally a nonionic micelle-forming surfactant, optionally a nonionic micelle-forming surfactant comprising an ethoxylate chain, in an amount/concentration sufficient to form micelles comprising said LCO molecules, optionally micelles having an average diameter of about/less than 0.2, 0.21, 0.22, 0.23, 0.24, 0.25, 0.26, 0.27, 0.28, 0.29, or 0.3 μm.

16. The method or aqueous LCO solution of any one of paragraphs 13-15, wherein said micelle-forming surfactant is an alcohol ethoxylate, optionally isodecyl alcohol ethoxylate.
17. The method or aqueous LCO solution of any one of paragraphs 12-16, wherein said anti-agglomeration surfactant is an anionic surfactant comprising a carbonate, phosphate, sulfate, or sulfonate head and a linear hydrocarbon tail that is at least 8, 9, 10, 11, 12, 13, 14, 15 or 16 carbons in length.
18. The method or aqueous LCO solution of any one of paragraphs 12-16, wherein said anti-agglomeration surfactant is an alkyl sulfonate, optionally an alkylbenzene sulfonate, optionally an alkyl($C_{10-16}$)benzene sulfonate.
19. The method or aqueous LCO solution of any one of paragraphs 12-16, wherein said anti-agglomeration surfactant is an alkyl sulfate, optionally a decyl sulfate or a dodecyl sulfate.
20. The aqueous LCO solution of any one of claims 15-19, wherein said anti-agglomeration surfactant is present at a concentration less than its critical micelle concentration.
21. The aqueous LCO solution of any one of claims 15-19, wherein said anti-agglomeration surfactant comprises about/at least 0.01%, optionally about 0.01% to about 0.5%, optionally about 0.016% to about 0.16%, of said aqueous LCO solution (by weight, based upon the total weight of said aqueous LCO solution).
22. The aqueous LCO solution of any one of claims 15-21, wherein said micelle-forming surfactant comprises about/at least 0.001%, optionally about 0.003% to about 0.1%, optionally about 0.004% to about 0.04%, of said aqueous LCO solution (by weight, based upon the total weight of said aqueous LCO solution).
23. The aqueous LCO solution of any one of claims 15-22, wherein the total surfactant concentration in said aqueous LCO solution is less than 0.5%, optionally about 0.01% to about 0.5%, optionally about 0.02% to about 0.2% (by weight, based upon the total weight of said aqueous LCO solution).
24. The aqueous LCO solution of any one of claims 15-23, wherein said anionic surfactant and said non-ionic surfactant are present at a ratio of about 75:25 to about 85:15.
25. The aqueous LCO solution of any one of claims 15-24, wherein the LCO concentration in said aqueous LCO solution is about/at least 0.0002%, optionally at least 0.01%, optionally about 0.01% to about 0.02% (by weight, based upon the total weight of said aqueous LCO solution).
26. The aqueous LCO solution of any one of claims 15-25, wherein the pH of said aqueous LCO solution is about 6.5 to about 7.5.
27. The aqueous LCO solution of any one of claims 15-27, wherein at least 50, 55, 60, 65, 70, 75, 70, 85, 90, 95% or more of said lipo-chitooligosaccharide molecules remains solubilized after said aqueous LCO solution is:
stored at or below 20° C., optionally at or below 0, 1, 2, 3, 4, 5, 6, 7, 8, 9, 10, 11, 12, 13, 14 or 15° C., for a period of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 months or more; and/or
passed through a 0.2, 0.21, 0.22, 23, 0.24, 0.25, 0.26, 0.27, 0.28, 0.29, 0.3 μm or larger filter at or below 20° C.
28. The use, method or aqueous LCO solution of any one of paragraphs 1-27, wherein said LCO molecules comprise, consist essentially of or consist of one, two, three, four, five, six, seven, eight, nine, ten or more of the LCOS set forth above as structures V-XXXIII.

Although each of the aforementioned uses, methods and compositions has been described with respect to LCO molecules, it is to be understood that the inventive concepts of the present disclosure are not so limited. The inventive concepts underlying the uses, methods and concepts expressly set forth above may be utilized to breakdown and solubilize numerous substances, including, but not limited to, fats and greases. Thus, it is to be understood that the present disclosure extends to uses, methods and compositions in which a different substance (e.g., a solid grease) is substituted for the LCO molecules described above.

EXAMPLES

The following examples are not intended to be a detailed catalogue of all the different ways in which the present disclosure may be implemented or of all the features that may be added to the present disclosure. Subjects skilled in the art will appreciate that numerous variations and additions to the various embodiments may be made without departing from the present disclosure. Hence, the following descriptions are intended to illustrate some particular embodiments of the invention and not to exhaustively specify all permutations, combinations and variations thereof.

Unless otherwise indicated, the percentages set forth in the following examples are by weight, based upon the total weight of the composition.

Example 1

Aqueous Compositions Comprising Solubilized LCO

A solid, water-insoluble powder comprising LCO (structure V above) was added to four aqueous solutions comprising a first anionic surfactant (alkyl($C_{1-16}$)benzene sulfonate) and a second nonionic surfactant (isodecyl alcohol ethoxylate). Table 1.

TABLE 1

|  | A | B | C | D |
|---|---|---|---|---|
| BIO-SOFT ® S-101 | 0.017% | 0.034% | 0.08% | 0.16% |
| MAKON ® DA-6 | 0.003% | 0.006% | 0.02% | 0.04% |
| sodium hydroxide | 0.00236% | 0.00471% | 0.01095% | 0.02189% |
| potassium phosphate monobasic | 0.18315% | 0.18278% | 0.08748% | 0.08659% |
| potassium phosphate dibasic | 0.19907% | 0.19867% | 0.06003% | 0.05942% |
| preservative | 0.25% | 0.25% | 0.25% | 0.25% |
| LCO powder | 0.01255% | 0.01255% | 0.01255% | 0.01255% |
| deionized water | 99.33288% | 99.31129% | 99.47899% | 99.36954% |

Each of the resulting compositions was stored at room temperature (22-24° C.) for eight months, then analyzed using reverse-phase HPLC before and after filtering the compositions with a 0.22 μm filter. The LCO content of compositions A and B decreased significantly after filtering (by 72.8% and 53.3%, respectively), indicating that the LCO therein was either not fully solubilized or was at least partially solubilized in micelles larger than 0.22 μm. Compositions C and D exhibited no decrease in LCO content after filtering, indicating that LCO was fully solubilized within micelles that passed through the 0.22 μm filter.

Example 2

Aqueous Compositions Comprising Solubilized LCO

A solid, water-insoluble powder comprising LCO (structure VII above) was added to four aqueous solutions comprising a first anionic surfactant (alkyl($C_{10-16}$)benzene sulfonate) and a second nonionic surfactant (isodecyl alcohol ethoxylate). Table 2.

TABLE 2

|  | E | F | G | H |
|---|---|---|---|---|
| BIO-SOFT ® S-101 | 0.008% | 0.016% | 0.032% | 0.16% |
| MAKON ® DA-6 | 0.002% | 0.004% | 0.008% | 0.04% |
| sodium hydroxide | 0.000000% | 0.000000% | 0.000000% | 0.016665% |
| potassium phosphate monobasic | 0.099944% | 0.099944% | 0.099944% | 0.058882% |
| potassium phosphate dibasic | 0.06645% | 0.06645% | 0.06645% | 0.094876% |
| preservative | 0.25% | 0.25% | 0.25% | 0.25% |
| LCO powder | 0.01255% | 0.01255% | 0.01255% | 0.01255% |
| deionized water | 99.561056% | 99.551056% | 99.531056% | 99.367027% |

Each of the resulting compositions was analyzed using reverse-phase HPLC before and after filtering the compositions with a 0.22 μm filter. The LCO content of composition E decreased by 63% after filtering, indicating that the LCO therein was either not fully solubilized or was at least partially solubilized in micelles larger than 0.22 μm. Compositions F and G exhibited very little decrease in LCO content after filtering (3.2% and 1.9%, respectively), indicating that most (if not all) of the LCO therein was solubilized within micelles that passed through the 0.22 μm filter. Composition H exhibited no decrease in LCO content after filtering, indicating that LCO was fully solubilized within micelles that passed through the 0.22 μm filter.

Example 3

Aqueous Compositions Comprising Solubilized LCO

A solid, water-insoluble powder comprising LCO (structure VII above) was added to three aqueous solutions comprising a first anionic surfactant (alkyl($C_{10-16}$)benzene sulfonate) and a second nonionic surfactant (isodecyl alcohol ethoxylate). and a second nonionic surfactant (isodecyl alcohol ethoxylate). Table 3.

TABLE 3

|  | G | I | J |
|---|---|---|---|
| BIO-SOFT ® S-101 | 0.032% | 0.056% | 0.08% |
| MAKON ® DA-6 | 0.008% | 0.014% | 0.02% |
| potassium phosphate monobasic | 0.099944% | 0.099944% | 0.087357% |
| potassium phosphate dibasic | 0.06645% | 0.06645% | 0.079037% |
| preservative | 0.25% | 0.25% | 0.25% |
| LCO powder | 0.01255% | 0.01255% | 0.01255% |
| deionized water | 99.531056% | 99.501056% | 99.471056% |

Each of the resulting compositions was analyzed using reverse-phase HPLC before and after filtering the compositions with a 0.22 μm filter. Composition I exhibited very little decrease in LCO content after filtering (1.5%), indicating that most (if not all) of the LCO therein was solubilized within micelles that passed through the 0.22 μm filter. Compositions G and J exhibited no decrease in LCO content after filtering, indicating that LCO was fully solubilized within micelles that passed through the 0.22 μm filter.

Example 4

Aqueous Compositions Comprising Solubilized LCO

LCO (structure V above) was added to three aqueous solutions comprising a first anionic surfactant (alkyl($C_{10-16}$) benzene sulfonate) and a second nonionic surfactant (isodecyl alcohol ethoxylate). Table 4.

TABLE 4

|  | K | L | M |
| --- | --- | --- | --- |
| BIO-SOFT ® S-101 | 0.019019% | 0.032% | 0.16% |
| MAKON ® DA-6 | 0.004755% | 0.008% | 0.04% |
| sodium hydroxide | 0.001981% | 0.003333% | 0.016665% |
| potassium phosphate monobasic | 0.104108% | 0.099944% | 0.058882% |
| potassium phosphate dibasic | 0.063567% | 0.066450% | 0.094876% |
| preservative | 0.25% | 0.25% | 0.25% |
| LCO | 0.0002% | 0.0002% | 0.0002% |
| deionized water | 99.556333% | 99.540036% | 99.379340% |

Each of the resulting compositions was analyzed using reverse-phase HPLC before and after filtering the compositions with a 0.22 μm filter. Compositions K and L exhibited very little decrease in LCO content after filtering (1.6% and 0.7%, respectively), indicating that most (if not all) of the LCO therein was solubilized within micelles that passed through the 0.22 μm filter. Composition M exhibited no decrease in LCO content after filtering, indicating that LCO was fully solubilized within micelles that passed through the 0.22 μm filter.

Example 5

Aqueous Compositions Comprising Solubilized LCO

LCO (structure VII above) was added to four aqueous solutions comprising a first anionic surfactant (alkyl($C_{10-16}$) benzene sulfonate) and a second nonionic surfactant (isodecyl alcohol ethoxylate). Table 5.

TABLE 5

|  | S | T | U | V |
| --- | --- | --- | --- | --- |
| BIO-SOFT ® S-101 | 0.004% | 0.008% | 0.016% | 0.032% |
| MAKON ® DA-6 | 0.001% | 0.002% | 0.004% | 0.008% |
| potassium phosphate monobasic | 0.110434% | 0.109151% | 0.106585% | 0.101452% |
| potassium phosphate dibasic | 0.061968% | 0.062856% | 0.064632% | 0.068186% |
| Preservative | 0.25% | 0.25% | 0.25% | 0.25% |
| LCO | 0.000018% | 0.000018% | 0.000018% | 0.000018% |
| deionized water | 99.572567% | 99.567962% | 99.558751% | 99.540331% |

The LCO content of composition S decreased significantly after filtering (by 53.9%), indicating that the LCO therein was either not fully solubilized or was at least partially solubilized in micelles larger than 0.22 μm. Compositions T and U exhibited little decrease in LCO content after filtering (11.5% and 4.7%, respectively), indicating that most (if not all) of the LCO therein was solubilized within micelles that passed through the 0.22 μm filter. Composition V exhibited no decrease in LCO content after filtering, indicating that LCO was fully solubilized within micelles that passed through the 0.22 μm filter.

Appendix A

*Acinetobacter, Actinomycetes, Aegerita, Agrobacterium* (e.g., *A. radiobacter* strains such as K1026 and K84), *Akanthomyces, Alcaligenes, Alternaria, Aminobacter* (e.g., *A. aganoensis, A. aminovorans, A. anthyllidis, A. ciceronei, A. lissarensis, A. niigataensis*), *Ampelomyces* (e.g., *A. quisqualis* strains such as M-10), *Anabaena* (e.g., *A. aequalis, A. affinis, A. angstumalis angstumalis, A. angstumalis marchita, A. aphanizomendoides, A. azollae, A. bornetiana, A. catenula, A. cedrorum, A. circinalis, A. confervoides, A. consfricta, A. cyanobacterium, A. cycadeae, A. cylindrica, A. echinispora, A. felisii, A. flos-aquae flos-aquae, A. flos-aquae minor, A. flos-aquae freleasei, A. helicoidea, A. inaequalis, A. lapponica, A. laxa, A. lemmermannii, A. levanderi, A. limnetica, A. macrospora macrospora, A. macrospora robusta, A. monticulosa, A. nostoc, A. ascillarioides, A. planctonica, A. raciborski, A. scheremetievi, A. sphaerica, A. spiroides crassa, A. spiroides sprroides, A. subcylindrica, A. torulosa, A. unispora, A. variabilis, A. verrucosa, A. viguieri, A. wisconsinense, A. zierlingii*), *Arthrobacter, Arthrobotrys* (e.g., *A. aggregata, A. alaskana, A. ameropora, A. anomala, A. apscheronica, A. arthrobotryoides, A. azerbaijanica, A. bakunika, A. botryospora, A. brochopaga, A. chazarica, A. chilensis, A. cladodes, A. calvispora, A. compacta, A. conoides, A. consfringens, A. cylindrospora, A. dactyloides, A. deflectans, A. dendroides, A. doliiformis, A. drechsleri, A. elegans, A. ellipsospora, A. entomopaga, A. ferox, A. foliicola, A. fruticulosa, A. globospora, A. hatospora, A. hertziana, A. indica, A. irregularis, A. javanica, A. kirghizica, A. Tonga, A. longiphora, A. longiramulifera, A. longispora, A. mangrovispora, A. megaspora, A. microscaphoides, A. microspora, A. multisecundaria, A. musiformis, A. nematopaga, A. nonseptata, A. oligospora, A. oudemansii, A. oviformis, A. perpasta, A. polycephala, A. pseudoclavata, A. pyriformis, A. recta, A. robusta, A. rosea, A. scaphoides, A. sclerohypha, A. shahriari, A. shizishanna, A. sinensis, A. soprunovii, A. stilbacea, A. straminicola, A. superba, A. tabrizica, A. venusta, A. vermicola, A. yunnanensis*), *Aschersonia, Ascophaera, Aspergillus* (e.g., *A. flavus* strains such as NRRL 21882, *A. parasiticus*), *Aulosira*

(e.g., *A. aenigmatica, A. africana, A. bohemensis, A. bombayensis, A. confluens, A. fertilissima, A. fertilissma var. tenius, A. fritschii, A. godoyana, A. implexa, A. laxa, A. plantonica, A. prolifica, A. pseuodoramosa, A. schauinslandii, A. striata, A. terrestris, A. thermalis*), *Aureobacterium, Aureobasidium* (e.g., *A. pullulans* strains such as DSM 14940 and DSM 14941), *Azobacter, Azorhizobium* (e.g., *A. caulinodans, A. doebereinerae, A. oxalatiphilum*), *Azospirillum* (e.g., *A. amazonense* strains such as BR 11140 (SpY2T), *A. brasilense* strains such as INTA Az-39, AZ39, XOH, BR 11002, BR 11005, Ab-V5 and Ab-V6, *A. canadense, A. doebereinerae, A. formosense, A. halopraeferans, A. irakense, A. largimobile, A. lipoferum* strains such as BR 11646, *A. melinis, A. oryzae, A. picis, A. rugosum, A. thiophilum, A. zeae*), *Azotobacter* (e.g., *A. agilis, A. armeniacus, A.* sp. *AR, A. beijerinckii, A. chroococcum, A.* DCU26, *A. FA*8, *A. nigricans, A. paspali, A. salinesfris, A. tropicalis, A. vinelandii*), *Bacillus* (e.g., *B. amyloliquefaciens* strains such as D747, NRRL B-50349, TJ1000 (also known as 1BE, isolate ATCC BAA-390), FZB24, FZB42, IN937a, IT-45, TJ1000, MBI600, BS27 (deposited as NRRL B-5015), BS2084 (deposited as NRRL B-50013), 15AP4 (deposited as ATCC PTA-6507), 3AP4 (deposited as ATCC PTA-6506), LSSA01 (deposited as NRRL B-50104), ABP278 (deposited as NRRL B-50634), 1013 (deposited as NRRL B-50509), 918 (deposited as NRRL B-50508), 22CP1 (deposited as ATCC PTA-6508) and BS18 (deposited as NRRL B-50633), *B. cereus* strains such as I-1562, *B. firmus* strains such as I-1582, *B. laevolacticus, B. lichenformis* strains such as BA842 (deposited as NRRL B-50516) and BL21 (deposited as NRRL B-50134), *B. macerns, B. firmus, B. mycoides* strains such as NRRL B-21664, *B. pasteurii, B. pumilus* strains such as NRRL B-21662, NRRL B-30087, ATCC 55608, ATCC 55609, GB34, KFP9F and QST 2808, *B. sphaericus, B. subtilis* strains such as ATCC 55078, ATCC 55079, MBI 600, NRRL B-21661, NRRL B-21665, CX-9060, GB03, GB07, QST 713, FZB24, D747 and 3BP5 (deposited as NRRL B-50510), *B. thuringiensis* strains such as ATCC 13367, GC-91, NRRL B-21619, ABTS-1857, SAN 401 I, ABG-6305, ABG-6346, AM65-52, SA-12, SB4, ABTS-351, HD-1, EG 2348, EG 7826, EG 7841, DSM 2803, NB-125 and NB-176), *Beijerinckia, Beauveria* (e.g., *B. bassiana* strains such as ATCC 26851, ATCC 48023, ATCC 48585, ATCC 74040, ATCC-74250, DSM 12256 and PPRI 5339), *Beijerinckia, Blastodendrion, Bosea* (e.g., *B. eneae, B. lathyri, B. lupini, B. massiliensis, B. minatitlanensis, B. robiniae, B. thiooxidans, B. vestrisii*), *Bradyrhizobium* (e.g., *B. arachidis, B. bete, B. canariense, B. cytisi, B. daqingense, B. denifrificans, B. diazoefficiens, B. elkanii* strains such as SEMIA 501, SEMIA 587 and SEMIA 5019, *B. ganzhouense, B. huanghuauhaiense, B.icense, B. ingae, B. iriomotense, B. japonicum* strains such as NRRL B-50586 (also deposited as NRRL B-59565), NRRL B-50587 (also deposited as NRRL B-59566), NRRL B-50588 (also deposited as NRRL B-59567), NRRL B-50589 (also deposited as NRRL B-59568), NRRL B-50590 (also deposited as NRRL B-59569), NRRL B-50591 (also deposited as NRRL B-59570), NRRL B-50592 (also deposited as NRRL B-59571), NRRL B-50593 (also deposited as NRRL B-59572), NRRL B-50594 (also deposited as NRRL B-50493), NRRL B-50608, NRRL B-50609, NRRL B-50610, NRRL B-50611, NRRL B-50612, NRRL B-50726, NRRL B-50727, NRRL B-50728, NRRL B-50729, NRRL B-50730, SEMIA 566, SEMIA 5079, SEMIA 5080, USDA 6, USDA 110, USDA 122, USDA 123, USDA 127, USDA 129 and USDA 532C, *B. jicamae, B. lablabi, B. liaoningense, B. manausense, B. neofropicale, B. oligotrophicum, B. ottawaense, B. pachyrhizi, B. paxllaeri, B. retamae, B. rifense, B. valentinum, B. yuanmingense*), *Burkholderia* (e.g., *B. acidipaludis, B. ambifaria, B. andropogonis, B. anthina, B. arboris, B. bannensis, B. bryophila, B. caledonica, B. caribensis, B. caryophylli, B. cenocepacua, B. choica, B. cocovenenans, B. contaminans, B. denitrificans, B. diazofrophica, B. diffusa, B. dilworthii, B. dolosa, B. eburnea, B. endofungorum, B. ferrariae, B. fungorum, B. ginsengisoli, B. gladioli, B. glathei, B. glumae, B. graminis, B. grimmiae, B. heleia, B. hospital, B. humi, B. kururiensis, B. lata, B. latens, B. mallei, B. megapolitana, B. metallica, B. mimosarum, B. multivorans, B. nodosa, B. norimbergensis, B. oklahomensis, B. phenazinium, B. phenolirupfrix, B. phymatum, B. phytofirmans, B. pickettii, B. plantarii, B. pseudomallei, B. pseudomultivorans, B. pyrrocinia, B. rhizoxinica, B. rhynchosiae, B. sabiae, B. sacchari, B. sartisoli, B. sediminicola, B. seminalis, B. silvatlantica, B. singaporensis, B. soli, B. sordidcola, B.* sp. strains such as A396, *B. sprentiae, B. stabilis, B. symbiotica, B. telluris, B. terrae, B. terrestris, B. terricola, B. thailandensis, B. tropica, B. tuberum, B.ubonensis, B.udeis, B.unamae, B.vandii, B.vietnamiensis, B.xenovorans, B.zhejiangensis*), *Brevibacillus, Burkholderia* (e.g., *B.* sp. A396 nov. rinojensis NRRL B-50319), *Calonectria, Candida* (e.g., *C. oleophila* such 1-182, *C. saitoana*), *Candidatus* (e.g., *C. Burkholderia calva, C. Burkholderia crenata, C. Burkholderia hispidae, C. Burkholderia kirkii, C. Burkholderia mamillata, C. Burkholderia nigropunctata, C. Burkholderia rigidae, C. Burkholderia schumannianae, C. Burkholderia verschuerenii, C. Burkholderia virens, C. Phytoplasma allocasuarinae, C. Phytoplasma americanum, C. Phytoplasma asteris, C. Phytoplasma aurantifolia, C. Phytoplasma australiense, C. Phytoplasma balanitae, C. Phytoplasma brasiliense, C. Phytoplasma caricae, C. Phytoplasma castaneae, C. Phytoplasma cocosnigeriae, C. Phytoplasma cocostanzaniae, C. Phytoplasma convolvuli, C. Phytoplasma costaricanum, C. Phytoplasma cynodontis, C. Phytoplasma fragariae, C. Phytoplasma fraxini, C. Phytoplasma graminis, C. Phytoplasma japonicum, C. Phytoplasma luffae, C. Phytoplasma lycopersici, C. Phytoplasma malasianum, C. Phytoplasma mali, C. Phytoplasma omanense, C. Phytoplasma oryzae, C. Phytoplasma palmae, C. Phytoplasma palmicola, C. Phytoplasma phoenicium, C. Phytoplasma pini, C. Phytoplasma pruni, C. Phytoplasma prunorum, C. Phytoplasma pyri, C. Phytoplasma rhamni, C. Phytoplasma rubi, C. Phytoplasma solani, C. Phytoplasma spartii, C. Phytoplasma sudamericanum, C. Phytoplasma tamaricis, C. Phytoplasma trifolii, C. Phytoplasma ulmi, C. Phytoplasma vitis, C. Phytoplasma Chromobacterium* (e.g., *C. subtsugae* NRRL B-30655 and PRAA4-1, *C. vaccinia* strains such as NRRL B-50880, *C. violaceum*), *Chryseomonas, Clavibacter, Clonostachys* (e.g., *C. rosea f. catenulata* (also referred to as *Gliocladium catenulatum*) strains such as J1446), *Clostridium, Coelemomyces, Coelomycidium, Colletofrichum* (e.g., *C. gloeosporioides* strains such as ATCC 52634), *Comomonas, Conidiobolus, Coniothyrium* (e.g., *C. minitans* strains such as CON/M/91-08), *Cordyceps, Corynebacterium, Couchia, Cryphonecfria* (e.g., *C. parasitica*), *Cryptococcus* (e.g., *C. albidus*), *Cryptophlebia* (e.g., *C. leucofreta*), *Culicinomyces, Cupriavidus* (e.g., *C. alkaliphilus, C. basilensis, C. campinensis, C. gilardii, C. laharis, C. metallidurans, C. numazuensis, C. oxalaticus, C. pampae, C. pauculus, C. pinatubonensis, C. respiraculi, C. taiwanensis*), *Curtobacterium, Cydia* (e.g., *C. pomonella* strains such as V03 and V22), *Dactylaria* (e.g., *D. candida*), *Delftia* (e.g., *D. acidovorans* strains such as RAY209), *Desulforibtio, Desulfovibrio, Devosia* (e.g., *D. neptuniae*), *Dilophosphora* (e.g., *D. alo-*

*pecuri*), *Engyodontium, Enterobacter, Entomophaga, Entomophthora, Erynia, Escherichia* (e.g., *E. intermedia*), *Eupenicillium, Exiguobacaterium, Filariomyces, Filobasidiella, Flavobacterium* (e.g., *F.* H492 NRRL B-50584), *Frankia* (e.g., *F. alni*), *Fusarium* (e.g., *F. laterium, F. oxysporum, F. solani*), *Gibellula, Gigaspora* (e.g., *G. margarita*), *Gliocladium* (e.g., *G. virens* strains such as ATCC 52045 and GL-21), *Glomus* (e.g., *G. aggregatum, G. brasilianum clarum, G. deserticola, G. etunicatum, G. fasciculatum, G. infraradices* strains such as RTI-801 *G. monosporum, G. mosseae*), *Gluconobacter, Halospirulina, Harposporium* (e.g., *H. anguillulae*), *Hesperomyces, Hirsutella* (e.g., *H. minnesotensis, H. rhossiliensis, H. thomsonii* strains such as ATCC 24874), *Hydrogenophage, Hymenoscyphous* (e.g., *H. ericae*), *Hymenostilbe, Hypocrella, Isaria* (e.g., *I. fumosorosea* strains such as Apopka-97 (deposited as ATCC 20874)), *Klebsiella* (e.g., *K. pneumoniae, K. oxytoca*), *Kluyvera, Laccaria* (e.g., *L. bicolor, L. laccata*), *Lactobacillus, Lagenidium, Lecanicillium* (e.g., *L. lecanii* strains such as KV01, *L. longisporum* strains such as KV42 and KV71), *Leptolegnia, Lysobacter* (e.g., *L. antibioticus* strains such as 13-1 and HS124, *L. enzymogenes* strains such as 3.1T8), *Massospora, Meristacrum* (e.g., *M. asterospermum*), *Mesorhizobium* (e.g., *M. abyssinicae, M. albiziae, M. alhagi, M. amorphae, M. ausfralicum, M. camelthorni, M. caraganae, M. chacoense, M. ciceri, M. gobiense, M. hawassense, M. huakuii, M. loti, M. mediterraneum, M. metallidurans, M. muleiense, M. opportunistum, M. plurifarium, M. qingshengii, M. robiniae, M. sangaii, M. septenfrionale, M. shangrilense, M. shonense, M. silamurunense, M. tamadayense, M. tarimense, M. temperatum, M. thiogangeticum, M. tianshanense*), *Metarhizium* (e.g., *M. anisopliae* (also referred to as *M. brunneum, Metarrhizium anisopliae*, and green muscadine) strains such as IMI 330189, FI-985, FI-1045, F52 (deposited as DSM 3884, DSM 3885, ATCC 90448, SD 170 and ARSEF 7711) and ICIPE 69), *M. flaviviride* strains such as ATCC 32969), *Methylobacterium* (e.g., *M. adhaesivum, M. aerolatum, M. aminovorans, M. aquaticum, M. brachiatum, M. brachythecii, M. bullatum, M. cerastii, M. chloromethanicum, M. dankookense, M. dichloromethanicum, M. extorquens, M. fujisawaense, M. gnaphalii, M. goesingense, M. gossipiicola, M. gregans, M. haplocladii, M. hispanicum, M. iners, M. isbiliense, M. jeotgali, M. komagatae, M. longum, M. lusitanum, M. marchantiae, M. mesophilicum, M. nodulans, M. organophilum, M. oryzae, M. oxalidis, M. persicinum, M. phyllosphaerae, M. platani, M. podarium, M. populi, M. radiotolerans, M. rhodesianum, M. rhodinum, M. salsuginis, M. soli, M. suomiense, M. tardum, M. tarhaniae, M. thiocyanatum, M. thurigiense, M. trifolii, M. variabile, M.zatmanii*), *Metschnikowia* (e.g., *M. fructicola*), *Microbacterium* (e.g., *M. laevaniformans*), *Microdochium* (e.g., *M. dimerum*), *Microsphaeropsis* (e.g., *M. ochracea* P130A), *Microvirga* (e.g., *M. aerilata, M. aerophila, M. flocculans, M. guangxiensis, M. lotononidis, M. lupini, M. subterranea, M. vignae, M. zambiensis*), *Monacrosporium* (e.g., *M. cionopagum*), *Mucor, Muscodor* (e.g., *M. albus* such NRRL 30547, QST 20799 and SA-13, *M. roseus* strains such as NRRL 30548), *Mycoderma, Myiophagus, Myriangium, Myrothecium* (e.g., *M. verrucaria*), *Nectria, Nematoctonus* (e.g., *N. geogenius, N. leiosporus*), *Neozygites, Nomuraea* (e.g., *N. rileyi* strains such as SA86101, GU87401, SR86151, CG128 and VA9101), *Nostoc* (e.g., *N. azollae, N. caeruleum, N. carneum, N. comminutum, N. commune, N. ellipsosporum, N. flagelliforme, N. linckia, N. longstaffi, N. microscopicum, N. muscorum, N. paludosum, N. pruniforme, N. punctifrome, N. sphaericum, N. sphaeroides, N. spongiaeforme, N. verrucosum*), *Ochrobactrum* (e.g., *O. anthropi, O. cicero, O. cytisi, O. daejeonense, O. gallinifaecis, O. grigonense, O. guangzhouense, O. haematophilum, O. intermedium, O. lupini, O. oryzae, O. pectoris, O. pituitosum, O. pseudointermedium, O. pseudogrignonense, O. rhizosphaerae, O. thiophenivorans, O. tritici*), *Oidiodendron, Paecilomyces* (e.g., *P. fumosoroseus* strains such as FE991 and FE 9901, *P. lilacinus* strains such as 251, DSM 15169 and BCP2), *Paenibacillus* (e.g., *P. alvei* strains such as NAS6G6, *P. azotofixans, P. polymyxa* strains such as ABP166 (deposited as NRRL B-50211)), *Pandora, Pantoea* (e.g., *P. agglomerans* strains such as NRRL B-21856, *P. vagans* strains such as C9-1), *Paraglomus* (e.g., *P. brazilianum*), *Paraisaria, Pasteuria, Pasteuria* (e.g., *P. nishizawae* strains such as Pn1, *P. penefrans, P. ramose, P.* sp. strains such as ATCC PTA-9643 and ATCC SD-5832, *P. thornea, P. usage*), *Penicillium* (e.g., *P. albidum, P. aurantiogriseum, P. bilaiae* (formerly known as *P. bilaii* and *P. bilaji*) strains such as ATCC 18309, ATCC 20851, ATCC 22348, NRRL 50162, NRRL 50169, NRRL 50776, NRRL 50777, NRRL 50778, NRRL 50777, NRRL 50778, NRRL 50779, NRRL 50780, NRRL 50781, NRRL 50782, NRRL 50783, NRRL 50784, NRRL 50785, NRRL 50786, NRRL 50787, NRRL 50788 and RS7B-SD1, *P. brevicompactum* strains such as AgRF18, *P. canescens* strains such as ATCC 10419, *P. chyrsogenum, P. cifreonigrum, P. cifrinum, P. digitatum, P. expansum* strains such as ATCC 24692 and YT02, *P. fellatanum* strains such as ATCC 48694, *P. frequentas, P. fuscum, P. fussiporus, P. gaestrivorus* strains such as NRRL 50170, *P. glabrum* strains such as DAOM 239074 and CBS 229.28, *P. glaucum, P. griseofulvum, P. implicatum, P. janthinellum* strains such as ATCC 10455, *P. lanosocoeruleum* strains such as ATCC 48919, *P. lilacinum, P. minioluteum, P. montanense, P.nigricans, P. oxalicum, P. pinetorum, P. pinophilum, P. purpurogenum, P. radicum* strains such as ATCC 201836, FRR 4717, FRR 4719 and N93/47267, *P. raistrickii* strains such as ATCC 10490, *P. rugulosum, P. simplicissimum, P. solitum, P. variabile, P. velutinum, P. viridicatum*), *Phingobacterium, Phlebiopsis* (e.g., *P. gigantea*), *Photorhabdus, Phyllobacterium* (e.g., *P. bourgognense, P. brassicacearum, P. catacumbae, P. endophyticum, P. ifriqiyense, P. leguminum, P. loti, P. myrsinacearum, P. sophorae, P. frifolii*), *Pichia* (e.g., *P. anomala* strains such as WRL-076), *Pisolithus* (e.g., *P. tinctorius*), *Planktothricoides, Plectonema, Pleurodesmospora, Pochonia* (e.g., *P. chlamydopora*), *Podonectria, Polycephalomyces, Prochlorocoous* (e.g., *P. marinus*), *Prochloron* (e.g., *P. didemni*), *Prochlorothrix, Pseudogibellula, Pseudomonas* (e.g., *P. agarici, P. antartica, P. aurantiaca, P. aureofaciens, P. azotifigens, P. azotoformans, P. balearica, P. blatchfordae, P. brassicacearum, P. brenneri, P. cannabina, P. cedrina, P. cepacia, P. chlororaphis* strains such as MA 342, *P. congelans, P. corrugata, P. costantinii, P. denifrificans, P. entomophila, P. fluorescens* strains such as ATCC 27663, CL 145A and A506, *P. fragii, P. fuscovaginae, P. fulva, P. gessardii, P. jessenii* strains such as PS06, *P. kilonensis, P. koreensis, P. libanensis, P. lili, P. lundensis, P. lutea, P. luteola, P. mandelii, P. marginalis, P. meditrranea, P. meridana, P. migulae, P. moraviensis, P. mucidolens, P. orientalis, P. oryzihabitans, P. palleroniana, P. panacis, P. parafulva, P. peli, P. pertucinogena, P. plecoglossicida, P. protogens, P. proteolytica, P. putida, P. pyrocina* strains such as ATCC 15958, *P. rhodesiae, P.* sp. strains such as DSM 13134, *P. striata, P. stutzeri, P. syringae, P. synxantha, P. taetrolens, P. thisvervalensis, P. tolaasii, P. veronii*), *Pseudozyma* (e.g., *P. flocculosa* strains such as PF-A22 UL), *Pythium* (e.g., *P. oligandrum* strains such as DV 74), *Rhizo-* bium (e.g., *R. aggregatum, R. alamii, R. alkalisoli, P. alvei, P. azibense, P. borbori, R. calliandrae, R.cauense, R. cellulosilyticum, R. daejeonense, R. endolithicum, R. endophyticum, R. etli, R. fabae, R. flavum, R. fredii, R. freirei, R. galegae, R. gallicum, R. giardinii, R. grahamii, R. hainanense, R. halophytocola, R. halotolerans, R. helanshanense, R. herbae, R. huautlense, R. indigoferae, R. jaguaris, R. kunmingense, R. laguerreae, R. larrymoorei, R. leguminosarum* strains such as SO12A-2 (IDAC 080305-01), *R. lemnae, R. leucaenae, R. loessense, R. lupini, R. lusitanum, R. mayense, R. mesoamericanum, R. mesosinicum, R. miluonense, R. mongolense, R. multihospitium, R. naphthalenivorans, R. nepotum., R. oryzae, R. pakistanensis, R. paknamense, R. paranaense, R. pefrolearium, R. phaseoli, R. phenanthrenilyticum, R. pisi, R. pongamiae, R. populi, R. pseudoryzae, R. pusense, R. qilianshanese, r. radiobacter, R. rhizogenes, R. rhizoryzae, R. rozettiformans, R. rubi, R. selenitireeducens, R. skierneiwicense, R. smilacinae, R. soli, R. sophorae, R. sophoriradicis, R. sphaerophysae, R. straminoryzae, R. subbaraonis, R. sullae, R. taibaishanense, R. tarimense, R. tibeticum, R. trifolii* strains such as RP113-7, R. fropici strains such as SEMIA 4080, *R. tubonense, R. undicola, R. vallis, R. viciae* strains such as P1NP3Cst, SU303 and WSM 1455, *R. vignae, R. vitis, R. yanglingense, R. yantingense), Rhizoctonia, Rhizopogon* (e.g., *R. amylopogon, R. fulvigleba, R. luteolus, R. villosuli), Rhodococcus, Saccharopolyspora* (e.g., *S. spinosa), Scleroderma* (e.g., *S. cepa S. cifrinum), Septobasidium, Serratia, Shinella* (e.g., *S. kummerowiae), Sinorhizoium* (e.g., *S. abri, S. adhaerens, S. americanum, S. arboris, S. chiapanecum, S. fredii* strains such as CCBAU114 and USDA 205, *S. garamanticus, S. indiaense, S. kostiense, S. kummerowiae, S. medicae, S. meliloti* strains such as MSDJ0848, *S. mexicanus, S. numidicus, S. psoraleae, S. saheli, S. sesbaniae, S. sojae, S. terangae, S. xinjiangense), Sorosporella, Sphaerodes* (e.g., *S. mycoparasitica* strains such as IDAC 301008-01), *Spodoptera* (e.g., *S. littoralis), Sporodiniella, Steinernema* (e.g., *S. carpocapsae, S. feltiae, S. kraussei* strains such as L137), *Stenotrophomonas, Streptomyces* (e.g., *S.* NRRL B-30145, *S.* M1064, *S.* WYE 53 (deposited as ATCC 55750), *S. cacaoi* strains such as ATCC 19093, *S. galbus* strains such as NRRL 30232, *S. griseoviridis* strains such as K61, *S. lydicus* strains such as WYEC 108 (deposited at ATCC 55445), *S. violaceusniger* strains such as YCED-9 (deposited as ATCC 55660)), *Streptosporangium, Stillbella, Swaminathania, Talaromyces* (e.g., *T. aculeatus, T. flavus* strains such as V117b), *Tefranacrium, Thiobacillus, Tilachlidium, Tolypocladium, Tolypothrix, Torrubiella, Torulospora, Trenomyces, Trichoderma* (e.g. *T. asperellum* strains such as SKT-1, *T. atroviride* strains such as LC52 and CNCM 1-1237, *T. fertile* strains such as JM41R, *T. gamsii* strains such as ICC 080, *T. hamatum* strains such as ATCC 52198, *T. harzianum* strains such as ATCC 52445, KRL-AG2, T-22, TH-35, T-39 and ICC012, *T. polysporum, T. reesi* strains such as ATCC 28217 *T. sfromaticum, T. virens* strains such as ATCC 58678, GL-3, GL-21 and G-41, *T. viridae* strains such as ATCC 52440, ICC080 and TV1), *Typhula, Ulocladium* (e.g., *U. oudemansii* strains such as HRU3), *Uredinella, Variovorax, Verticillium* (e.g., *V. chlamydosporum, V. lecanii* strains such as ATCC 46578), *Vibrio, Xanthobacter, Xanthomonas. Xenorhabdus, Yersinia* (e.g., *Y. entomophaga* strains such as O82KB8), *Zoophthora*

That which is claimed:

1. A method of solubilizing lipo-chitooligosaccharide (LCO) molecules in an aqueous solvent, said method comprising:

contacting said LCO molecules with an anionic surfactant comprising a carbonate, phosphate, sulfate, or sulfonate head and a linear hydrocarbon tail that is at least 8 carbons in length in an amount/concentration sufficient to reduce and/or prevent agglomeration of said LCO molecules; and contacting said LCO molecules with a nonionic surfactant comprising a hydrocarbon chain and an ethoxylate chain in an amount/concentration sufficient to form micelles comprising said LCO molecules, wherein at least 75% of said LCO molecules are solubilized within micelles capable of passing through a filter having an average pore size of 0.22 microns.

2. The method of claim 1, wherein said anionic surfactant is an alkyl sulfonate.

3. The method of claim 1, wherein said anionic surfactant is an alkyl sulfate.

4. The method of claim 1, wherein said nonionic surfactant is an alcohol ethoxylate.

5. An aqueous lipo-chitooligosaccharide (LCO) solution, comprising:

an aqueous solvent;
LCO molecules;
an anionic surfactant comprising a carbonate, phosphate, sulfate, or sulfonate head and a linear hydrocarbon tail that is at least 8 carbons in length, said anionic surfactant present in an amount/concentration sufficient to reduce and/or prevent agglomeration of said LCO molecules; and a nonionic surfactant present comprising a hydrocarbon chain and an ethoxylate chain, said nonionic surfactant present in an amount/concentration sufficient to form micelles comprising at least a portion of said LCO molecules, wherein at least 75% of said LCO molecules are solubilized within micelles capable of passing through a filter having an average pore size of 0.22 microns.

6. The aqueous LCO solution of claim 5, wherein said anionic surfactant is an alkyl sulfonate.

7. The aqueous LCO solution of claim 5, wherein said anionic surfactant is an alkyl sulfate.

8. The aqueous LCO solution of claim 5, wherein said nonionic surfactant is an alcohol ethoxylate.

9. The aqueous LCO solution of claim 5, wherein said anionic surfactant and said nonionic surfactant are present at a ratio of about 75:25 to about 85:15.

10. The method of claim 1, wherein said anionic surfactant is an alkylbenzene sulfonate.

11. The method of claim 1, wherein said anionic surfactant is an alkyl($C_{10-16}$) benzene sulfonate.

12. The method of claim 1, wherein said anionic surfactant is a decyl sulfate or a dodecyl sulfate.

13. The method of claim 1, wherein said nonionic surfactant is an isodecyl alcohol ethoxylate.

14. The method of claim 1, wherein said anionic surfactant is an alkylbenzene sulfonate and wherein said nonionic surfactant is an isodecyl alcohol ethoxylate.

15. The method of claim 1, wherein said anionic surfactant is an alkyl($C_{10-16}$)benzene sulfonate and wherein said nonionic surfactant is an isodecyl alcohol ethoxylate.

16. The aqueous LCO solution of claim 5, wherein said anionic surfactant is an alkylbenzene sulfonate.

17. The aqueous LCO solution of claim 5, wherein said anionic surfactant is an alkyl ($C_{10-16}$) benzene sulfonate.

18. The aqueous LCO solution of claim 5, wherein said anionic surfactant is a decyl sulfate or a dodecyl sulfate.

19. The aqueous LCO solution of claim 5, wherein said nonionic surfactant is an isodecyl alcohol ethoxylate.

20. The aqueous LCO solution of claim 5, wherein said anionic surfactant is an alkylbenzene sulfonate and wherein said nonionic surfactant is an isodecyl alcohol ethoxylate.

21. The aqueous LCO solution of claim 5, wherein said anionic surfactant is an alkyl($C_{10-16}$)benzene sulfonate and wherein said nonionic surfactant is an isodecyl alcohol ethoxylate.

22. The aqueous LCO solution of claim 5, wherein said anionic surfactant comprises about 0.1% to about 0.5% of said aqueous LCO solution (by weight, based upon the total weight of said aqueous LCO solution).

23. The aqueous LCO solution of claim 5, wherein said non-ionic surfactant comprises about 0.01% to about 0.1% of said aqueous LCO solution (by weight, based upon the total weight of said aqueous LCO solution).

24. The aqueous LCO solution of claim 5, wherein at least 70% of said LCO molecules are localized in said micelles.

25. The aqueous LCO solution of claim 5, wherein at least 90% of said LCO molecules are localized in said micelles.

\* \* \* \* \*